US012187064B2

(12) United States Patent
Godfrey et al.

(10) Patent No.: US 12,187,064 B2
(45) Date of Patent: Jan. 7, 2025

(54) SECURITY DEVICES AND METHODS OF MANUFACTURE THEREOF

(71) Applicant: DE LA RUE INTERNATIONAL LIMITED, Basingstoke (GB)

(72) Inventors: John Godfrey, Basingstoke (GB); Rebecca Locke, Basingstoke (GB)

(73) Assignee: DE LA RUE INTERNATIONAL LIMITED, Basingstoke (GB)

(*) Notice: Subject to any disclaimer, the term of this patent is extended or adjusted under 35 U.S.C. 154(b) by 0 days.

(21) Appl. No.: 18/026,067

(22) PCT Filed: Sep. 10, 2021

(86) PCT No.: PCT/GB2021/052361
§ 371 (c)(1),
(2) Date: Mar. 13, 2023

(87) PCT Pub. No.: WO2022/053826
PCT Pub. Date: Mar. 17, 2022

(65) Prior Publication Data
US 2024/0025198 A1 Jan. 25, 2024

(30) Foreign Application Priority Data
Sep. 11, 2020 (GB) ..................................... 2014325
Sep. 11, 2020 (GB) ..................................... 2014326
(Continued)

(51) Int. Cl.
*B42D 25/324* (2014.01)
*B41M 3/14* (2006.01)
(Continued)

(52) U.S. Cl.
CPC ........... *B42D 25/324* (2014.10); *B41M 3/148* (2013.01); *B42D 25/29* (2014.10); *B42D 25/351* (2014.10);
(Continued)

(58) Field of Classification Search
CPC .... B42D 25/324; B42D 25/351; B42D 25/29; B42D 25/425; B41M 3/148; B41M 3/14
(Continued)

(56) References Cited

U.S. PATENT DOCUMENTS

2006/0107854 A1 5/2006 Bauer et al.
2008/0024846 A1 1/2008 Tompkin et al.
(Continued)

FOREIGN PATENT DOCUMENTS

CA 2 841 862 A1 1/2013
DE 11 2010 003 249 T5 5/2013
(Continued)

OTHER PUBLICATIONS

Mar. 10, 2022 combined Search and Examination Report issued in British Patent Application No. 2112959.8.
(Continued)

*Primary Examiner* — Justin V Lewis
(74) *Attorney, Agent, or Firm* — Oliff PLC

(57) ABSTRACT

A security device is disclosed, including: a substrate having opposing first and second surfaces; on the first surface of the substrate, a surface relief structure formed of one or more cured, at least semi-transparent material(s); and on the second surface of the substrate, a print layer. In at least a first region of the security device in at least part of which the substrate is transparent or translucent, the surface relief structure and the print layer are each defined in accordance with a common image and are in alignment with one another, the surface relief structure exhibiting a first set of
(Continued)

feature(s) of the common image and the print layer exhibiting a second set of feature(s) of the common image. The common image is exhibited by the surface relief structure and the print layer in combination with one another and the surface relief structure provides tactility to the common image.

18 Claims, 34 Drawing Sheets

(30) Foreign Application Priority Data

Sep. 11, 2020 (GB) ..................................... 2014327
Sep. 11, 2020 (GB) ..................................... 2014328
Sep. 11, 2020 (GB) ..................................... 2014329
Sep. 11, 2020 (GB) ..................................... 2014330
Sep. 11, 2020 (GB) ..................................... 2014331

(51) Int. Cl.
*B42D 25/29* (2014.01)
*B42D 25/351* (2014.01)
*B42D 25/369* (2014.01)
*B42D 25/382* (2014.01)
*B42D 25/387* (2014.01)
*B42D 25/425* (2014.01)

(52) U.S. Cl.
CPC ......... *B42D 25/369* (2014.10); *B42D 25/382* (2014.10); *B42D 25/387* (2014.10); *B42D 25/425* (2014.10); *B41P 2200/10* (2013.01)

(58) Field of Classification Search
USPC ................................ 283/67, 72, 94, 98, 901
See application file for complete search history.

(56) References Cited

U.S. PATENT DOCUMENTS

| | | | |
|---|---|---|---|
| 2008/0160226 A1 | 7/2008 | Kaule et al. | |
| 2010/0109317 A1 | 5/2010 | Hoffmuller et al. | |
| 2010/0194091 A1 | 8/2010 | Heim et al. | |
| 2010/0320742 A1 | 12/2010 | Hoffmuller et al. | |
| 2011/0045248 A1 | 2/2011 | Hoffmuller et al. | |
| 2013/0175793 A1 | 7/2013 | Mercier | |
| 2013/0182300 A1 | 7/2013 | Muller et al. | |
| 2017/0165997 A1* | 6/2017 | Holmes | B42D 25/373 |
| 2018/0178577 A1* | 6/2018 | Lister | B42D 25/45 |
| 2019/0152244 A1 | 5/2019 | Yamada et al. | |

FOREIGN PATENT DOCUMENTS

| | | | |
|---|---|---|---|
| DE | 102013015860 | A1 | 3/2015 |
| DE | 10 2017 010 060 | A1 | 6/2018 |
| EP | 0 420 261 | A2 | 4/1991 |
| EP | 2 445 726 | B1 | 10/2014 |
| EP | 2 886 356 | A2 | 6/2015 |
| EP | 3 401 117 | A1 | 11/2018 |
| GB | 2 480 227 | A | 11/2011 |
| GB | 2 486 994 | B | 3/2017 |
| GB | 2 594 300 | A | 10/2021 |
| JP | 2016-114776 | A | 6/2016 |
| WO | 2004/050376 | A1 | 6/2004 |
| WO | 2007/085808 | A1 | 8/2007 |
| WO | 2008/049533 | A2 | 5/2008 |
| WO | 2008/098753 | A1 | 8/2008 |
| WO | 2010149476 | A1 | 12/2010 |
| WO | 2011/000878 | A1 | 1/2011 |
| WO | 2011/017741 | A1 | 2/2011 |
| WO | 2013/010673 | A1 | 1/2013 |
| WO | 2016/016638 | A1 | 2/2016 |
| WO | 2017/009616 | A1 | 1/2017 |
| WO | 2017/009618 | A1 | 1/2017 |
| WO | 2017/009619 | A1 | 1/2017 |
| WO | 2017/009620 | A1 | 1/2017 |
| WO | 2017/055823 | A1 | 4/2017 |
| WO | 2018/011546 | A1 | 1/2018 |
| WO | 2018/153840 | A1 | 8/2018 |
| WO | 2018/206936 | A1 | 11/2018 |
| WO | 2019/063778 | A1 | 4/2019 |
| WO | 2019/063779 | A1 | 4/2019 |
| WO | 2019/153043 | A1 | 8/2019 |
| WO | 2020/030893 | A1 | 2/2020 |
| WO | 2020/070299 | A1 | 4/2020 |
| WO | 2020/070304 | A1 | 4/2020 |
| WO | 2020/156655 | A1 | 8/2020 |

OTHER PUBLICATIONS

Oct. 24, 2022 Examination Report issued in British Patent Application No. 2112959.8.
Mar. 23, 2022 International Search Report issued in International Patent Application No. PCT/GB2021/052364.
Mar. 23, 2022 Written Opinion of the International Searching Authority issued in International Patent Application No. PCT/GB2021/052364.
Mar. 10, 2022 combined Search and Examination Report issued in British Patent Application No. 2112982.0.
Oct. 27, 2022 Examination Report issued in British Patent Application No. 2112982.0.
Mar. 22, 2022 International Search Report issued in International Patent Application No. PCT/GB2021/052362.
Mar. 22, 2022 Written Opinion of the International Searching Authority issued in International Patent Application No. PCT/GB2021/052362.
Mar. 11, 2022 combined Search and Examination Report issued in British Patent Application No. 2112956.4.
Jan. 4, 2022 International Search Report issued in International Patent Application No. PCT/GB2021/052361.
Jan. 4, 2022 Written Opinion of the International Searching Authority issued in International Patent Application No. PCT/GB2021/052361.
U.S. Appl. No. 18/025,961, filed Mar. 13, 2023 in the name of Godfrey, J. et al.
U.S. Appl. No. 18/026,060, filed Mar. 13, 2023 in the name of Godfrey, J. et al.
Aug. 1, 2023 Combind Search and Examination Report issued in British Patent Applciation No. 2305182.4.
Sep. 27, 2024 Office Action issued in U.S. Appl. No. 18/025,961.

* cited by examiner

CMY/K=encapsulated print under resin

SECURITY DEVICES AND METHODS OF MANUFACTURE THEREOF

CROSS-REFERENCE TO RELATED APPLICATIONS

The entire content of each of the six international patent applications filed on 10 Sep. 2021 in the name of De La Rue International Limited and claiming priority from the following British patent applications (each filed on 11 Sep. 2020) is hereby incorporated by reference: GB2014325.1, GB2014326.9, GB2014327.7, GB2014328.5, GB2014329.3, GB2014330.1 and GB2014331.9.

FIELD OF THE INVENTION

This invention relates to security devices such as may be used as a mark of authenticity associated with an object of value, such as a security document including banknotes, passports, certificates, licences and the like. Methods for manufacturing security devices are also disclosed.

BACKGROUND TO THE INVENTION

Objects of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One class of security device which is widely used on banknotes and other documents is the intaglio print. For instance, many banknotes in circulation carry an image, such as a portrait or an architectural drawing, applied by intaglio printing. Typically all or part of the image is formed of an array of image elements, such as fine lines or dots, which can be individually discerned under close inspection and/or magnification. The intaglio printing technique not only ensures high resolution and accurate reproduction of the image (which prevents the production of passable counterfeit by readily available commercial printing techniques), but can also be used to impart tactility to the image. This significantly increases the security level, since would-be counterfeiters may have access to highly accurate printing systems which can reproduce the visual appearance of an intaglio print, but not its three-dimensional quality and hence its haptics (feel). On the other hand, due to the nature of intaglio printing, it is difficult to produce images of more than one colour, at least in a fully controllable manner.

Separately, in other classes of security device, it is known that casting of curable materials (e.g. UV resins) can produce highly tactile effects. However, due to the nature of casting a single resin, the resulting feature will be is either colourless or of a single colour. For increased security it would be better to have multicolour tactility.

SUMMARY OF THE INVENTION

The present invention provides a security device, comprising:

a substrate having opposing first and second surfaces;

on the first surface of the substrate, a surface relief structure formed of one or more cured, at least semi-transparent material(s); and on the second surface of the substrate, a print layer;

wherein, in at least a first region of the security device in at least part of which the substrate is transparent or translucent, the surface relief structure and the print layer are each defined in accordance with a common image and are in alignment with one another, the surface relief structure exhibiting a first set of feature(s) of the common image and the print layer exhibiting a second set of feature(s) of the common image whereby the common image is exhibited by the surface relief structure and the print layer in combination with one another and the surface relief structure provides tactility to the common image.

The present invention also provides a method of manufacturing a security device, comprising, in any order or simultaneously:

forming a surface relief structure on a first surface of a substrate from one or more at least semi-transparent curable material(s), and printing a print layer onto the second surface of the substrate, wherein, in at least a first region of the security device in at least part of which the substrate is transparent or translucent, the surface relief structure and the print layer are each defined in accordance with a common image and are in alignment with one another, the surface relief structure exhibiting a first set of feature(s) of the common image and the print layer exhibiting a second set of feature(s) of the common image, whereby the common image is exhibited by the surface relief structure and the print layer in combination with one another and the surface relief structure provides tactility to the common image.

Embodiments of the present invention therefore envisage the tactile emboss of a curable material (e.g. a UV casting resin) on one side of a substrate, combined with registered offset printing on the reverse. (Offset can be RGB for full colour images if required). The term "offset" printing is used herein to refer to lithographic printing, in which the one or more colours to be printed are applied to a patterned printing plate. The ink(s) are then transferred to a blanket roller from which the print is applied to the substrate. However, while lithographic printing is preferred, other printing techniques can also be used to form the print layer of the present invention, as discussed below.

The present inventors have recognised that the high resolution and complex colour workings achievable in an image printed by lithography or another comparable print technique cannot be reproduced in intaglio alone and vice-versa that the tactility of intaglio cannot be reproduced by lithography alone. By combining a cured surface relief structure with a print layer to display an image in the manner defined above, the resulting security device possesses tactility and at the same time can exhibit any desired arrangement of one or more colours in a controllable and reproducible manner. Since the surface relief structure and print layer are located on opposite surfaces of the substrate, they can be applied with extremely high register between them meaning that their relative positions are the same on every copy of the security device produced. For instance, the translational register between the surface relief structure and the print layer in the machine direction and/or the cross direction is preferably such that any mis-register is too small to be seen by the naked eye, e.g. no more than +/−75 μm. The skew register between the surface relief structure and the print layer is preferably 1 degree or less, more preferably 0.1 degree or less, still preferably 0.05 degrees or less, most preferably 0.02 degrees or less.

At any one lateral location on the substrate, the steps of forming the surface relief structure and printing the print layer can be performed either one after the other (in either order, with or without intervening steps) or simultaneously as discussed further below. The print layer can be applied by a flat printing technique (i.e. one which does not induce noticeable tactility), such as offset printing, which can therefore be selected to achieve the desired visual result (such as multiple colours) without the limitations imposed by the intaglio process, while the cured surface relief structure provides the desired tactility. This allows not only a greater degree of design freedom but also enables the formation of more complex security devices with a correspondingly higher security level.

It will be appreciated that the common image exhibited by the security device is that formed by the surface relief structure and the print layer viewed in combination (i.e. simultaneously—the surface relief structure being located between the print layer and the viewer, or the print layer being located between the surface relief structure and the viewer). That is, the common image is a composite, static macro-image arising due to the spatial arrangement of the surface relief and of the print layer—there is no synthetic magnification or other optically variable effect being generated. In at least part of the first region (where the common image is exhibited) the substrate will be transparent or translucent in order to enable the combination to be viewed in this way. Depending on the optical density of the substrate or other overlapping layers present (if any) the common image may be viewable in reflected light or only in transmitted light. "Transparent" means that the substrate is substantially optically clear, i.e. causing low or zero optical scattering, although it may carry a visibly coloured tint. "Translucent" means that some light is able to pass through the substrate but it will be scattered. If the relevant part of the substrate is translucent, its optical density must be sufficiently low that both the surface relief structure and the print layer can be observed by the naked eye simultaneously in transmitted light. Standard paper banknote substrates and standard polymer banknote substrates (with opacifying layers) meet this requirement. The at least part of the first region could correspond to a window or half-window region of the substrate (i.e. an area of lower optical density to the remainder of the substrate), but this is not essential as discussed further below. In some embodiments the substrate is transparent or translucent across the first region of the security device. The whole substrate may also be transparent or translucent if desired.

It should be noted that casting for tactility will be different to simply printing tactility, due to the presence of a base layer—that will have an effect on the colour in the device (whether it is clear, tinted or pigmented). In other words, the cast-cured surface relief structure will comprise a continuous body of cured material (of one or multiple types) with a varying height profile—if for instance it includes raised protrusions, these will be connected to one another by a base layer of lesser height. This would not be the case in a product having tactile protrusions formed by local printing of material. The continuous nature of the cast relief structure needs to be taken into account in the design of the security device to achieve the desired optical effect as described below.

The surface relief structure and the print layer each exhibit a set of features of the common image (in other words, at least part of the common image). "Features" of the common image are what define the information content of the common image, and could include any of: lines or edges demarcating objects in the image; objects themselves; regions of contouring or shading; shapes or parts thereof; alphanumeric characters or symbols, or parts thereof, etc. The nature of the features will depend on the image content. Examples will be given below.

The surface relief structure and the print layer can contribute to the common image to various different relative extents, depending on the embodiment. In some preferred implementations, it may be desirable for each of the two constituents of the security device to display the whole common image—that is, both the surface relief structure and the print layer each define the same image as one another. In this case, the first and second sets of feature(s) are the same as one another, the surface relief structure and the print layer each exhibiting all the features of the common image. It will be appreciated that the surface relief structure and the print layer will be in overlapping alignment so that the corresponding features have the same lateral position within the security device in both constituents.

In other preferred embodiments, the first and second sets of feature(s) are different from one another, the first set of feature(s) and/or the second set of feature(s) being a subset of the features of the common image. In other words, the surface relief structure may exhibit a first part of the common image and the print layer a second part, which parts are different from one another and may be separate, overlapping or interleaved. Hence, in one example the print layer may exhibit the complete common image and the surface relief structure only part of it—or vice versa. Alternatively, each constituent may exhibit only a part of the common image with the complete image only being apparent when the two are combined. Preferably, one or more of the features of the common image are included in both the first and second sets of feature(s) and are exhibited by both the surface relief structure and the print layer. Again, it will be appreciated that the surface relief structure and the print layer will be in overlapping alignment so that the corresponding features have the same lateral position within the security device in both constituents.

The selection of features to be contributed by the surface relief structure and those to be contributed by the print layer could be decided in a variety of ways. In some cases, the division could be arbitrary. However in preferred examples, the first set of feature(s) consists of the features of the common image located in a first portion thereof and the second set of feature(s) of the common image consists of the features of the common image located in a second portion thereof, the first and second portions being different from one another, preferably laterally offset from one another. The first and second portions are preferably each a single contiguous area of the image. For example, the first portion could correspond to the whole lateral extent of the common image while the second portion is only a sub-area thereof (or vice versa). "Laterally offset" includes the portions (only) partially overlapping one another, or not overlapping one another (for example the first and second portions may be spaced from one another or abutting one another). For instance the surface relief structure could contribute one half of the common image, and the print layer the other half of the common image.

These principles can be used to design security devices with visual and tactile effects which interact with one another in unexpected ways. For instance, a user might expect the tactile region(s) of the device to match the visible features of the device. However, the device could be designed so that this is not the case, and there is an intentional mis-match between the two components—e.g. a selected visible sub-portion of the device may be configured without tactility, or a tactile sub-portion may be located in a position without a visible contribution from the print layer. These are memorable and distinctive features which are likely to be missed by would-be counterfeiters.

In still further embodiments, the first set of feature(s) preferably corresponds to a first colour component of the common image, and the second set of feature(s) preferably corresponds to at least a second colour component of the common image. In this case the overall extent of the two constituents may largely overlap, but on a micro-scale the configuration of each will vary so as to contribute the desired colour(s) to each point of the common image.

Preferably either:

- the first set of feature(s) of the common image, exhibited by the surface relief structure, preferably the entire surface relief structure, is laterally located wholly within the bounds of the second set of feature(s) of the common image, exhibited by the print layer; and/or
- the second set of feature(s) of the common image, exhibited by the print layer, preferably the entire print layer, is laterally located wholly within the bounds of the second set of feature(s) of the common image exhibited by the surface relief structure.

Both of these options encompass the scenario in which the surface relief structure and the print layer share the same boundary. It should be noted that the surface relief structure and/or print layer could continue outside the common image (this applies to all embodiments) but in such cases will be configured differently outside the common image so that the common image remains distinct. Examples will be provided below. In other implementations it may be preferred that the surface relief structure and/or print layer does not exist outside the common image, for greatest visual distinction.

In some implementations, the cast surface relief structure (or part of it) could be one or more single volume(s) of material raised above the base layer, e.g. each defining a surface which varies in height optionally in a continuous, gradual or stepwise manner. However, in other cases the surface relief structure may comprise multiple discrete raised portions. In preferred embodiments, the common image is defined at least in part by an array of image elements spaced from one another, and either:

- the surface relief structure comprises a plurality of raised elements spaced from one another which form the image elements defining the first set of feature(s) of the common image; and/or
- the print layer comprises a plurality of print elements spaced from one another which form the image elements defining the second set of feature(s) of the common image.

Forming the common image from an array of image elements enables the security device to more closely mimic a conventional intaglio print, since intaglio images usually comprise linework drawings or other screened workings. The image elements are visually distinguishable from one another, although this may require close inspection and/or low level magnification to discern. The image elements may be conveyed by either or both of the surface relief structure and the print layer. If both, the corresponding image elements defined within each constituent will be in overlapping alignment.

Preferably, the common image is a screened image, the image elements varying across the array in terms of their size, shape, colour, optical density and/or spacing in order to convey the common image, the array of image elements preferably being arranged on a regular grid. The image elements may advantageously be rectilinear or curvilinear line elements, dot elements or elements having the shape of indicia, preferably alphanumeric or typographic symbols (e.g. currency signs such as "£", "$" etc). For instance, the image elements could define a line-work (e.g. similar to a conventional line intaglio image) or a dot screen of image elements, such as a half tone screen. The image may comprise a Guilloche pattern. Desirably the image is a portrait or architectural drawing. Preferably, the image is of a 3D object or scene. In embodiments in which the image is a screened image, the elements of the image are preferably arranged on a regular grid, although in general the elements may or may not be arranged on a regular grid.

As mentioned above, the cast-cured surface relief structure will comprise a continuous body of cured material with a varying height profile. The particular profile will depend on the desired image and/or tactility pattern. In preferred implementations, the surface relief structure includes a plurality of spaced protrusions, joined to one another by a base layer of lesser height. The protrusions may for example correspond to image elements of the common image as just described. Advantageously, the base layer may extend (away from the common image) over a peripheral region surrounding the plurality of spaced protrusions. Typically any such peripheral region will be narrow, e.g. extending between 0.01 mm and 5 mm away from the edge of the common image. In preferred examples, a ratio of the height of at least one protrusion to the height of the base layer joining the raised element to an adjacent protrusion is at least 10, preferably at least 20, and furthermore is preferably no greater than 400, preferably no greater than 200. In some embodiments, a ratio of the height of each protrusion to the height of the base layer is at least 10, preferably at least 20, and furthermore is preferably no greater than 400, preferably no greater than 200. This is especially the case where the protrusions are configured to form image elements, particularly of multi-tonal images.

The haptic effects of the security device may also be configured to interact with other tactile elements on the security document. For instance, the disclosed security device could be provided on a document substrate which also carries a conventional intaglio feature, disposed on the same surface of the substrate as the surface relief structure formed of cured material (e.g. the two might be adjacent one another). The overall appearance formed by the disclosed security device and the intaglio print in combination may be a complex haptic image, with the lower complexity imagery, tactility and colour being provided by the intaglio feature while the higher complexity imagery, tactility and colour is provided by the disclosed security device. For example, the disclosed device may present a common image in the form of a photographic portrait, while the intaglio print may provide a patterned (relatively low complexity) background surrounding the portrait, e.g. in the form of a coarse intaglio line structure.

As noted at the outset, some of the advantages of the invention are to provide greater design freedom in terms of the colour(s) exhibited by the device, and better colour placement. That is, instead of applying large blocks of each colour (as in conventional intaglio printing), individual lines or dots of an image could each have a different colour if desired. Possible implementations in preferred embodiments include:

- Colour combinations using a tinted or pigmented UV casting resin
- Tinted resin could combine with offset colours to produce 4, 5 or 6th colour
- Tinted resin could be embossed at different heights to increase/decrease strength of colour for better definition/colour combination The common image could be of any type, including block colours/shapes, alphanumeric text or "macro" images with no fine detail. However, preferably the common image is a multi-tonal and/or multi-coloured image, most preferably a grayscale image or a full colour image. Such images can mimic or even improve on the appearance of conventional intaglio prints.

In many preferred implementations, the at least one curable material is colourless (under standard white lighting, to the naked eye), and the print layer exhibits one or multiple visible colour(s). Most preferably the print layer is a RGB (red, green, blue) or CMYK (cyan, magenta, yellow, black) print layer. However, other combinations of colours can also be used such as orange, green and violet. It will be understood that the print layer may be laid down in one or multiple print workings (this applies to all embodiments).

In other preferred implementations, the at least one curable material carries a tint of a first colour and the print layer exhibits at least the first colour and/or a (different) second colour, preferably configured such that when viewed in combination a multi-coloured version of the common image is visible. It should be noted that the surface relief structure could, if desired, be formed of multiple curable materials, each forming a different lateral part of the structure, which materials could carry different coloured tints to introduce a further level of complexity. It is also possible for the print layer to exhibit more than two different colours.

In one particularly preferred embodiment, the first colour is one of red, green and blue, and the print layer exhibits the other two of red, green and blue, such that when viewed in combination a full colour version of the common image is visible. In another particularly preferred embodiment the first colour is one of cyan, magenta, yellow and black, and the print layer exhibits the other three of cyan, magenta, yellow and black, such that when viewed in combination a full colour version of the common image is visible.

Advantageously, the print layer exhibits two areas of different respective colours and an intervening area in which the colour transitions gradually between the different respective colours, preferably in a manner which is continuous even under magnification. This achieves a visual effect akin to "rainbowing" in conventional lithographic security print, but with the additional benefit of tactility. "Rainbowing" is not possible via conventional intaglio printing, because the viscous nature of intaglio inks prevents them intermingling, as does their placement inside recesses of the intaglio printing plate. As such, it has not previously been possible to produce a tactile "rainbow"-coloured image and hence this embodiment provides a new security effect unachievable by conventional means.

The surface relief structure and the print layer could be configured that they combine visually to exhibit the same appearance whichever way round the device is viewed (i.e. from the side of the surface relief structure or from the side of the print layer). However, in other preferred embodiments, it may be desirable to give rise to different appearances, one being viewable from each side. In this case the common image will be exhibited at least on one side of the device. For instance, in a preferred example, the at least one curable material carries a tint of at least one colour and the print layer has a visual opacity such that the colour appearance of the common image is different when the security device is viewed from the side of the surface relief structure as compared with when viewed from the side of the print layer. That is, the print layer is sufficiently opaque that it blocks the visibility of the surface relief structure through it, leading to the different appearance.

The print layer could be applied using standard, visibly coloured ink(s). To further increase the security level, in other embodiments, the print layer may comprise one or more substances which are responsive to non-visible wavelength(s), preferably UV or IR, the print layer optionally being invisible under white light illumination. For instance, the print layer could comprise a pair of inks which appear matched to one another under one illumination condition (e.g. white light) and different from one another under another illumination condition (e.g. UV light). Examples of suitable materials from which the print layer may be formed are disclosed in WO-A-2004/050376 and WO-A-2018/206936. In other examples, the print layer may comprises substances which emit red, green and blue light under illumination by a corresponding excitation waveband whereby a full colour version of the common image is exhibited. Examples of suitable substances are disclosed in WO-A-2020/030893.

The variation in height (and/or other dimensions/shape) of the cured material across the surface relief structure could be arbitrary or otherwise unrelated to the common image (the first set of features being conveyed primarily by the lateral configuration of the surface relief rather than its height). For instance, the features of the common image exhibited by the surface relief structure could all be conveyed by raised protrusions having the same height as one another, spaced by a base layer. However in preferred embodiments, the height, width, length and/or geometry of the surface relief structure varies in accordance with the common image. For instance, this can be used to link the tactile feel of the surface relief structure to certain part(s) of the common image or to emphasise a three-dimensional quality of the image. In an example, the common image could depict a three-dimensional object such as a portrait of a person, with features corresponding to parts of the object closer to the viewer corresponding to portions of the surface relief structure with greater height, and vice versa. The surface relief could comprise a single raised element of varying height, or multiple discrete elements which have different heights from one another and/or have a height which varies within one element.

As mentioned above, one or both constituents of the security device can be used to provide additional visual effects (preferably further security effects) beyond that provided by the common image along—for instance one or both constituents may continue outside the common image if desired. Hence in some preferred embodiments, the security device further comprises a second region in which one or both of the surface relief structure and the print layer are present, the second region being either laterally offset from and not overlapping the first region, or interlaced with the first region. In the second region, the surface relief structure and/or the print layer have different respective configurations from their arrangements in the first region so that the common image remains visibly distinct from the second region. For instance, the surface relief structure and the print layer preferably do not display aligned, matching features in the second region. There is no static common image exhibited by the two constituents in the second region (unlike in the first region).

It should be noted that the surface relief structure and/or the print layer may or may not be continuous between the first and second regions of the security device. For instance, there may be a gap between the surface relief structure in the first region and that in the second region. However, all of the surface relief structure (in both regions) will be produced in the same pass and from the same casting tool, preferably from the same curable material. The first and second regions may ultimately be disposed in one and the same window (or half-window) region on a security document, or could each be disposed in a different respective window (or half-window) region. In the latter cases, the respective window (or half-window) regions will be separated from one another by a less translucent area of the security document.

In preferred embodiments, in the second region the surface relief structure is present and forms any of: one or more optical elements such as focusing elements, facets, prisms, pyramids or caustic elements (preferably an array of such optical elements); a tactile structure or a matte structure. Advantageously, in the second region the print layer is present and forms any of: a background print, a visually uniform area, a colour-shifting layer, a printed colour filter, and an image array such as an array of microimages or an interlaced image. Providing the print layer in the form of a colour-shifting layer is particularly advantageous where the surface relief structure comprises an array of prism and the colour shifting layer is configured to interact with the array of prisms. Examples of suitable colour shifting layers which can be printed include layers incorporating liquid crystals (e.g. a liquid crystal pigment), interference pigments (including magnetically orientated interference pigments), pearlescent pigments, or photonic pigments.

It is especially advantageous if in the second region the surface relief structure forms an array of focusing elements and the print layer forms an image array located approximately in the focal plane of the focusing elements, and the array of focusing elements and the image array are configured so as to co-operate with one another to generate an optically variable effect. In this way an additional, optically variable, security device may be provided on the substrate in the same manufacturing steps as those in which the security device already described is provided. Optically variable means that the appearance of the device is different from different viewing angles, making it impossible to imitate by standard copying (e.g. photocopying or scanning).

The invention also provides a plurality of substantially identical security devices, each as described above, in each of which the respective surface relief structures and print layers have the same position relative to one another. This arises from the two constituents being accurately registered to one another during manufacture. By "same position" it is meant that the relative position of the respective surface relief structures and print layers varies by an amount less than can be detected by the naked eye between the security devices, if at all. For example, the translational variation in the machine or cross-direction may be +/−75 μm or less. The skew variation is preferably 1 degree or less, more preferably 0.1 degree or less, still preferably 0.05 degrees or less, most preferably 0.02 degrees or less. The plurality of security devices will typically be produced sequentially on the same manufacturing line and according to the same design—for instance the plurality may include a whole batch of security devices, or the whole of a print run. The plurality may include at least 10 security devices, more preferably at least 100 security devices. Each security device of the plurality may ultimately be located on a different security document. In preferred methods of manufacturing security devices in accordance with the invention, the formation of the surface relief structure and the printing of the print layer are performed in register with one another. Again, preferably any mis-register is less than can be seen with the naked eye. For example, the translational register in the machine or cross-direction may be +/−75 μm or less. The skew register is preferably 1 degree or less, more preferably 0.1 degree or less, still preferably 0.05 degrees or less, most preferably 0.02 degrees or less. This is preferably achieved by performing both steps in one in-line process on the same apparatus. The substrate could be processed in the form of a web but is more preferably in the form of separate sheets when the two steps are performed. Most preferably, the formation of the surface relief structure and the printing of the print layer are simultaneous, taking place at the same position along the machine direction, at the same time. This achieves the highest level of registration between the two constituent parts of the security device, since there can be no slippage or distortion of the substrate occurring after one step is performed and before the other (since there is no interval between them). Suitable apparatus for performing simultaneous cast-curing and printing on opposite sides of a substrate is disclosed in WO-A-2018/153840 and WO-A-2017/009616. The level of registration that can be provided by simultaneous casting and printing using the apparatus disclosed therein cannot be achieved on a web press or in two separate processes.

The print layer can be applied by any selected printing technique which can achieve the desired resolution and number of colours. Typically a flat printing technique will be selected, i.e. one which does not cause embossing of the substrate. In preferred embodiments, the print layer is printed by lithographic printing, but alternatively other print methods such as flexographic, screen, gravure or micro-intaglio printing could be used (none of which involve embossing the substrate). It will be understood that the print layer could comprise multiple print workings, laid down sequentially or (preferably) simultaneously, e.g. from a collection roller or blanket, each print working potentially being formed of a different material (e.g. a different ink colour).

Preferably, the surface relief structure is formed by cast-curing one or more at least semi-transparent curable material(s) on the first surface of the substrate. In preferred embodiments, the surface relief structure is cast-cured by:

providing a casting tool having a mould relief defined therein corresponding to the surface relief structure;

applying the one or more at least semi-transparent curable material(s) to the casting tool or to the substrate;

bringing the casting tool and the substrate into contact with the one or more at least semi-transparent curable material(s) therebetween, to thereby form (i.e. shape) the one or more at least semi-transparent curable material(s) into the surface relief structure; and during and/or after the contact, curing the one or more at least semi-transparent curable material(s) so as to retain the surface relief structure.

The mode of curing will depend on the type of curable material used. In preferred examples the material is radiation-curable (e.g. UV-curable) and the curing step(s) will involve irradiating the material with appropriate wavelength radiation so as to cause cross-linking of the material.

In many preferred implementations, the at least semi-transparent curable material(s) are applied to the mould relief of the casting tool so as to substantially completely fill recesses of the mould relief and form a layer of the at least semi-transparent curable material(s) over elevations of the relief structure. Substantially the whole body of curable material (including the parts inside the recesses and the layer over the elevations) will be cured and transferred onto the substrate. In such implementations there is no wiping or doctoring step which would otherwise remove the curable material(s) from the elevations.

However, in alternative examples, the curable material(s) may be applied only to recesses of the relief structure of the casting tool, preferably through the use of a removal means such as a doctor blade, and the method further comprises, subsequent to applying the one or more cured materials to the relief structure and before bringing the substrate and casting tool together, applying a further layer of the or another curable material(s) to substantially the whole surface of the casting tool so as to improve the retention of the cured material(s) on the substrate. In such examples, the further layer acts to improve the adhesion of the curable material(s) —which are located only within the recesses of the casting tool relief structure—to the substrate. As the further layer is applied to substantially the whole surface of the casting tool (i.e. over the filled recesses of the relief structure in the surface of the tool and the elevations between them), the resulting surface relief structure comprises an integral base layer as described above. The curable material of the further layer may be the same curable material or materials used to form the elements of the surface relief structure, or may be a different curable material.

The manufacturing method can be configured to provide the security device with any of the preferred features described above.

The present invention further provides a security document comprising a document substrate and a security device thereon, the security device being in accordance with any of the preceding claims, wherein the document substrate may or may not act as the substrate of the security device, the document substrate preferably comprising paper, polymer, cellulose or a hybrid thereof. For instance, a suitable substrate material formed of regenerated cellulose is disclosed in WO-A-2020156655. It will be understood that the security document could therefore include a single substrate, which acts as both the document substrate (i.e. the self-supporting sheet forming the body of the document) and as the security device substrate (i.e. that carrying the surface relief structure on one surface and the print layer on the other). In this case the document substrate will need to be transparent or translucent, at least at the location of the security device. The whole document substrate may be sufficiently translucent for this purpose, or it may include a window/half-window region for this reason. Alternatively, the security document could comprise two substrates—a document substrate and a security device substrate which carries the security device and which is affixed to or incorporated into the document substrate. In this case, the document substrate could be transparent, translucent or opaque.

The common image could be located anywhere on the security document—entirely inside or entirely outside a window/half-window region (if one is provided), or partially inside and partially outside a window/half-window region (if one is provided). In preferred embodiments, the first region of the security device is located at least in part in a window or half-window region of the document substrate, which has lower optical density than the surroundings thereof. In other preferred embodiments, the document substrate is translucent and the first region of the security device is located at least in part in a non-window region of the document substrate. In cases where the security device is not formed directly on the document substrate, the substrate of the security device is preferably affixed to or incorporated into the document substrate, preferably over a transparent or translucent region of the document substrate optionally formed as an aperture.

The appearance of the common image may be different in reflected vs. transmitted light, and/or from either side of the security document and in preferred implementations this may be influenced by the opacity of the security document at the location of the security device. For instance, parts of the same security device may provide different sets of appearances depending on whether they are located in a (transparent) window region, a (highly) translucent half window region or a (less translucent or opaque) non-window region. This can be made use of to create a more complex combination of appearances by providing several of these different arrangements on one security document. Hence, preferably, the first region includes parts located respectively in at least two of: a window region of the document substrate, a half-window region of the document substrate and a non-window region of the document substrate.

Similarly, it may be desirable to provide more than one security device of the sort disclosed above on a security document, to achieve a more complex combined effect. Preferably therefore the security document comprises at least two security devices, each as disclosed above, wherein the at least two security devices are respectively located at least in part in at least two of: a window region of the document substrate, a half-window region of the document substrate and a non-window region of the document substrate.

The document substrate could be of any type, including fibrous substrates such as paper or cellulose (e.g. as disclosed in WO-A-2020156655) or non-fibrous substrates such as polymer (or a hybrid of both). In preferred examples, the document substrate comprises a core polymer substrate with at least one opacifying layer disposed on one or both surfaces of the core polymer substrate, optional gaps in one or more of the opacifiying layers forming window or half-window regions of the document substrate. For example the security document could be a polymer banknote. The opacifying layers are preferably of non-fibrous materials such as a coating of binder containing light-scatting pigments, preferably white, off-white or grey in colour (such as $TiO_2$).

In some embodiments, the document substrate may further comprise an integral print mark, preferably located between at least one of the opacifying layers and the core polymer substrate. "Print marks" (unlike the print layer described above) are incorporated into the substrate during its production rather than during its later processing into security documents. For instance, the print mark may be applied during the same process as that by which the opacifying layers are applied, e.g. gravure printing. The print mark is integral to the document substrate. The integral print mark could be unrelated to the presently disclosed security device. However, preferably, the integral print mark is defined in accordance with the common image and is in alignment with the surface relief structure and the print layer, the integral print mark exhibiting a third set of feature(s) of the common image, whereby the common image is exhibited by the surface relief structure, the print layer and the integral print mark in combination with one another. In another embodiment, the print mark may exhibit another copy of the common image (or a version thereof, e.g. the same image but in a different colour) but is not aligned with the security device—for instance it could be located in another part of the security document. This allows easy checking between the print mark and the security device.

Preferably, the security document is any of: a banknote, passport, identification document, identification card, bank card, driving licence, visa, stamp, cheque or certificate.

The invention further provides a method of manufacturing a security document, comprising providing a document substrate and either forming a security device on the document substrate or forming a security device on a security device substrate, and then applying the security device substrate to or incorporating the security device substrate into the document substrate, in each case using the method described above to manufacture the security device. The method may be configured to provide the security document with any of the preferred features described above.

BRIEF DESCRIPTION OF THE DRAWINGS

Examples of security devices and security documents in accordance with the present invention, as well as methods for their manufacture, will now be described with reference to the accompanying drawings, in which.

DETAILED DESCRIPTION OF THE DRAWINGS

The following description will focus on security devices formed directly on document substrates ultimately used as the basis for security documents such as banknotes, passports, certificates, licences, ID cards and the like. In many cases the security device is depicted as being arranged in a window region of the document substrate. However, as will be explained with reference to FIG. 32, this is not essential and the device could alternatively or additionally be located in a half-window or non-window region (or any mixture of such regions). Likewise, as will be explained with reference to FIG. 34, all embodiments of the security device could alternatively be formed on a separate substrate for which is applied to (or incorporated into) a security document. The security device could be formed on the separate substrate before it is joined with the security document substrate and/or after.

Figure 1A:
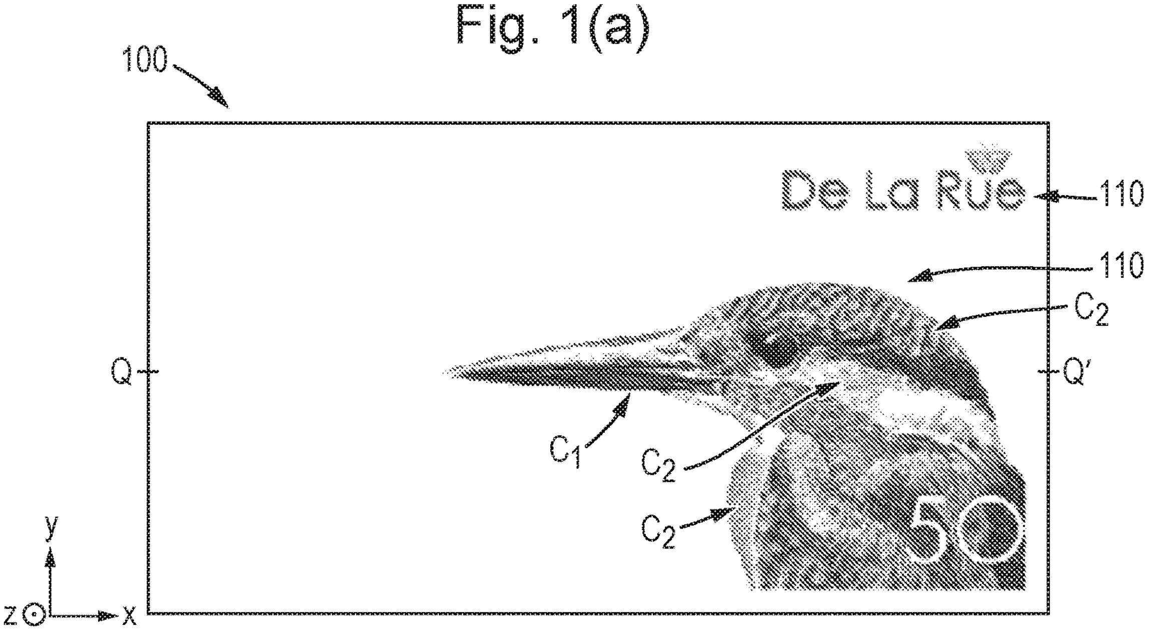
FIGS. 1(*a*) and 1(*b*) show a comparative example of a security document in plan view and cross-section respectively, FIG. 1(*c*) showing an enlarged detail of the cross-section of FIG. 1(*b*)
Figure 1B:
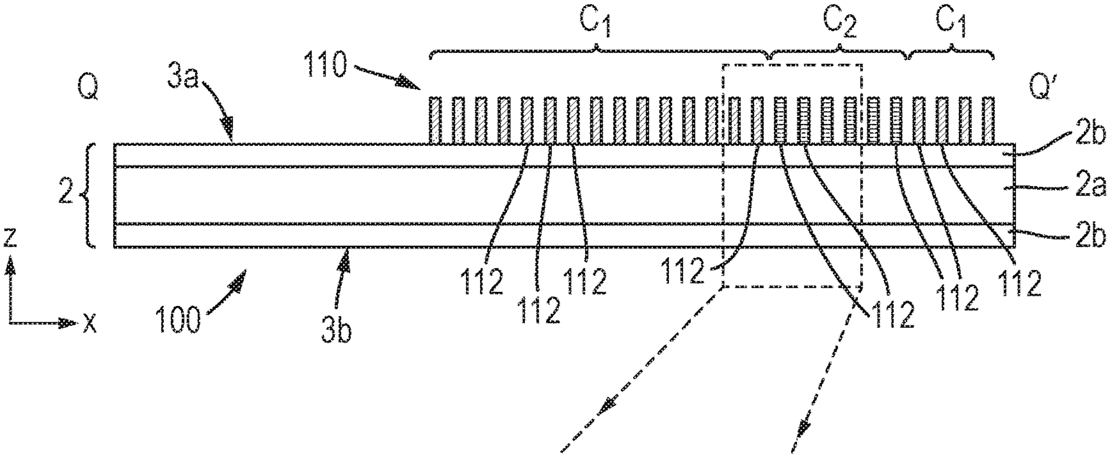
Figure 1C:
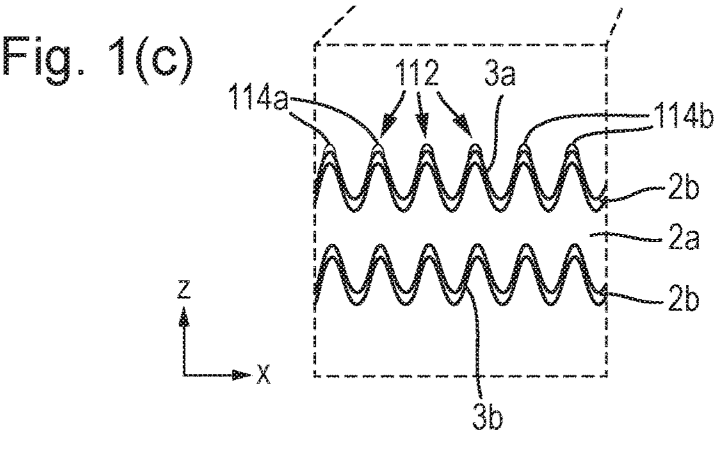

For comparison, FIG. 1 shows an example of a conventional security device in the form of an intaglio print 110 on a security document 100. FIG. 1(*a*) shows the security document 100 in plan view and FIG. 1(*b*) shows a schematic cross-section along the line Q-Q'. It should be noted that, for simplicity, FIG. 1(*b*) does not show the embossed nature of the substrate which is caused by intaglio printing and will be present in practice. This is shown in the enlarged detail of FIG. 1(*c*). In this example, the intaglio print is shown as being formed on a document substrate 2 formed of an inner core substrate 2*a*, which may be a polymer material such as BOPP, and outer opacifying layers 2*b*, such as white ink. This is a typical construction of a polymer banknote substrate. However, intaglio prints 110 can be formed on any document substrate, including paper substrates.

As shown in FIG. 1(*a*), here the intaglio print 110 comprises a linework image of a kingfisher and a line of text reading "De La Rue" with a logo above it. The image of the kingfisher is multi-tonal, being made up of an array of image elements 112 in the form of spaced inked lines of varying size and shape, configured as necessary to convey the features of the image. The image is formed in two colours $C_1$ (e.g. dark green) and $C_2$ (e.g. orange). The intaglio process involves providing a printing plate into which is etched all the lines defining the desired image elements. A first ink 114*a* of colour $C_1$ and a second ink 114*b* of colour $C_2$ are applied to respective regions of the printing plate corresponding to the areas in which the two colours are required. The inks are forced into the etched lines and cleaned off the intervening surfaces of the plate using a wiper blade or similar. The printing plate is then applied to a substrate 2 against an impression roller at high pressure, forcing the substrate 2 into the etched lines, thereby causing embossing of the substrate. Upon separation, the inks 114*a*, 114*b* are transferred from the printing plate onto the tops of the raised elements of the now-embossed substrate 2. The raised elements and the inks carried thereon form the image elements 112 of the intaglio print 110. The embossed nature of the print 110 results in a tactile quality.

Whilst it is possible to form an intaglio print having more than one colour, as illustrated in FIG. 1, the design options are limited. Due to the composition of intaglio inks (which are very thick and paste-like) and the method of ink application to the intaglio plate, placement of individual inks on the intaglio plate is very difficult. The high pressure required to push the thick ink paste into intaglio plate recesses prior to printing makes the process difficult to control and limits placement of individual inks to blocks (groups) of recesses rather than individual recesses. The ink will invariably spread when being pushed into recesses and merge with adjacent inks. The wiping effect of cleaning the non-recess areas of the plate as part of the intaglio process also contributes to merging. Due to these reasons, each area of colour either needs to be of sufficiently large size so that merged regions are a minor part of the whole printed region (to appear as a single colour to the viewer) or sufficiently separated from the other colours to minimise merging. As such, it is not possible to place different colours closely together or to arrange different colours at high resolution such as would be required to exhibit a full colour image, e.g. of photographic quality. The number of colours which can be exhibited in an image is also limited, since it is not possible to spatially combine inks in a controlled manner as is necessary to provide the full spectrum of colours via additive or subtractive colour mixing.

Figure 2A:
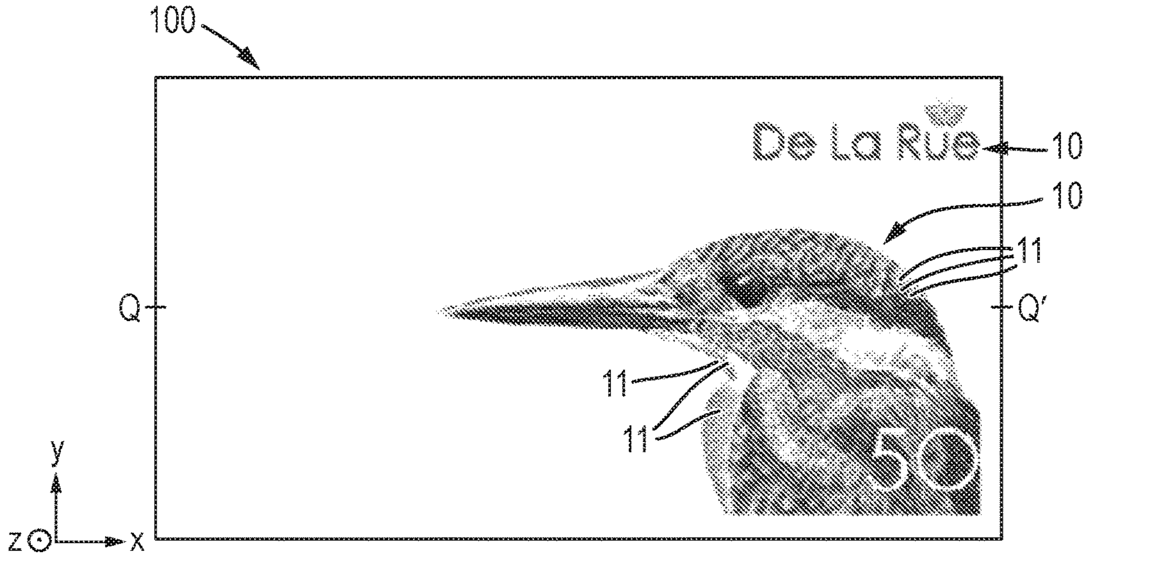
FIGS. 2(*a*) and 2(*b*) show a first embodiment of a security document having a security device in accordance with the invention, in plan view and cross-section respectively.
Figure 2B:
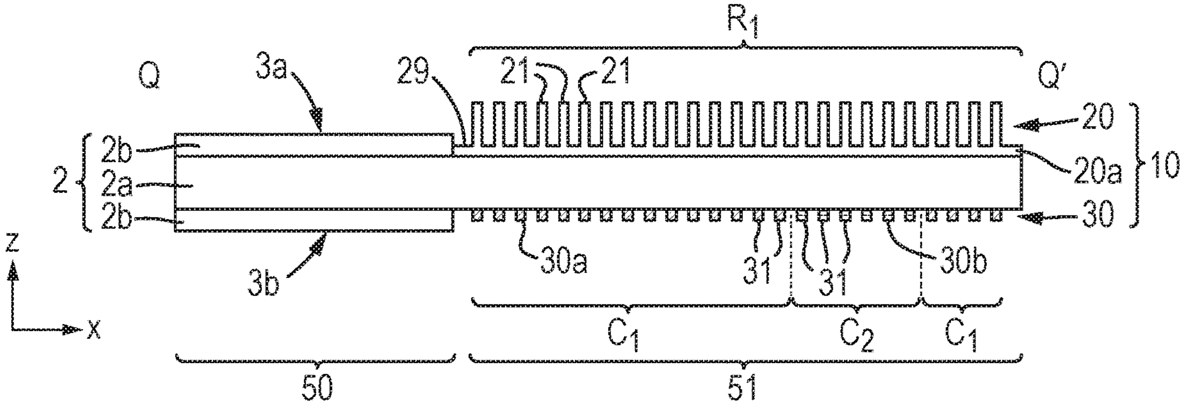

FIG. 2 shows a first embodiment of a security document 100 having a security device 10 in accordance with the present invention. Again, in this example the document substrate 2 is shown as a multilayer substrate having a polymer core substrate 2*a*, which is transparent (e.g. BOPP), and opacifying layers 2*b* on either side, the security device 10 being placed in a window region 51 thereof where the opacifying layers 2*b* are absent on both sides. However, this is not essential and the security device 10 could be formed on any type of substrate and (for example) in a window region 51 or a non-window region 50, provided there is sufficient transparency/translucence as explained below. Other arrangements will also be exemplified below.

The security device 10 comprises a surface relief structure 20 and a print layer 30 which overlap and are registered to one another. The surface relief structure 20 is formed of a body of cured material 20*a* having a profile of varying height (parallel to the z-axis) and is disposed on a first surface 3*a* of the substrate 2. The surface relief structure could comprise a single raised element or multiple discrete raised elements. In this example the cured material 20*a* forming the surface relief structure 20 is transparent and colourless. The print layer 30 is a flat print disposed on the opposite second surface 3*b* of the substrate 2. The print layer 30 could be single-coloured or multi-coloured. In this example, it is formed of two materials 30*a*, 30*b* (e.g. inks) having different respective colours $C_1$ and $C_2$. In a first region $R_1$ of the substrate, the surface relief structure 20 and the print layer 30 are each configured so that in combination they exhibit a common image—i.e. a composite macro-image—which here is the same linework image of a kingfisher discussed in relation to FIG. 1, made up of an array of spaced image elements 11 which vary in size, shape and/or spacing across the array so as to convey the features of the multitonal image (e.g. the kingfisher's head, beak, eye, body, the number "50", etc.). The image elements 11 are preferably of such a size that they are individually discernible under close inspection or low magnification (e.g. at least 50 μm, more preferably at least 150 μm in width).

In this example, both the surface relief structure 20 and the print layer 30 are each configured to exhibit all the features of the common image. As such, they are each configured to exhibit the whole desired array of image elements 11 and are each defined in accordance with one and the same image. In surface relief structure 20, the image elements 11 are defined by corresponding raised elements (protrusions) 21 and in print layer 30 the image elements 11 are defined by corresponding print elements 31. The two constituents (i.e. surface relief structure 10 and print layer 30) are relatively positioned so that each raised element 21 is aligned over one of the print elements 31. When viewed in combination, the print layer 30 therefore gives colour to the common image while the surface relief structure 20 provides tactility and contributes to its appearance (even where formed by a colourless clear material, the reflective surface of the surface relief structure 20 will be apparent).

It will be seen from FIG. 2(*b*) that the raised elements 21 of surface relief structure 20 are joined to one another by a base layer 29 of the same cured material 20*a*, which extends between each of the raised elements 21 and around the periphery of the surface relief structure 20 (typically by only a small distance, e.g. 0.01 mm to 5 mm). The base layer 29 is an artefact of the cast-curing process by which the surface relief structure 20 is formed. The height of the base layer 29 can be varied across the security device 10 if desired.

The FIG. 2 embodiment results in a security device 10 which mimics the appearance and tactile feel of the intaglio print 110 described with reference to FIG. 1, albeit formed via a different method and having a different structure. However, since the print layer 20 can now be applied by a flat printing process (such as offset), it can be formed at higher resolution, and exhibit any number of colours with much better colour placement achievable than is possible in an intaglio print. This means that design freedom is greatly increased, allowing for a greater variety of visual effects and more complex designs (and hence a higher security level) as will be described below.

While in many implementations a complex common image may be selected (such as the kingfisher shown in FIGS. 1 and 2, or a portrait, photograph etc.), the presently disclosed technique is equally well suited to the display of simpler images such as geometric shapes, logos, alphanumeric text, typographic symbols and the like. The common image C.I. may or may not comprise an array of spaced image elements as in the previous example. Hence, FIG. 3(*a*) illustrates an embodiment of a security device 10 in which the common image C.I. features the digit "5", conveyed by a single continuous block in the requisite shape. The image is of a suitable size to be read easily by the naked eye, e.g. several mm in width. As before, the security device 10 comprises a surface relief structure 20 formed of transparent curable material 20*a* on one surface 3*a* of the substrate 2, and a print layer 30 formed of an ink 30*a* (e.g. red ink) on the opposite surface 3*b*. Both the surface relief structure 20 and the print layer 30 are configured to exhibit the same feature, namely the digit "5", in overlapping alignment with one another. The surface relief structure 20 comprises a raised protrusion 28 having a lateral extent corresponding to the shape of the digit "5" and surrounded by a base layer 29 extending around its periphery. The print layer 30 likewise comprises a continuous area of ink 30*a* having the same lateral extent as raised protrusion 28 in the shape of the digit "5".

Figure 3A:
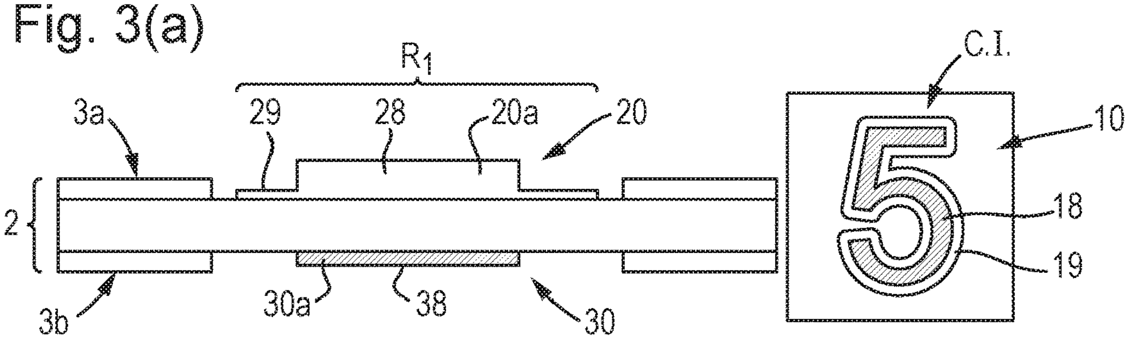
FIGS. 3(*a*), 3(*b*), 4(*a*) and 4(*b*) show further embodiments of security devices in accordance with the invention, each in cross-section and plan view.
Figure 3B:
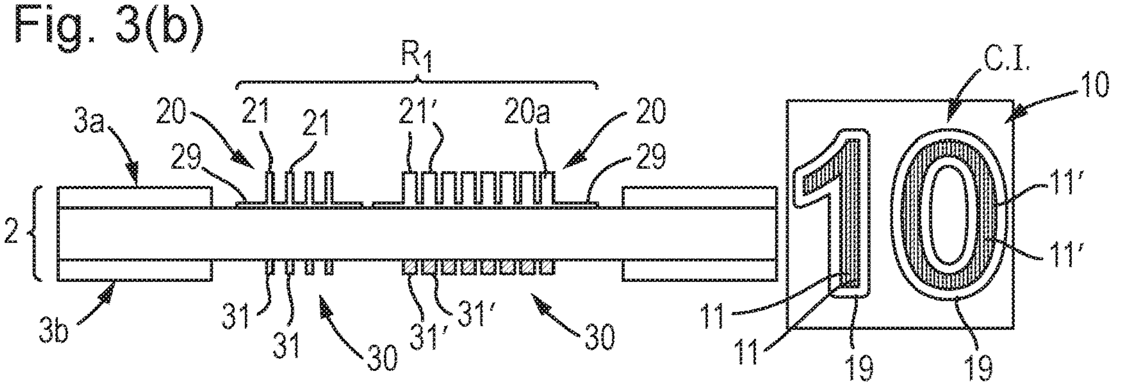

In combination, the surface relief structure 20 and print layer 30 therefore display a common image C.I. in the form of a uniformly coloured digit "5" (labelled with reference numeral 18 in FIG. 3(*a*)) with a colourless peripheral region 19 surrounding it, corresponding to the base layer 29. Since there is an inherent limitation on the lateral size of individual intaglio elements (which limitation is not encountered in the present invention), the resulting security device can be configured to have a different tactile feel from that which would be achieved via intaglio, e.g. a wide, smooth raised area.

Alternatively, the security device can be designed to more closely mimic an intaglio print by using an array of spaced image elements 11 to convey features of the image. An example is shown in FIG. 3(*b*), which embodiment is substantially as already described with reference to FIG. 3(*a*). However in this case the common image C.I. is of the digit "10" and each feature of the image (i.e. the "1" and the "0") is formed of a series of spaced line elements 11, 11'. In this example the line elements 11 forming the "1" are narrower than the line elements forming the "0" so the two features will appear with different colour intensities (the "1" will appear lighter than the "0". There are two surface relief structures 20, each formed of the same colourless cured material 20*a*, one corresponding to the digit "1" and the other to the digit "0". Each surface relief structure comprises an array of raised elements 21 corresponding to the line elements 11, 11' and a base layer 29. On the opposite surface are provided two print layers 30 formed of an ink 30*a* and arranged as print elements 31, 31' in alignment with the corresponding raised elements 21, 21'. The resulting common image will appear as the number "10" in a colour determined by that of ink 30*a* which is lighter in the "1" than the "0". Under close inspection the presence of the line elements will be discernible. Each digit "1" and "0" has a peripheral border 19 corresponding to the base layer 29.

Figure 4A:
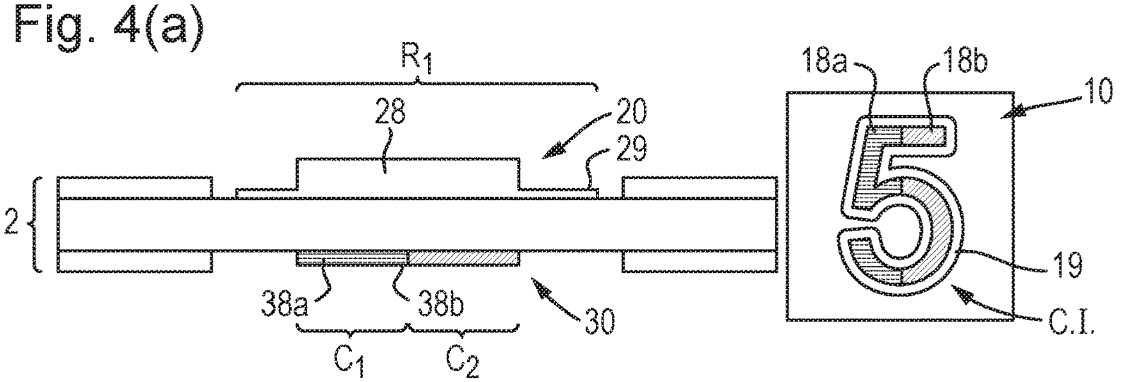
Figure 4B:
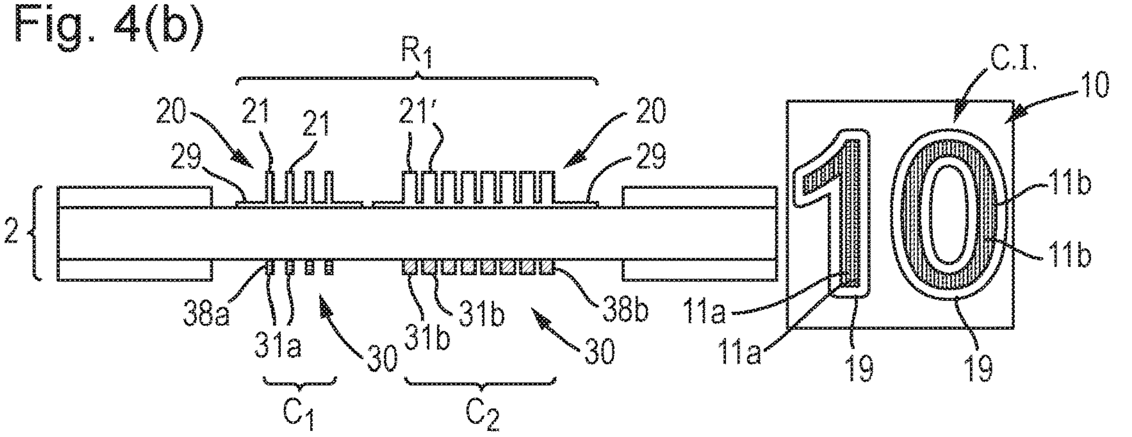

FIGS. 4(*a*) and 4(*b*) show embodiments corresponding to those of FIGS. 3(*a*) and 3(*b*) respectively except here the print layers 30 are each formed of two colours. Thus, in the FIG. 4(*a*) embodiment the print layer 30 comprises two inks 38*a*, 38*b* in different respective colours $C_1$, $C_2$. The first ink 38*a* is arranged so as to cover an area corresponding to the left half 18*a* of the digit "5" in the common image C.I. and the second ink 38*b* is arranged so as to cover an area corresponding to the right half 18*b* of the digit "5". The print layer 30 as a whole therefore exhibits all the features of the common image (i.e. the complete digit "5") as before, but in two colours. Similarly, in the FIG. 4(*b*) example, the print elements 31*a* forming the digit "1" are provided in a first ink 38*a* of a first colour $C_1$ while the print elements 31*b* forming the digit "0" are provided in a second ink 38*b* of a second colour $C_2$. The common images C.I. exhibited by the security devices in FIGS. 4(*a*) and 4(*b*) are therefore multi-coloured images. It will be appreciated that three or more different colours could readily be exhibited by appropriate provision of inks in the print layer 30.

Figure 5A:
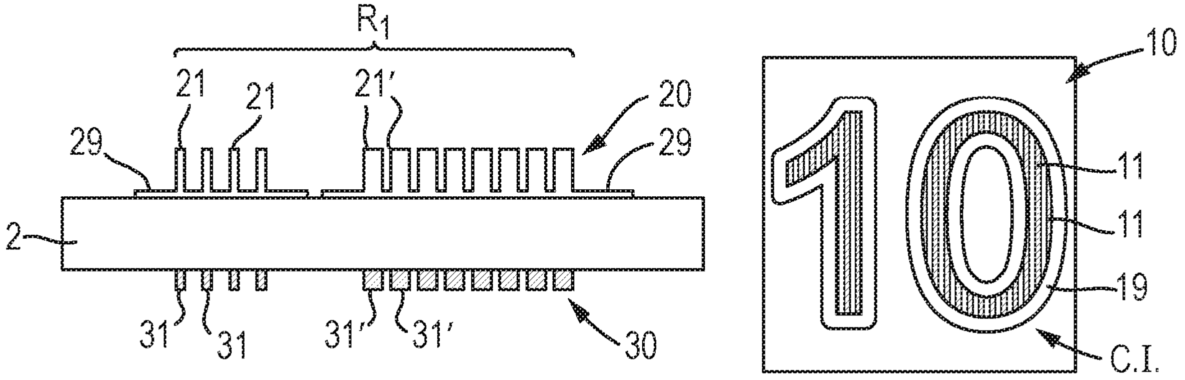
FIGS. 5(*a*) to (*c*) show three variants of a further embodiment of a security device in accordance with the invention, each in cross-section and plan view.
Figure 5B:
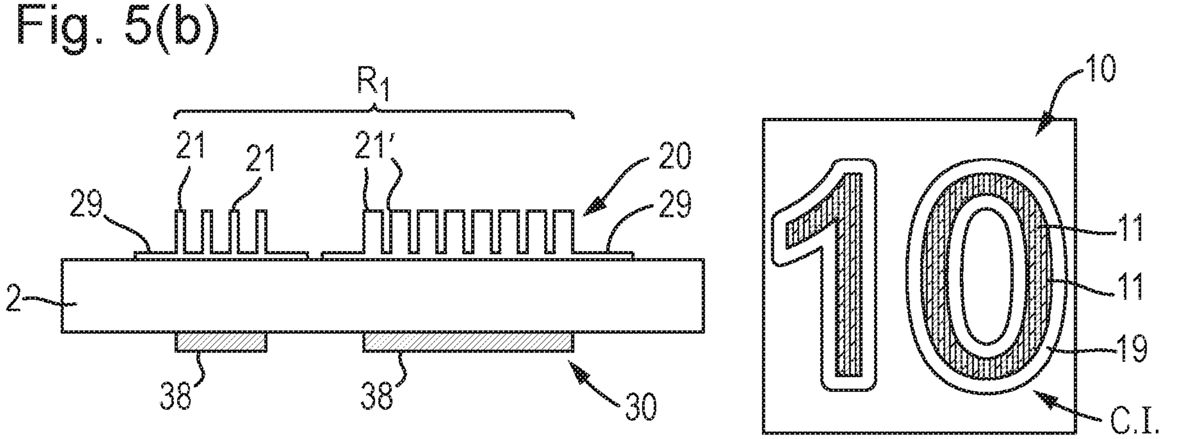
Figure 5C:
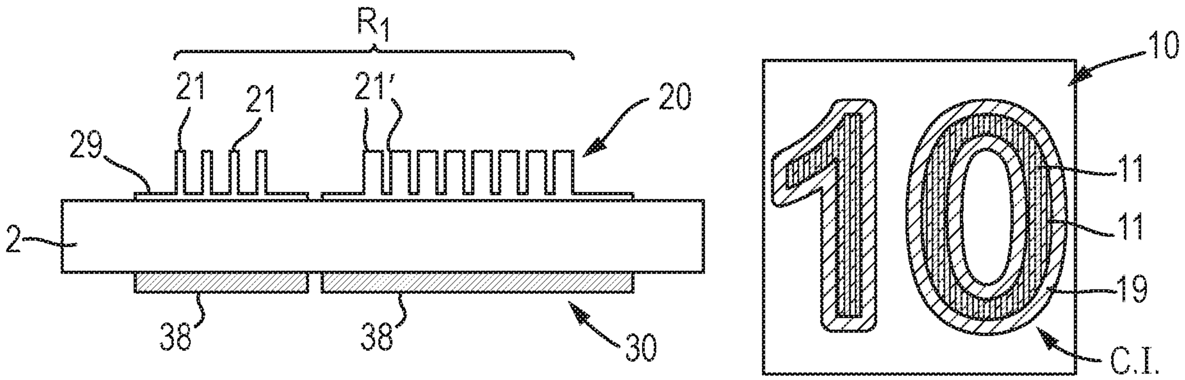
Figure 6A:
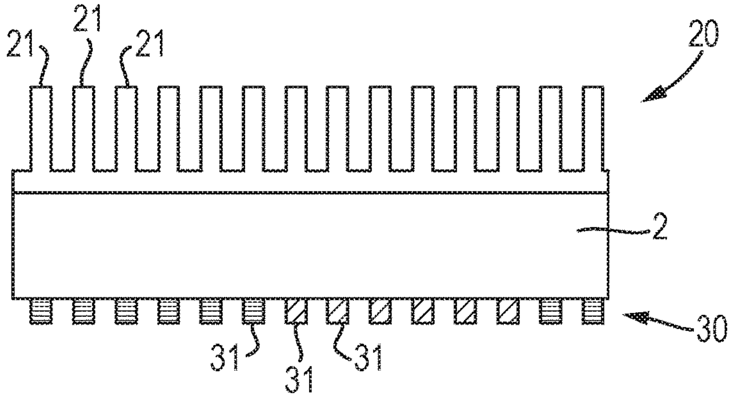
FIG. 6(*a*) shows another embodiment of a security device in cross-section, with FIGS. 6(*b*), (*c*) and (*d*) depicting three different variants of the print layer in plan view.
Figure 6B:
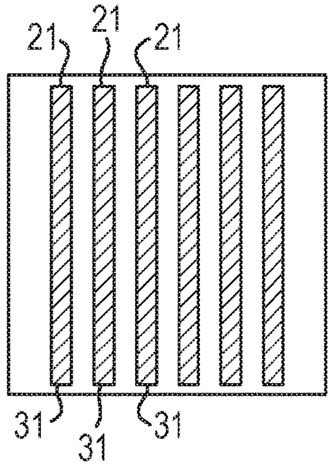
Figure 6C:
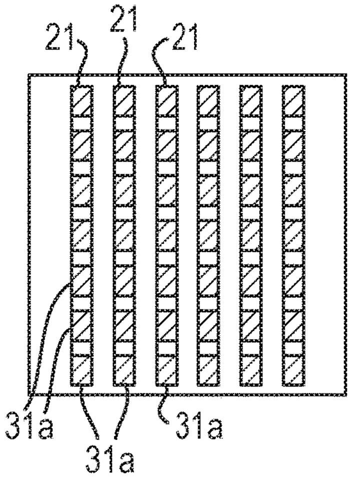
Figure 6D:
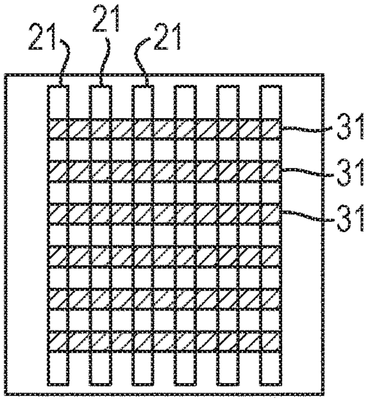

In the previous examples, the surface relief structure 20 and the print layer 30 have matched one another in the sense that the print layer is arranged such that ink is present in locations corresponding to raised protrusions of the surface relief structure 20, and not elsewhere. However this is not essential and different visual effects can be achieved by varying the relative lateral extents of the two constituent parts. The features of the common image which each conveys must of course still be aligned. FIGS. 5(*a*) to (*c*) illustrate some examples. FIG. 5(*a*) shows again the embodiment of FIG. 3(*b*), for ease of comparison with FIGS. 5(*b*) and 5(*c*). (It will be noted here that the details of substrate 2 are not shown—it can take any form provided it is not opaque). FIG. 5(*b*) shows a variant in which the print layer 30 is no longer provided in the form of an array of print elements 31, 31' but rather as two continuous areas of ink 38, the first in the shape of the digit "1" and the second in the shape of the digit "0". The result will be a common image C.I. showing the digit "10" with a solid fill of colour, although the image elements 11 will still be visible (at least at some viewing angles) due to the surface relief structure 20. As before, the digit will have a colourless peripheral border region 19. FIG. 5(*c*) shows a further variant in which the two ink areas 38 are laterally extended so that their outer bounds match those of the two areas of cured material, including the peripheral region formed by base layer 29. The common image C.I. exhibited by the security device will now also exhibit a coloured peripheral border 19.

It should be noted that while the print layer 30 can be configured to exactly match (or "mirror") the cast structure, as in some of the embodiments above, this is not essential. FIG. 6 illustrates some options. FIG. 6(*a*) shows an example of a security device in cross-section, which could be a portion of any of the devices described above (e.g. a portion of the multi-tonal image shown in FIG. 2). As shown in the plan view of FIG. 6(*b*), in a first variant the raised protrusions 21 of the cured surface relief structure 20 and the printed image elements 31 could be configured to match one another and be aligned. Alternatively, as shown in FIG. 6(*c*), the printed image elements could comprise an array of dots or other elements 31*a*, arranged in a spaced manner along the paths of the raised protrusions 21. Alternatively still, the printed elements 31 need not have the same orientation as the raised protrusions 21 but could have some other arrangement such as the orthogonal line pattern shown in FIG. 6(*d*).

Whilst in the above embodiments the security device is depicted as located in a window region on the substrate 2, and visible from both sides, this is not essential. In another embodiment, shown in FIG. 7, there may be a subsequent print or other layer 70 applied over the print layer 30. The FIG. 7 embodiment is otherwise the same as the FIG. 3(*b*) embodiment. This layer 70 could be, for instance, an ink or other coating (e.g. a screen printed white ink) or an applied feature such as a foil. This subsequent process could make the substrate semi-transparent or opaque in the area of the security device. Such an additional layer 70 over the print layer 30 could be provided in any of the embodiments disclosed herein.

Figure 8:
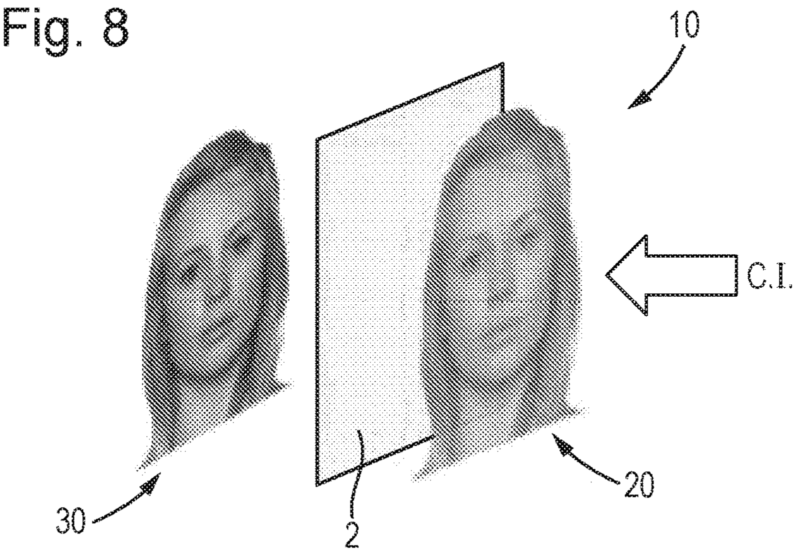
FIG. 8 schematically depicts another example of a security device in accordance with the invention, in an exploded view.

FIG. 8 shows a further embodiment of a security device in an exploded view so that the two-dimensional configuration of each constituent can be illustrated. In FIG. 8, a RGB (red green blue) image 30 is printed on one side of a transparent substrate 2, e.g. by offset printing. For instance, this may be a window region of a polymer security document. On the other side of the transparent substrate the same image is provided in the form of a colourless relief structure 20, formed by cast curing. The relief structure is defined in accordance with the same image, e.g. by sharing the same periphery of the image and/or by replicating features within the image via different heights of the casting, for example. The casting could be a single unit of cured material (optionally varying in height) or could comprise multiple spaced elements, e.g. dots or lines, to produce a more tactile feel (although a base layer will typically still be present between them). When viewed through the casting, the full colour image C.I. is seen by the user and a tactile feel is provided to the image by the casting. The two components 20, 30 are in exact registration with one another.

Figure 9A:
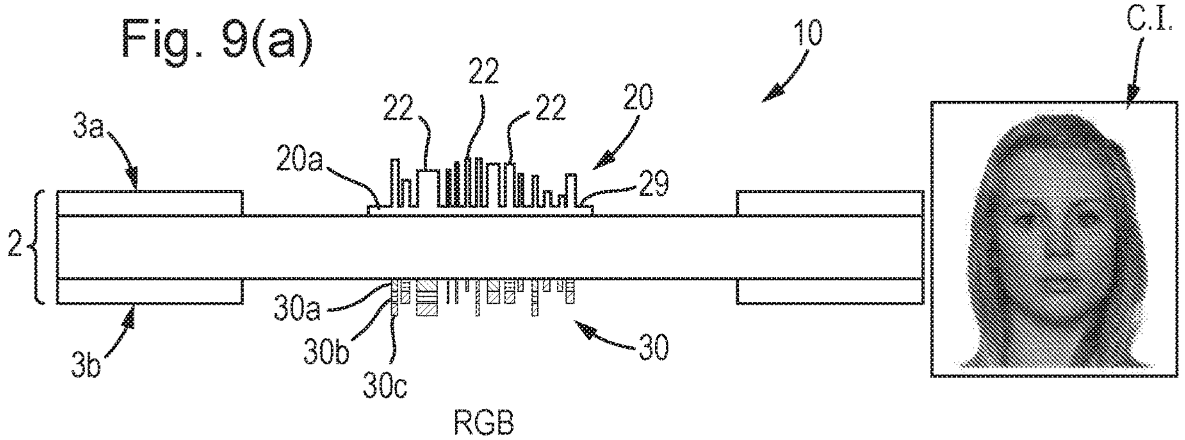
FIG. 9(*a*) shows a further embodiment of a security device in accordance with the invention in cross-section and plan view, FIG. 9(*b*) showing an exploded view of the security device.
Figure 9B:
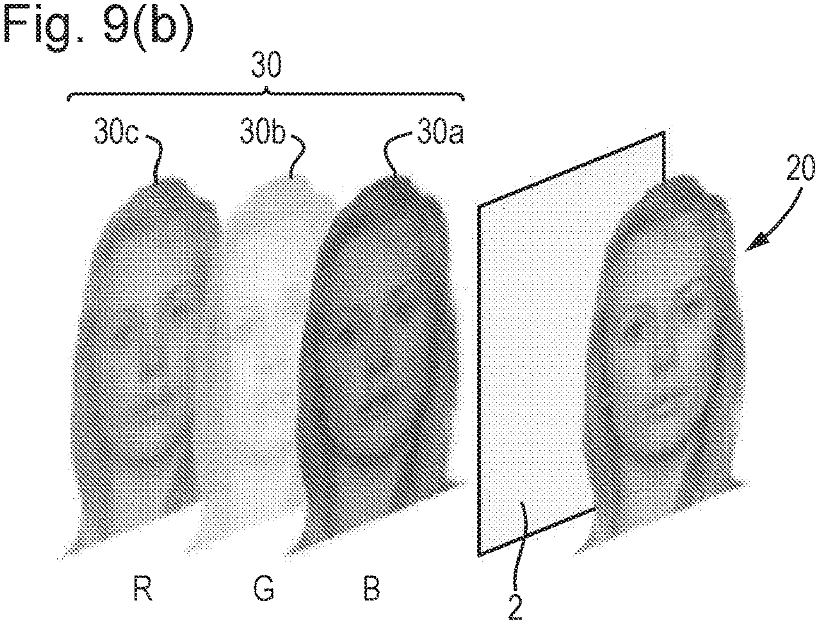

FIGS. 9(*a*) and 9(*b*) depict a further embodiment based on the same concept as that of the FIG. 8 embodiment, in more detail. As shown in FIG. 9(*a*), a surface relief structure 20 formed of a cured material 20*a* is disposed on a first surface 3*a* of a substrate 2, in a transparent part thereof. A print layer 30 is provided on the opposite surface 3*b* and here is a RGB (red green blue) print formed of three corresponding inks 30*a*, 30*b*, 30*c*. It should be noted that while in the Figure the inks appear stacked on top of one another, giving the impression of height, this is purely for clarity of illustration and in practice the print layer 30 will usually be substantially flat (an exception is where the print layer 30 is formed by micro-intaglio). More generally, the print layer 30 may comprise any of: abutting blocks of colour, overlapping blocks of colour, spaced elements (as shown), or standard halftone images elements. The surface relief structure 20 and the print layer 30 are in overlapping alignment and are manufactured in register to one another. Both the surface relief structure 20 and the print layer 30 are configured to exhibit features of the same common image C.I., which here is a full colour photographic portrait (e.g. of the security document owner). Thus the print layer 30 will typically include red, green and blue components of the image (shown separated in FIG. 9(*b*)) which may be applied in consecutive print workings or simultaneously (having been collected on a blanket or offset roller first).

The surface relief structure 20 conveys features of the common image through the provision of one or more raised protrusions 22, which may or may not match the arrangement of inks in the print layer (but the features of the image conveyed by each constituent will be aligned). For example, the surface relief structure 20 could include raised protrusions across an area bounded by the outline of the person's head, so that the area of tactility matches the portrait. Alternatively, the nature of the surface relief could vary such that different features of the portrait correspond to areas of different tactility. For instance, the surface relief structure could be configured such that an area corresponding to the person's hair feels rough as compared with the area corresponding to their face, which feels relatively smooth. In another example, the height of the surface relief structure could be configured to vary in accordance with the common image. For example, those features of the portrait which would be closer to the viewer in real life (such as the person's nose) could correspond to raised elements of greater height, or the surface relief structure could comprise a single raised element having a surface of varying height which is a 3D contour of the person's face. The surface relief structure 20 could additionally or alternatively be formed as a screened version of the common image, i.e. having an array of spaced raised elements which varying in size, shape or spacing across the array so as to give rise to a multitonal version of the image, which will be visible due to the reflective nature of the cured material 20*a*. A base layer 29 of lesser height than the protrusion(s) 22 will be present as before and will form a colourless border region, not shown.

Figure 10A:
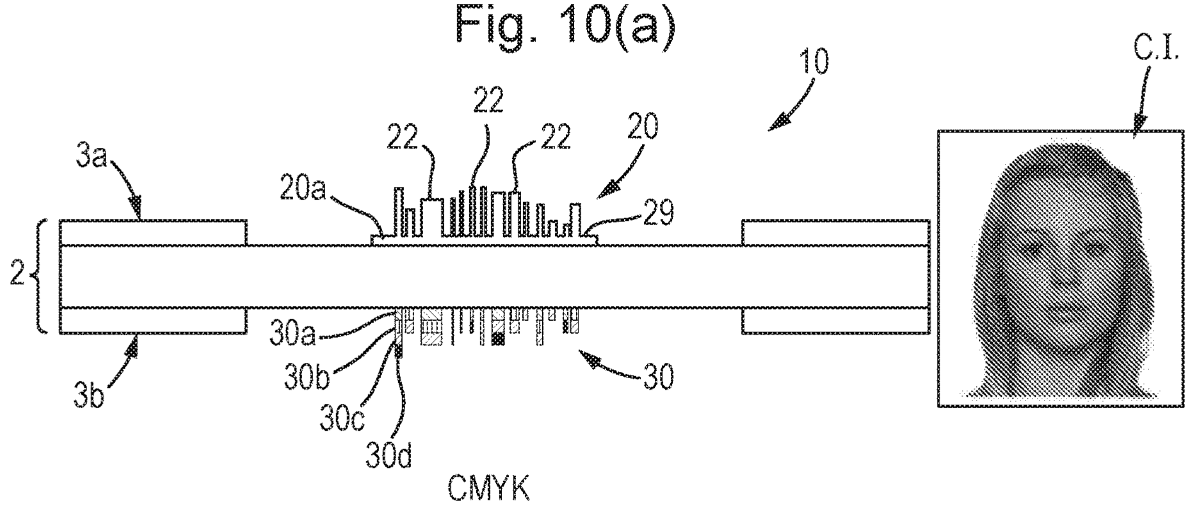
FIG. 10(*a*) shows a further embodiment of a security device in accordance with the invention in cross-section and plan view, FIG. 10(*b*) showing an exploded view of the security device.
Figure 10B:
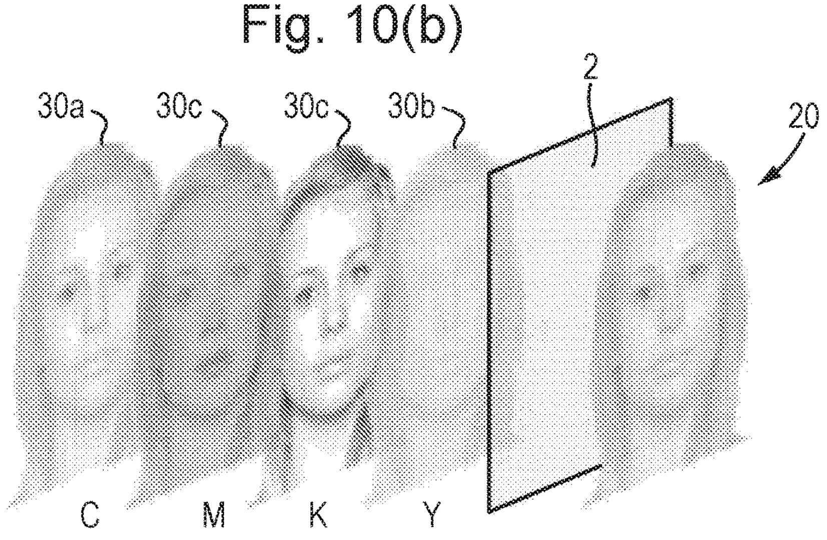
Figure 11:
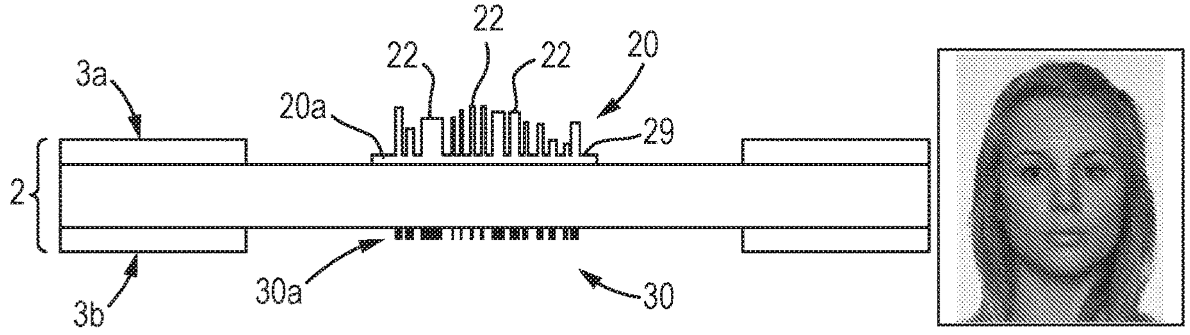
FIG. 11 shows a further embodiment of a security device in accordance with the invention in cross-section and plan view.

The FIG. 10 embodiment is substantially the same as the FIG. 9 embodiment, except that the print layer 30 is a CMYK (cyan, magenta, yellow, black) print formed of four corresponding inks 30*a*, 30*b*, 30*c*, 30*d*. Once again, a tactile, full colour photographic portrait is formed as the common image C.I. Of course, monochromatic (e.g. greyscale) images can also be formed, as shown in the FIG. 11 embodiment. This is identical to the embodiments of FIGS. 9 and 10, except that here the print layer 30 is a monochromatic (e.g. greyscale) version of the photographic portrait, formed in a single ink 30*a* (e.g. black).

In the embodiments presented so far, the surface relief structure 20 and the print layer 30 each exhibit the whole common image C.I. —i.e. the same set of features as one another. However, this is not essential and in other embodiments each of the constituents may contribute a different set of features of the common image to the final appearance of the device. The sets of features may or may not include one or more features which are common to both. FIGS. 12 to 15 provide some examples in which the two sets of features are different.

Figure 12:
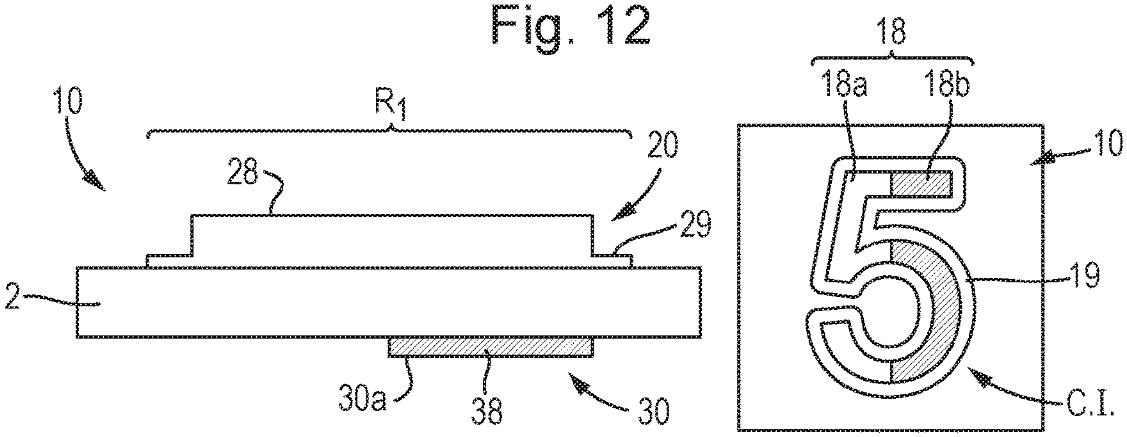
FIGS. 12 to 14 show further embodiments of security devices in accordance with the invention, each in cross-section and plan view.

The FIG. 12 embodiment is a variant of the embodiments already described with reference to FIGS. 3(*a*) and 4(*a*), the only difference lying in the configuration of print layer 30. In the FIG. 12 embodiment, the print layer 30 is configured to exhibit only the features defining the right half of the digit "5" in the common image C.I. The print layer 30 is absent elsewhere. In the resulting security device 10, the common image C.I. therefore comprises a tactile digit "5" of which the left half 18*a* is colourless while the right half appears in the colour of the ink 30*a*. The whole digit "5" is legible due to the reflective nature of the surface of cured material 20*a*.

Figure 13:
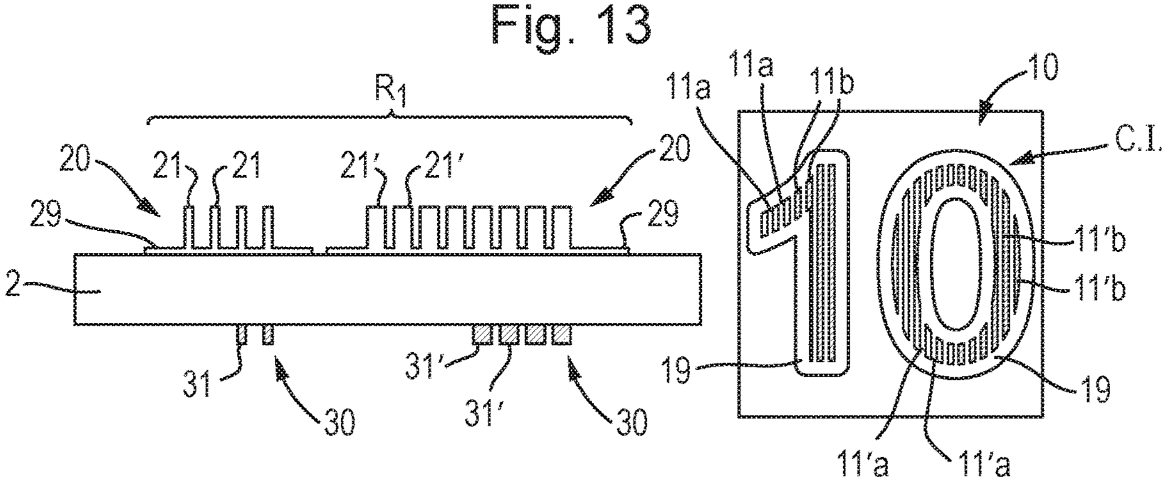

Similarly, the FIG. 13 embodiment is a variant of the embodiments already described with reference to FIGS. 3(*b*) and 5(*b*), the only difference lying in the configuration of print layer 30. In the FIG. 13 embodiment, the print layer 30 is configured to exhibit only the print elements 31, 31' corresponding to the right half of each of the digits "1" and "0", and is absent elsewhere. In the resulting security device 10, the common image C.I. therefore comprises tactile digits "1" and "0", of which the left halves are each colourless and the right halves are each coloured by the ink 30*a*. The whole of each digit is legible due to the reflective nature of the surface of cured material 20*a*.

In both of the above examples, the set of features of the common image exhibited by surface relief structure 20 is the whole set of features needed to define the common image C.I., while that exhibited by print layer 20 is a subset of those features. It is also possible for one of the constituents to exhibit feature(s) of the common image which the other does not. For example, in the FIG. 12 embodiment, the surface relief structure could be modified such that it is present only to define the left half 18*a* of the digit "5" and is absent on the right half 18*b*. In the FIG. 13 embodiment, the raised protrusions 21, 21' could likewise be present only where the print elements 31, 31' are absent.

Figure 14:
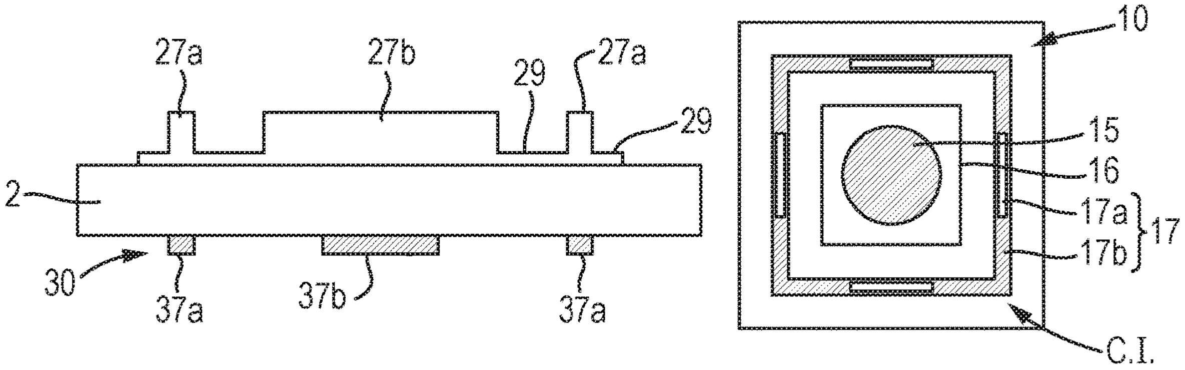

The FIG. 14 embodiment provides a further example. Here, the common image C.I. is a set of geometric shapes: a circle 15 within a solid-filled square 16, within an outline of a larger square 17. The surface relief structure 20 includes raised protrusions which correspond to the solid square feature 16 and to centre portions 17*a* of each side of the square outline feature 17. The print layer 30 comprises an outer square 37*a* of ink and a central circular inked area 37*b*. In combination, a complex design is formed as shown in the plan view, with the circle 15 having the colour of ink 30*a*, the solid square 16 being colourless but tactile and the square outline 17 being coloured all round but tactile only in portions 17*a* and not at the corners 17*b* (it should be noted that the portions 17*a* are not shown to be coloured, in order that the presence of cured material 20*a* can be inferred from the Figure, but will be coloured in practice). Thus the common image C.I. is made up of features contributed by each of the constituents 20, 30. The image is preferably designed so as to showcase the accurate register between the surface relief structure and the print layer. In the FIG. 14 embodiment this is achieved particularly well by the provision of tactile portions 17*a* on square outline 17, the misplacement of which would be readily noted.

Figure 15A:
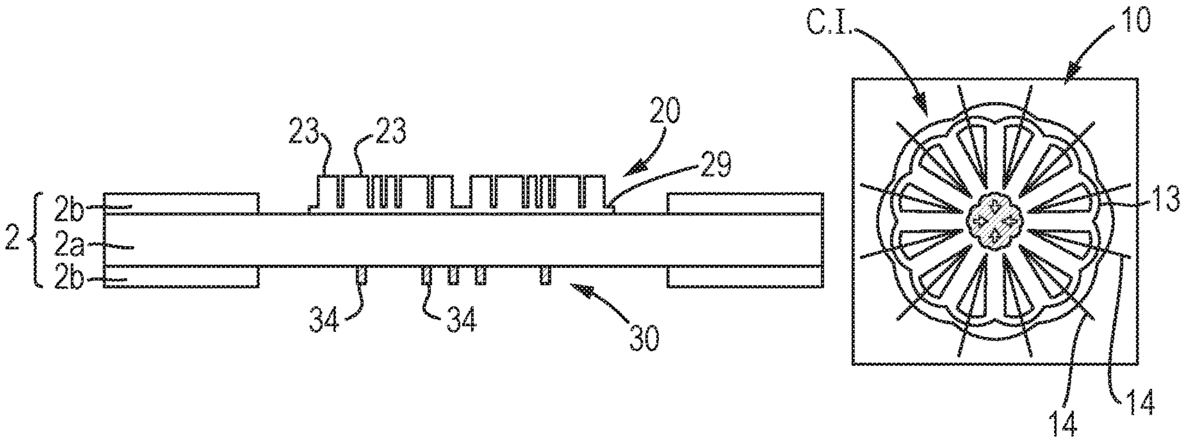
FIG. 15(*a*) shows a further embodiment of a security device in accordance with the invention in cross-section and plan view, FIGS. 15(*b*) and 15(*c*) showing plan views of the surface relief structure and the print layer respectively.
Figure 15B:
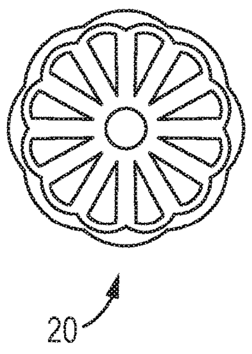
Figure 15C:
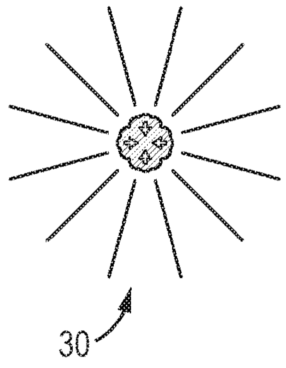

Another example of this principle is shown in FIGS. 15(*a*), (*b*) and (*c*). Plan views of the cast structure 20 and of the print layer 30 are shown in FIGS. 15(*b*) and (*c*) respectively. In this case, the final common image C.I. is a circular design comprising a complex "stained glass"-like arrangement with 12 petal-shaped areas arranged radially around a central cross made up of four inwardly-pointing arrows, and 12 radial lines which are aligned with the centres of the petal-shapes. The surface relief structure 20 is configured with a series of raised areas 23, with the recesses between them providing the petal-shaped features of the common image and a central circular area. The print layer 30 is made up of a set of printed areas 34 configured to exhibit the radial lines and the central cross feature. The register between the two constituent parts is demonstrated by the intricate nature of the common image C.I. and by the need to centre the two parts precisely in order to achieve the expected alignment.

Whilst in many embodiments it will be desirable for the tactile effect of the cast structure to match up with the visual configuration of the print layer, in other cases distinctive security effects could be achieved by purposefully including a partial mis-match. This is a subtle yet surprising and therefore memorable feature, which may nonetheless be missed by would-be counterfeiters. Clever placement of the casted tactile/print elements can promote further inspection of the device. For example in the FIG. 2 embodiment, on the image of the kingfisher, the beak and back feathers could be tactile with casting (i.e. raised elements 21 present), whereas the eye and chest feathers have no casting (i.e. raised elements 21 absent) and so are not tactile. Here the appearance of print layer 30 (which continues across both areas) suggests they would feel the same but close inspection reveals they do not.

Figure 16A:
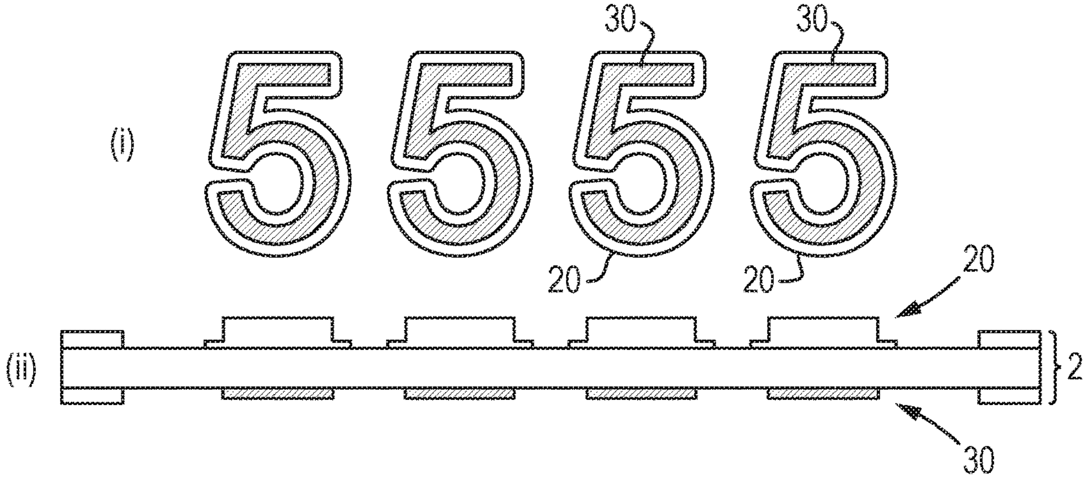
FIGS. 16(*a*), (*b*) and (*c*) show further embodiments of security devices in accordance with the invention, each in (i) plan view and (ii) cross-section.
Figure 16B:
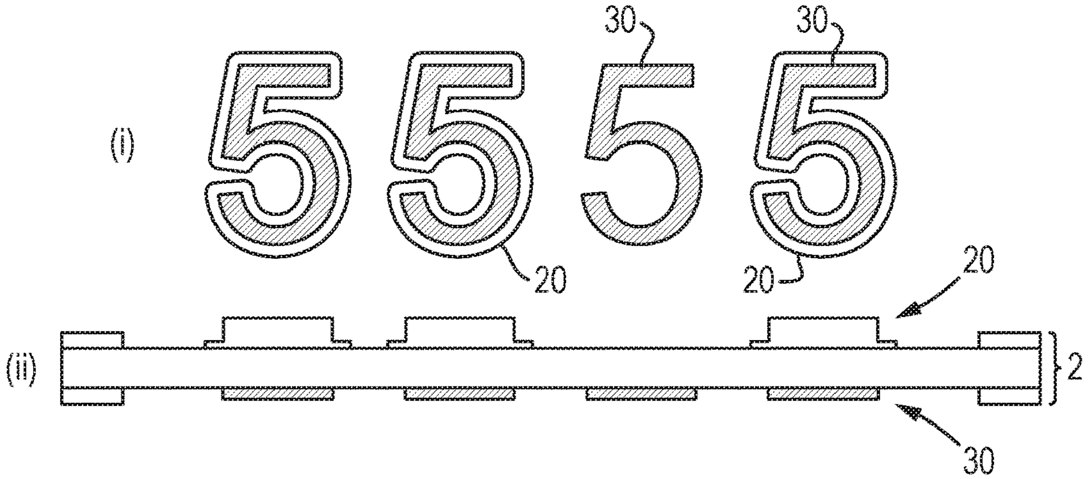
Figure 16C:
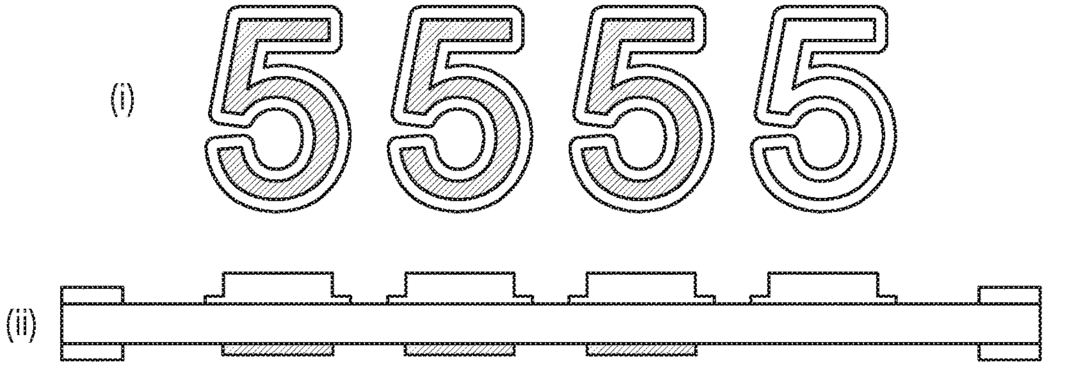
Figure 17A:
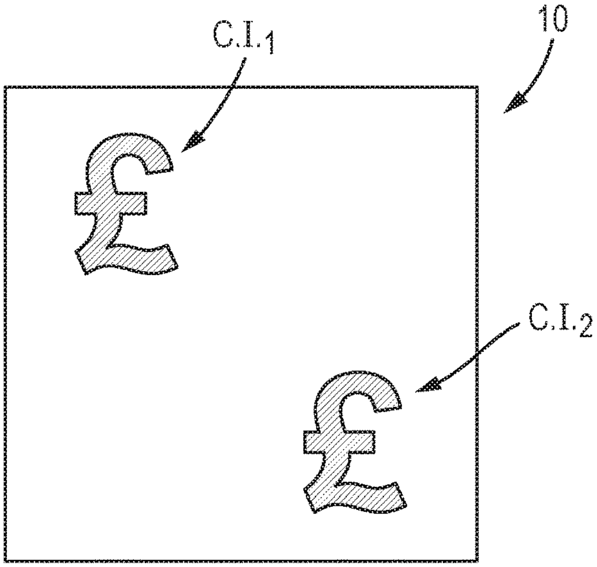
FIGS. 17(*a*) to (*d*) show another embodiment of a security device in accordance with the invention, (a) in plan view, (b) in cross-section, FIGS. 17(*c*) and (*d*) showing enlarged details.
Figure 17B:
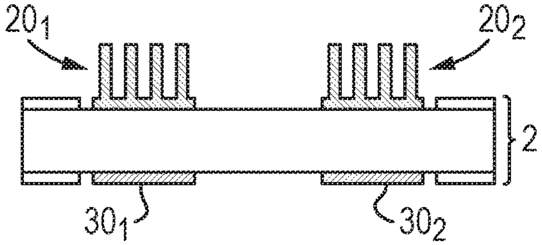
Figure 17C:
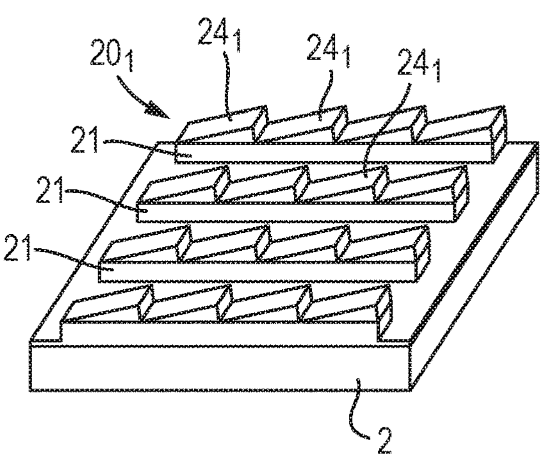
Figure 17D:
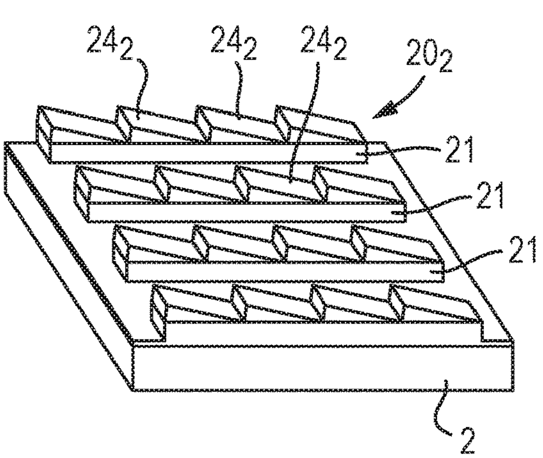
Figure 18A:
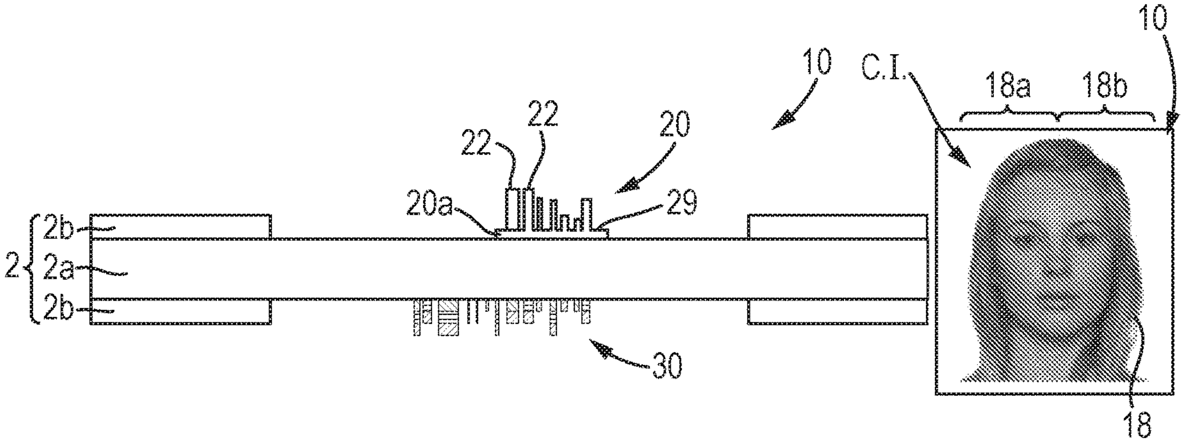
FIGS. 18(*a*) to (*e*) and 19 to 24 show further embodiments of security devices in accordance with the invention, each in cross-section and plan view.
Figure 18B:
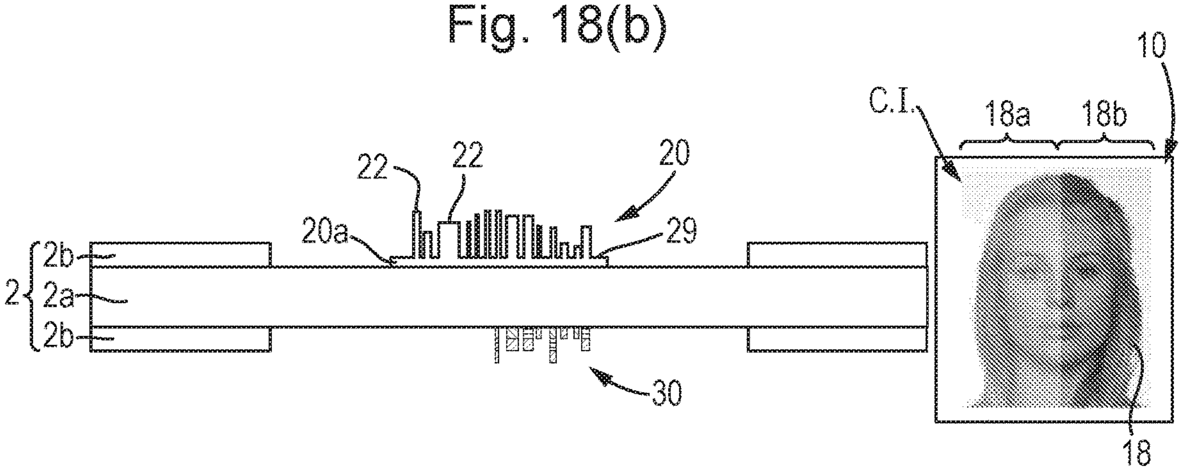
Figure 18C:
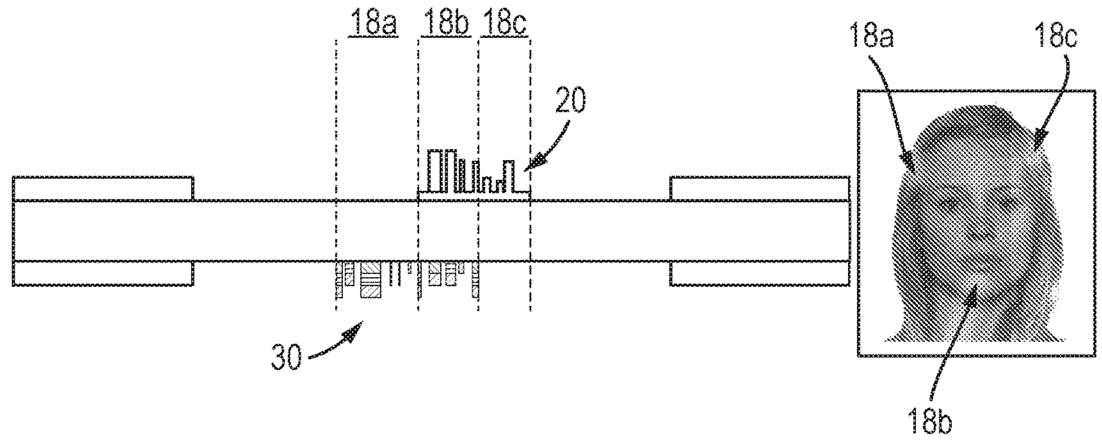
Figure 18D:
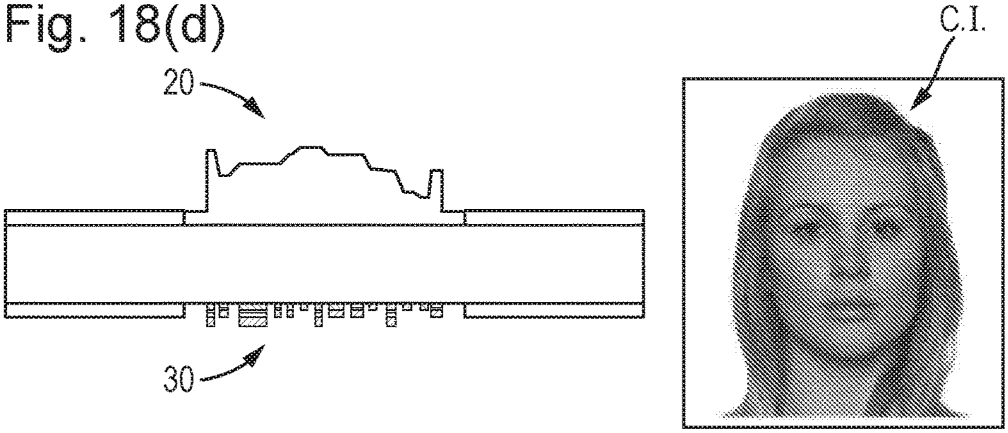
Figure 18E:
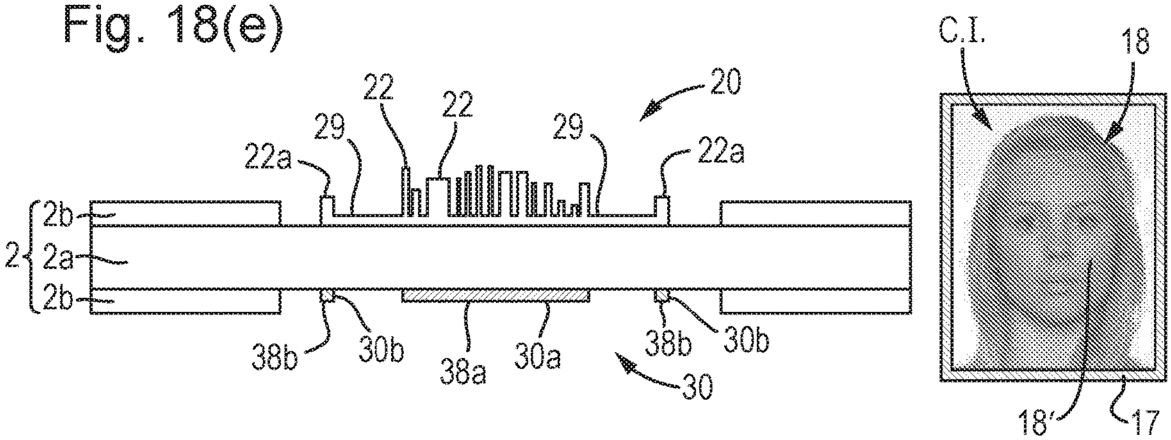

FIGS. 16(*a*), (*b*) and (*c*) demonstrate another example. Each Figure shows (i) the device in plan view, and (ii) cross-section. The device of FIG. 16(*a*) has matching cast structures 20 and print elements 30, each conveying a repeating set of the digit "5". In this case, each digit "5" will be both coloured (by the print layer 30) and tactile (as a result of the cast structure 20), as may be expected. In the embodiment of FIG. 16(*b*), again a repeating array of identical digits "5" are printed 30 and all but one of the images have a corresponding cast structure 20. Therefore the one digit "5" without tactility stands out on inspection. The reverse is also possible, as shown in FIG. 16(*c*). Here the device comprises a complete set of cast images (again, here in the form of the digit "5"), but now one of the digits is left unprinted, and hence will be less noticeable visually but detectable by feel.

The cast structure 20 can also be configured to provide more complex haptic (i.e. tactile) effects. An example is shown in FIG. 17. Here, the security device is shown in plan view in FIG. 17(*a*) and in cross-section in FIG. 17(*b*). Here there are two common images formed, $CI_1$ and $CI_2$, each appearing as a "£" sign. The corresponding print layers $\mathbf{30}_1$, $\mathbf{30}_2$ provide colour to each image and aligned cast structures $\mathbf{20}_1$, $\mathbf{20}_2$ provide tactility. However, the two cast structures $\mathbf{20}_1$ and $\mathbf{20}_2$ are different from one another, so that the tactile sensation exhibited by common image $CI_1$ is different from that of common image $CI_2$. This difference could take any form (e.g. level of roughness, directionality etc). In the present case the two cast structures are shown in enlarged detail in FIGS. 17(*c*) and (*d*) respectively. Both cast structures $\mathbf{20}_1$ and $\mathbf{20}_2$ comprise an array of raised protrusions 21, with a tactile structure formed of facets $\mathbf{24}_1$, $\mathbf{24}_2$ on the tops of the protrusions 21. The facets $\mathbf{24}_1$, $\mathbf{24}_2$, are asymmetric and arranged in opposite directions in the two structures. Thus a user running their finger across the device from left to right (as shown in the Figure) will find image $CI_1$ feels relatively smooth and image $CI_2$ relatively rough. However when they move their finger across the device in the opposite direction, the relative sensations will be reversed. Other tactile elements which could be used include symmetric facets, prisms (symmetric or asymmetric), pyramids, cubic structures, cones, curves and irregular structures.

FIGS. 18(*a*), (*b*), (*c*) and (*d*) show four further examples in which the common images comprise full colour photographic images (here, portraits). Both of these embodiments are variants of the embodiment described above with reference to FIG. 9, and hence the print layer 30 is a RGB image. However the print layer 30 could alternatively be a CMYK image as described with reference to FIG. 10, or potentially may comprise some other set of colours such as orange, green and violet. In the FIG. 18(*a*) embodiment, the security device 10 is the same as that shown in FIG. 9 except for the configuration of the surface relief structure 20, which in FIG. 18(*a*) only exhibits features of the right half of the common image. As a result while the whole portrait 18 is visible in full colour in the finished security device 10, only the right half 18*b* of it is tactile. The surface relief structure 20 is absent in the left half 18*a*. In the FIG. 18(*b*) embodiment, the opposite is true. Here, the security device 10 is the same as that shown in FIG. 9 except for the configuration of print layer 30, which in FIG. 18(*b*) only exhibits features of the right half of the common image. As a result while the whole portrait 18 is tactile in the finished security device 10, only the right half 18*b* of it is visible in full colour. The left half 18*a* will still be visible to an extent due to the reflective qualities of the cured material 20*a*. In the FIG. 18(*c*) embodiment, the cured surface relief structure 20 and the print layer 30 only overlap one another in a central region of the device. Hence, the portrait 18 comprises three different areas: a first portion 18*a* in which only the print layer 30 is present; a second portion 18*b* in which both the print layer 30 and the cured surface relief structure 20 are present; and a third portion 18*b* in which only the cured surface relief structure 20 is present. As such, the first portion 18*a* will appear full-colour but non-tactile; the second portion 18*b* will be full-colour and tactile; while the third portion 18*c* will be tactile but not full-colour (the third portion 18*c* may yet be visible in a greyscale/single colour form either due to the reflective nature of the casting 20 and/or any coloured tint it might carry).

Another variation is shown in FIG. 18(*d*). Here, instead of being formed of multiple discrete raised elements, the cured surface relief structure 20 comprises a continuous surface of varying geometry (e.g. height, length, width etc). For instance, the structure may provide a three-dimensional contour corresponding to the face of the person shown in the image CI. In this case, the print layer 30 provides the fine detail of the image while the casting 20 primarily acts to provide tactility.

In FIG. 18(*e*), the surface relief structure 20 is configured to exhibit all the details of a photographic portrait 18 forming the main part of the common image C.I., in this case via a set of spaced raised elements of varying height. In addition, the surface relief structure comprises a protrusion 22*a* forming a laterally rectangular border 17 which frames the portrait. The print layer 30 exhibits only a subset of the features of the common image C.I., namely a uniform area 38*a* of a first ink 30*a* corresponding to the face region 18' of the portrait 18, and a laterally rectangular line 38*b* in a second ink 30*b* corresponding to border 17. The resulting common image comprises a tactile representation of the portrait 18' which is partially coloured, and partially uncoloured, inside a tactile coloured border 17.

The ability to control colour placement very precisely not only allows for the display of full colour images, such as those exemplified above, but also other colour effects. In conventional lithographic printing, it is known to produce multi-coloured effects by a process known as "rainbowing", in which two different coloured inks are applied to the print plate surface adjacent one another. When at the boundary, the inks mix with one another to produce intermediate colours which vary continuously in a spatial sense. The present invention can be used to form device with "rainbow" colour which are also tactile, which was not previously possible.

Figure 19:
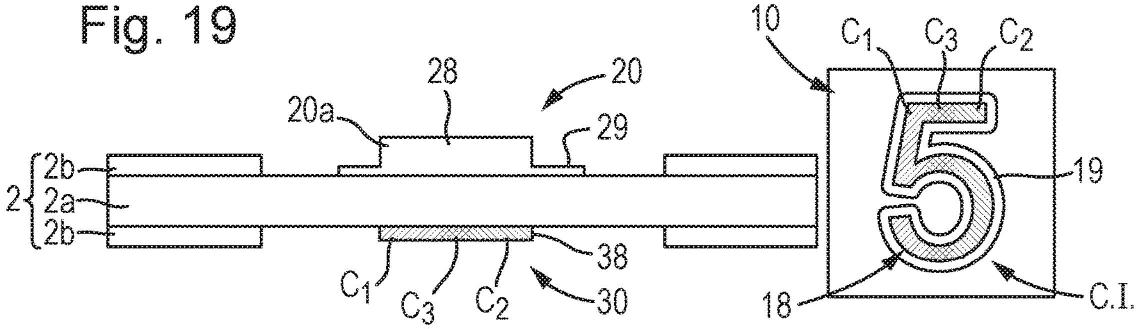
Figure 20:
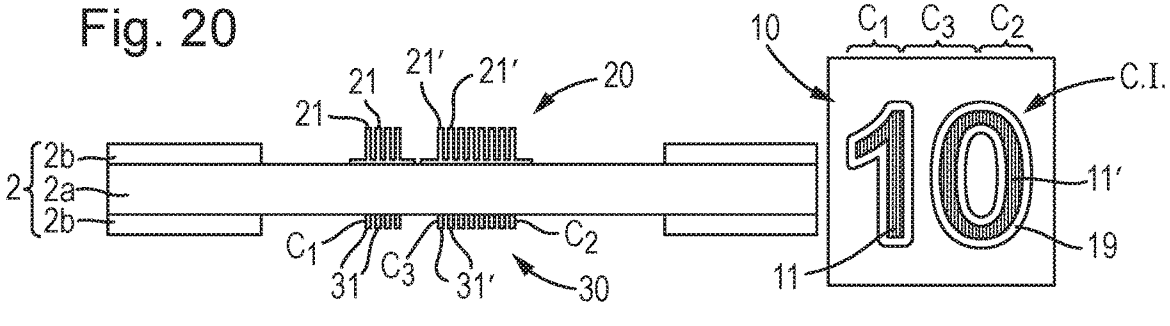

FIGS. 19 and 20 show two examples, which correspond to those of FIGS. 3(*a*) and 3(*b*) respectively except here the print layers 30 are each formed of multiple inks. In the FIG. 19 embodiment, the print area 38, having the form of the digit "5" is formed of at least two inks such that a left portion thereof has a first colour $C_1$ (e.g. red), a right portion thereof has a second colour $C_2$ (e.g. blue) and an middle portion located between them has one or more intermediate colours $C_3$ (e.g. purple). This is achieved by "rainbow" lithographic printing using two inks in the colours $C_1$ and $C_2$ giving rise to appropriate spatial mixing in the middle region. In this way the transition from first colour $C_1$ to second colour $C_2$ via intermediate colours $C_3$ is truly continuous in that, even under magnification, no discrete changes from one colour to another will be revealed. The same principles apply to the FIG. 20 embodiment, the only difference being that here the image is conveyed via an array of image elements 11, 11'. The corresponding print elements 31, 31' are formed by lithographic printing in the appropriate colours to achieve the rainbowing effect as before. It is also possible to provide more than two such rainbow effects in the same print layer 30. For instance in the FIG. 20 embodiment, the digit “1” could be arranged to show a transition from red to blue while the digit “0” could be arranged to transition from green to yellow.

In the examples so far, the cured material 20*a* from which the surface relief structure is formed has been transparent and colourless, such that it does not contribute to the colour appearance of the common image C.I. However, in more complex embodiments, the cured material 20*a* may carry a coloured tint. This can be used as a further variable to create new visual effects, especially since the colour density of the surface relief structure 20 may now vary in dependence on its height (raised protrusions will typically have greater colour intensity than lower portions such as the base layer 29, due to the greater amount of tinted material 20*a* through which light passes). Some examples will be explained with reference to FIGS. 21 to 26, but it should be appreciated that the same principle can be applied to any of the other embodiments disclosed herein.

Figure 21:
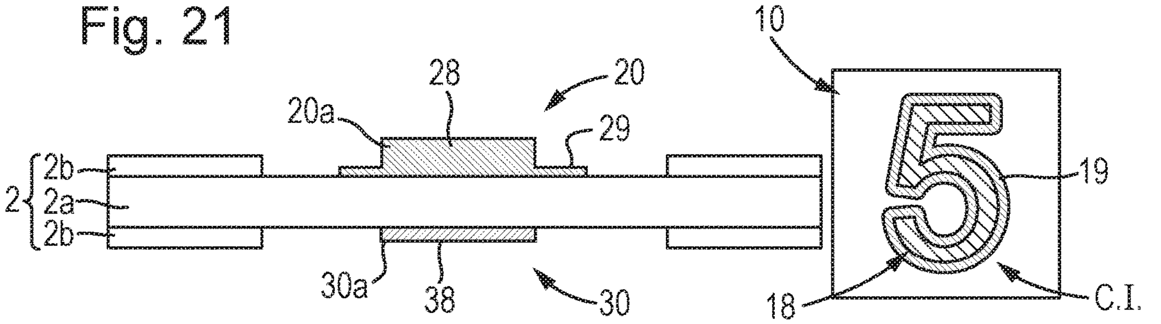
Figure 22:
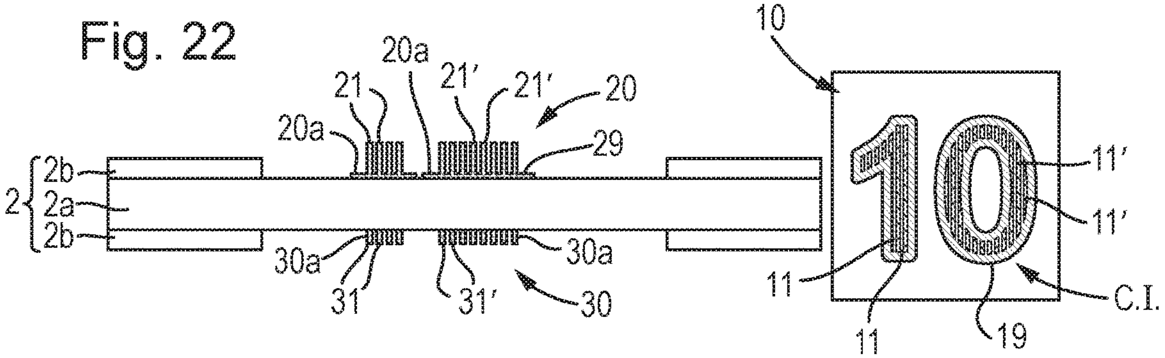

FIGS. 21 and 22 show two embodiments, which correspond to those of FIGS. 3(*a*) and 3(*b*) respectively except here the surface relief structure 20 is formed of a cured material 20*a* which is transparent (i.e. clear) but carries a coloured tint (e.g. blue). As before, the print layer 30 is formed in a single coloured ink 30*a* (e.g. red). In the FIG. 21 embodiment, the result is a common image C.I. depicting the digit “5” as a continuous area 18 in a colour arising from mixing of the colour of material 20*a* and that of ink 30*a*. For instance, in the example the area 18 may appear purple, at least when viewed from the side of the security device carrying the surface relief structure 20. The area 18 is surrounded by a border region 19 which has the colour of material 20*a* only (e.g. blue). Thus, a two-colour common image C.I. is obtained. Similarly, in the FIG. 22 embodiment, the image elements 11 and 11' defining the digits “1” and “0” now appear in the mixed colour (e.g. purple) while the border 19 surrounding them appears in the colour of material 20*a* (e.g. blue).

If the ink 30*a* forming the print layer 30 is sufficiently transparent, the appearance of the devices in FIGS. 21 and 22 will be much the same from either side of the substrate in reflected light and in transmitted light. However it is possible to introduce more complex effects by increasing the opacity of the ink 30*a*. If the ink 30*a* is sufficiently opaque, it will obscure the portions of the surface relief structure located behind it when the device is viewed from the side carrying the print layer 30, resulting in a different colour appearance. This variation can be applied to all embodiments disclosed herein. Hence in the embodiment of FIG. 21, if the ink 30*a* is red and opaque, the appearance of the common image when viewed in reflection from the side of the surface relief structure will be as already described (a purple “5” with surrounding blue border). However when viewed in reflection from the other side, the common image will show a red “5” with blue border. In transmission the “5” may appear very dark (e.g. back), surrounded by a blue border.

Figure 23:
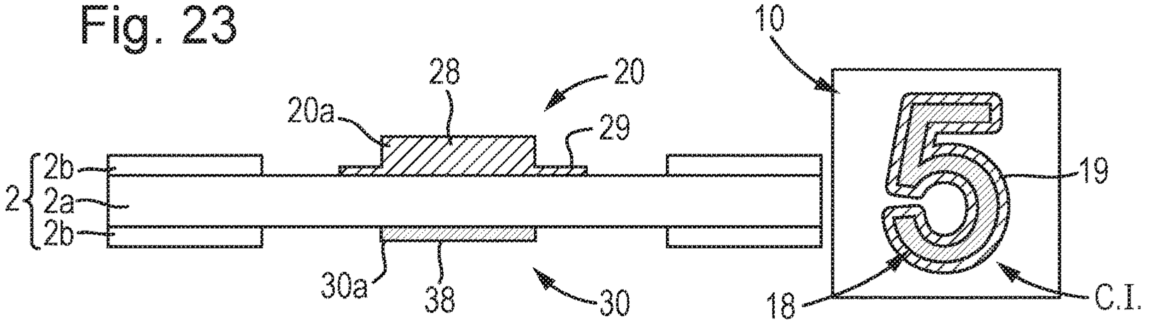

While in many cases it will be desirable for the colour of the cured material 20*a* to be different from that of the ink 30*a*, this is not essential and different effects can be achieved if the colours are the same or similar. For instance, FIG. 23 shows an embodiment which is the same as that of FIG. 21 except that the cured material 20*a* has a tint which is the same colour as that of the ink 30*a* forming the print layer 30 (e.g. red). In this case, the resulting common image is multitonal rather than multi-coloured, the digit “5” (area 18) appearing in a more intense shade of red than the boundary region 19, which is a lighter red.

Figure 24:
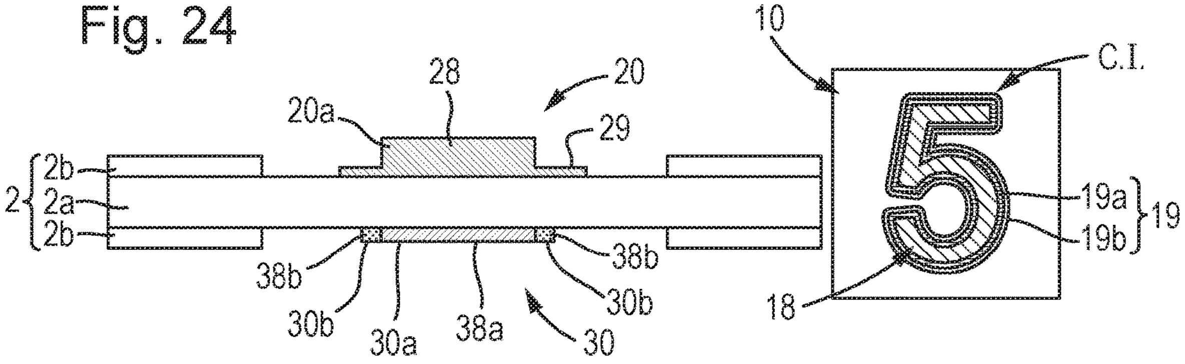

Still more complex effects can be achieved if the print layer 30 is itself formed in multiple colours. For example, FIG. 24 shows an embodiment in which the security device 10 is the same as described with reference to FIG. 21 above, except the print layer 30 now includes a peripheral border 38*b* around area 38*a*, in a second ink 30*b* of a different colour from the ink 30*a* forming area 38*a*. For example the area 38*a* may be red while the border 38*b* is yellow, and the cured material 20*a* carries a blue tint. The resulting common image C.I. will comprise an area 18 in the form of the digit “5” having a colour corresponding to a mixture of those of the cured material 20*a* and first ink 30*a* (e.g. purple). Surrounding the digit “5” will be a border 19 formed of two different adjacent colours. Inner area 19*a* will be of a colour corresponding to a mixture of those of the cured material 20*a* and the second ink 30*b* (e.g. green). Outer area 19*b* will be of a colour corresponding to that of the cured material 20*a* only (e.g. blue).

Figure 25:
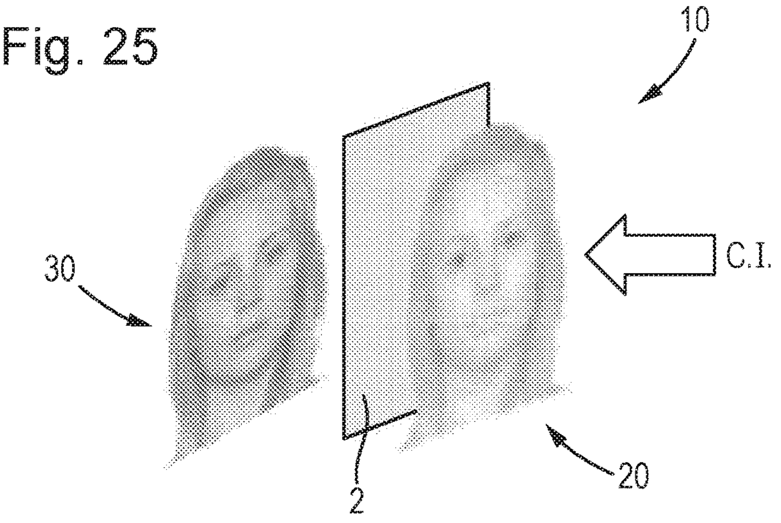
FIG. 25 schematically depicts another example of a security device in accordance with the invention, in an exploded view.

The same principles can be applied to security devices exhibiting full colour images. FIG. 25 shows an example which is otherwise the same as the FIG. 8 embodiment, but in which the tactile casting 20 has a coloured tint—in this case, blue. The print 30 of the image on the opposite side is printed in only red and green. A full colour RGB version of the image will be seen when the combination is viewed through the blue tactile casting. The necessary variations in blue level in the casting can be achieved either through varying the height of the casting (higher parts of the casting will have a greater colour density than lower parts, due to the increased amount of material present) and/or by providing elements (e.g. dots) of the tactile casting only where a blue contribution is required. Such raised elements will have a higher optical density than the base layer between them.

Figure 26A:
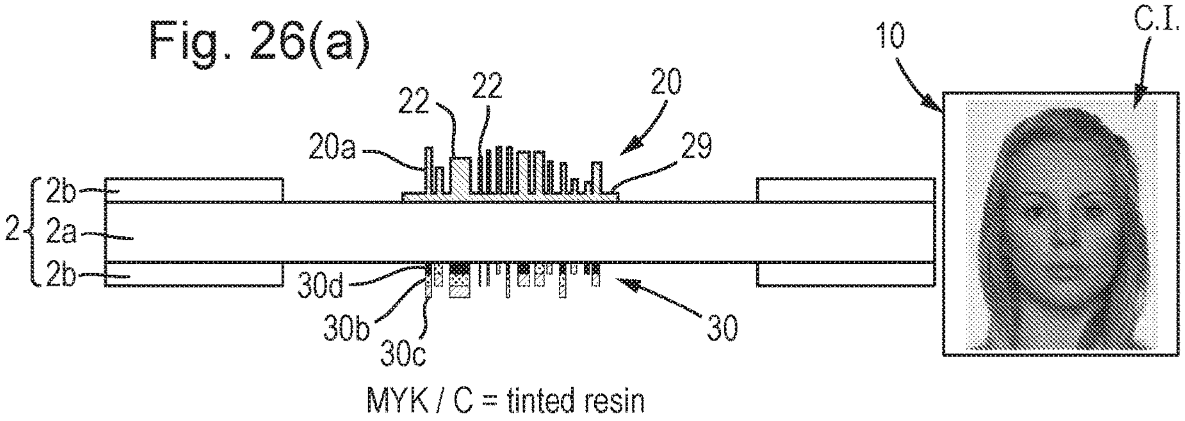
FIG. 26(*a*) shows a further embodiment of a security device in accordance with the invention in cross-section and plan view, FIG. 26(*b*) showing an exploded view of the security device.
Figure 26B:
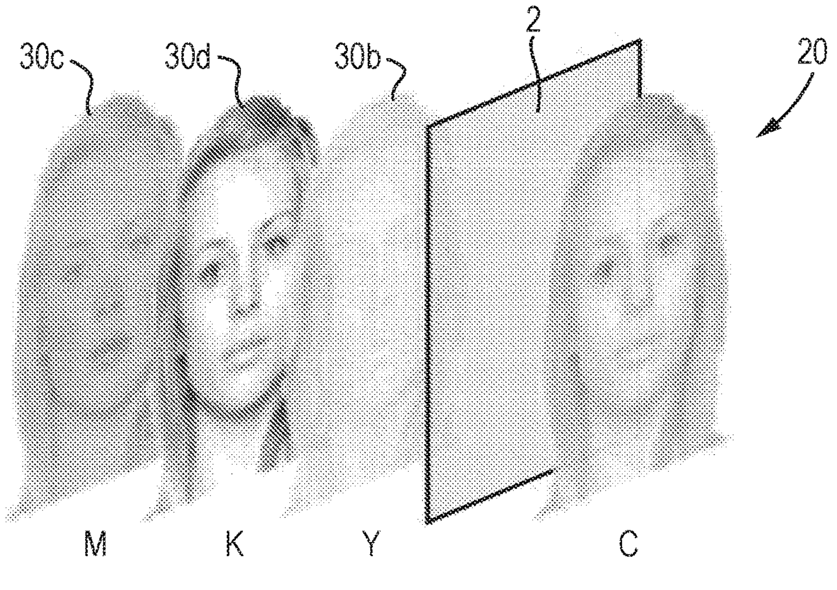

Another embodiment employing this principle is shown in FIGS. 26(*a*) and (*b*). This embodiment is a variant of the FIG. 10 embodiment, having a common image C.I. in the form of a tactile, full colour photographic portrait made up of CMYK channels. However in this implementation the print layer 30 is formed of three inks 30*b* (yellow), 30*c* (magenta) and 30*d* (black), resulting in a “MYK” printed image missing the cyan channel. The cyan contribution is made by the surface relief structure 30, which is formed of a cured material 20*a* having a cyan tint. As in the previous embodiment, the intensity of cyan exhibited will vary across the surface relief structure 20 in accordance with its height profile—the protrusions 22 each appearing relatively intense in colour while the lower areas including base layer 29 appear lighter or even colourless.

Figure 27A:
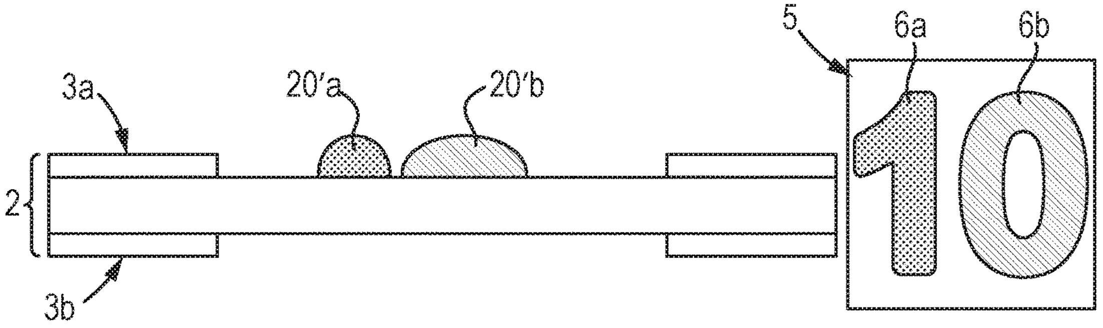
FIG. 27(*a*) shows an intermediate product existing during a process for making an embodiment of a security device, in cross-section and plan view, and FIG. 27(*b*) shows the finished security device, in cross-section and plan view.
Figure 27B:
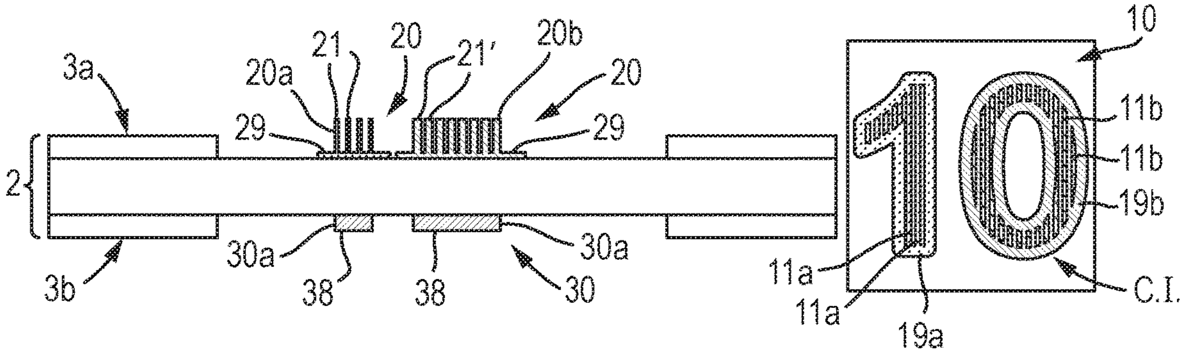
Figure 28A:
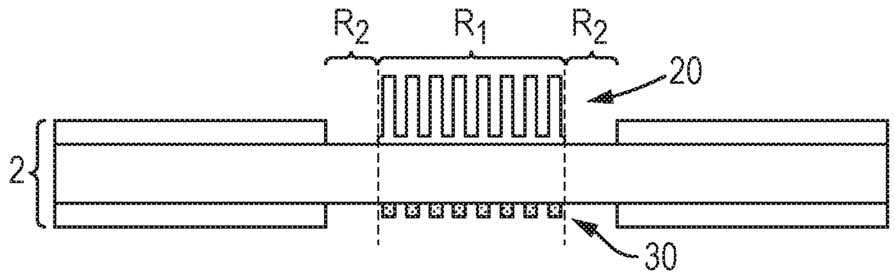
FIGS. 28(*a*), (*b*), (*c*) and (*d*) show four further embodiments of security devices in accordance with the present invention, in cross-section.
Figure 28B:
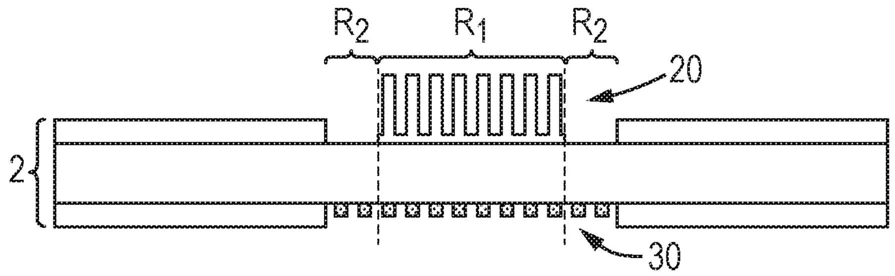
Figure 28C:
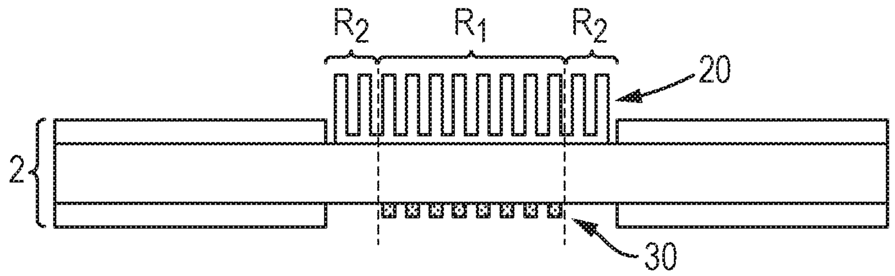
Figure 28D:
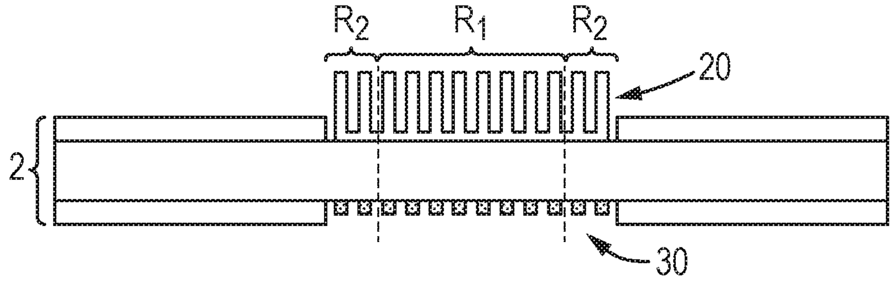

It is also possible to form the surface relief structure 20 of two or more cured materials, which may have different optical characteristics from one another (e.g. different visible colours). The two or more cured materials will typically be laterally offset from one another (preferably non-overlapping). If they abut one another so as to produce a continuous body of cured material these will be consider to form one and the same surface relief structure whereas if they are spaced from one another these will be separate surface relief structures. Either approach can be employed in embodiments of the invention. FIGS. 27(*a*) and (*b*) show an example of the latter case—FIG. 27(*a*) showing an intermediate step in the manufacture of the eventual security device 10 shown in FIG. 27(*b*). The security device 10 is similar to that described with reference to FIG. 5(*b*) above, with a common image C.I. exhibiting the digits "1" and "0" each defined by an array of image elements 11*a*, 11*b*.

The surface relief structures 20 are each formed of a different material with different respective colours. FIG. 27(*a*) shows the two materials 20'*a* and 20'*b* applied to the first surface 3*a* of the substrate 2, in their uncured state. As will be described with reference to FIG. 46 below this may be achieved by printing the curable materials onto the substrate, preferably in register with one another (e.g. using a non-contact printing method such as inkjet), or by applying the two or more curable materials to the casting tool. The first curable material 20'*a* has a tint of a first colour, e.g. yellow, and the second curable material 20'*b* has a tint of a second colour, e.g. blue. The curable materials 20'*a*, 20'*b* are each formed into the desired surface relief structures to define raised elements 21, 21' corresponding to the image elements 11*a*, 11*b* of the common image C.I. On the second surface 3*b* of the substrate 2, a print layer 30 is provided comprising two areas 38 of ink 30*a* (e.g. red) in shapes corresponding to the digits "1" and "0" respectively. The resulting common image will comprise a digit "1" defined by image elements 11*a* having a colour formed by a mixture of the colours of material 20*a* and ink 30*a* (e.g. orange), surrounded by a border 19*a* having a colour corresponding to that of material 20*a* (e.g. yellow), and a digit "0" defined by image elements 11*b* in a colour formed by a mixture of the colours of material 20*b* and ink 30*a* (e.g. purple) surrounded by a border 19*b* in a colour corresponding to that of material 20*b* (e.g. blue).

As illustrated in each of the above embodiments, the surface relief structure 20 and print layer 30 are configured such that in combination they exhibit the common image C.I. across a first region $R_1$ of the substrate. Optionally, the security device may include a second region $R_2$ which may be adjacent the first region in which the image is located. The cast structure and/or the print layer may extend into (continuously or discontinuously from the first region) the second region but here the two components (if they are both present) need not be aligned with one another or be defined based on a common image (as is the case in the first region). For instance, in the second region the print layer could take the form of microimages or another image array and the cast structure could be in the form of an array of focusing elements, to form in combination an optically variable device. In the case where the security device is ultimately arranged in a window (or half-window) region of a security document, the first and second regions of the security device could both be in the same window (or half-window) region, or in different such regions.

Hence it is possible for one or both of the surface relief structure 20 and the print layer 30 to be present elsewhere on the substrate 2, such as in a second region $R_2$ which is laterally offset from and does not overlap the first region $R_1$. In this second region $R_2$ the configuration of the surface relief structure 20 and/or print layer 30 is different from that in the first region $R_1$, so that the common image C.I. does not continue into the second region, and the two regions appear visibly distinct from one another. FIGS. 28(*a*) to (*d*) schematically illustrate some options—in each case the form of the surface relief structure 20 and that of the print layer 30 is not depicted accurately and should only be taken as denoting the lateral extent of each component. FIG. 28(*a*) shows the same arrangement as has been the case in each of the previous embodiments—the surface relief structure 20 and print layer 30 are present only in the first region $R_1$ and exhibit only the common image. In FIG. 28(*b*), the surface relief structure is again present only in first region $R_1$ but now the print layer 30 extends into an adjacent second region $R_2$. In the second region $R_2$ the print layer 30 will have a different appearance from its appearance in the first region $R_1$ so that the common image remains clearly distinct. For instance, in the second region $R_2$ the print layer 30 may provide a background to the common image, e.g. in a contrasting colour and/or as a uniform area. In the FIG. 28(*c*) embodiment, the print layer 30 is present only in the first region $R_1$ while the surface relief structure 20 extends into second region $R_2$. Again, the surface relief structure 20 will have a different configuration in each region so that the common image can be detected by feel as distinct from the second region $R_2$ due to its different tactility. Finally, in the FIG. 28(*d*) embodiment, both the surface relief structure 20 and the print layer 30 are present in the second region $R_2$. Here they will both be configured differently from their respective arrangements in the first region $R_1$ so that the common image remains distinct.

Figure 29A:
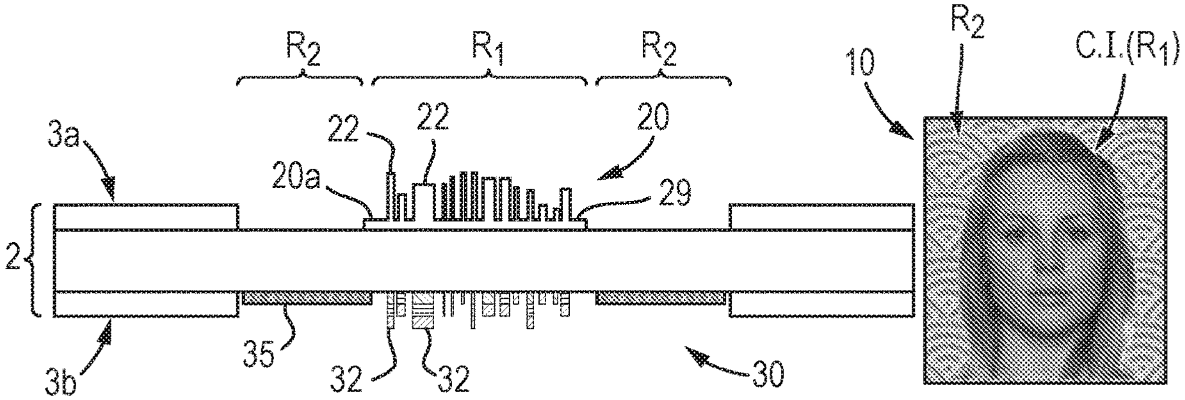
FIGS. 29(*a*), (*b*) and (*c*) show three further embodiments of security devices in accordance with the present invention, each in cross-section and plan view.
Figure 29B:
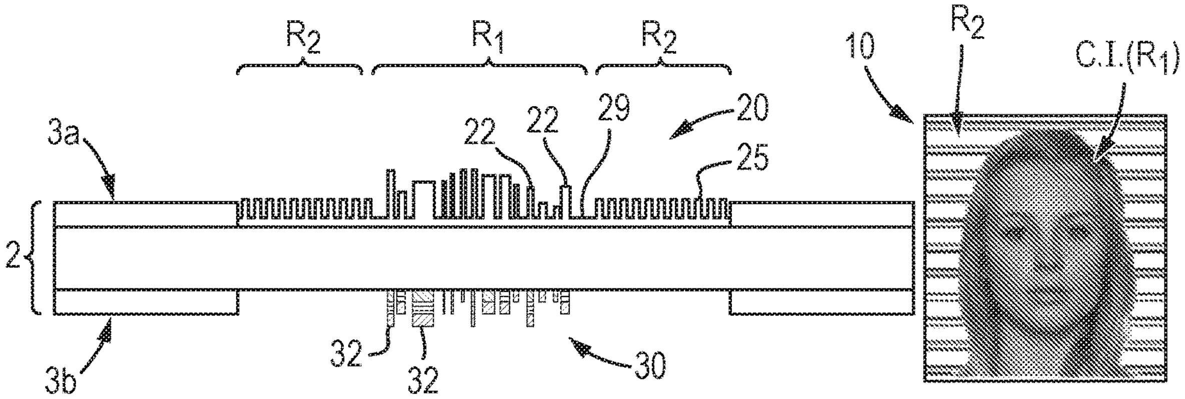
Figure 29C:
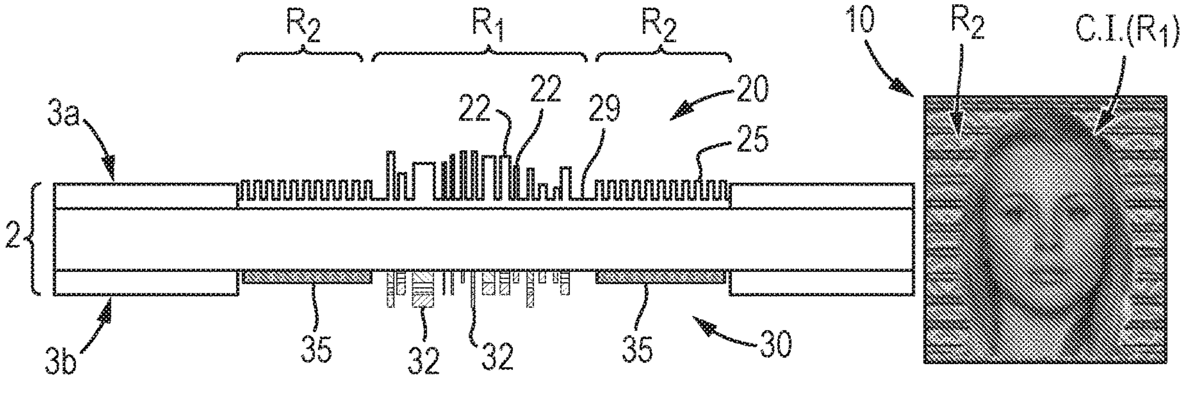

FIGS. 29(*a*), (*b*) and (*c*) show some specific examples. In each case, the arrangement of the surface relief structure 20 and print layer 30 in the first region $R_1$ is the same as described with reference to FIG. 9, resulting in a common image C.I. in the form of a tactile, full colour RGB photographic image. In the embodiment of FIG. 29(*a*), the surface relief structure 20 is present only in the first region $R_1$ and not in second region $R_2$. The print layer 30 extends across second region $R_2$ and here is configured to present a relatively uniform background pattern 35. Hence the resulting security device 10 will have a background print in a non-tactile second region $R_1$ surrounding the tactile full-colour portrait. In the FIG. 29(*b*) embodiment, the print layer 30 is constrained to the first region $R_1$ and is absent in the second region $R_2$. The surface relief structure 20 continues into the second region $R_2$ and here is provided with a different tactile structure as compared with that present in the first region $R_1$, e.g. a set of parallel raised ridges 25. The resulting security device 10 displays the common image C.I. against a plain background (in this case, colourless/transparent but more generally having the local appearance of substrate 2) which has a distinct tactile feel. In the embodiment of FIG. 29(*c*), both the surface relief structure 20 and the print layer 30 are present in the second region $R_2$ and have the characteristics just described, with the result that the portrait C.I. is surrounded by a distinct coloured, tactile background area in region $R_2$.

Figure 30A:
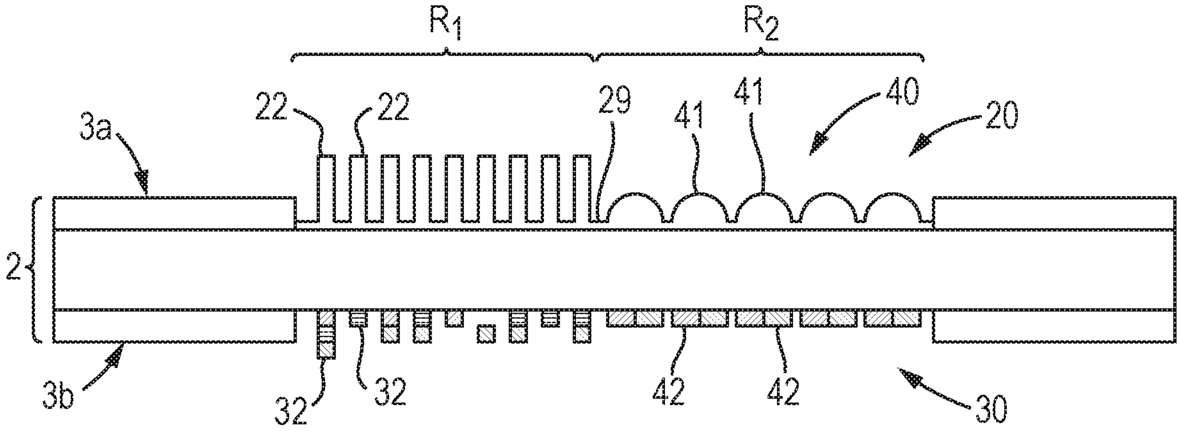
FIGS. 30(*a*), (*b*) and (*c*) show three further embodiments of security devices in accordance with the present invention, in cross-section.
Figure 30B:
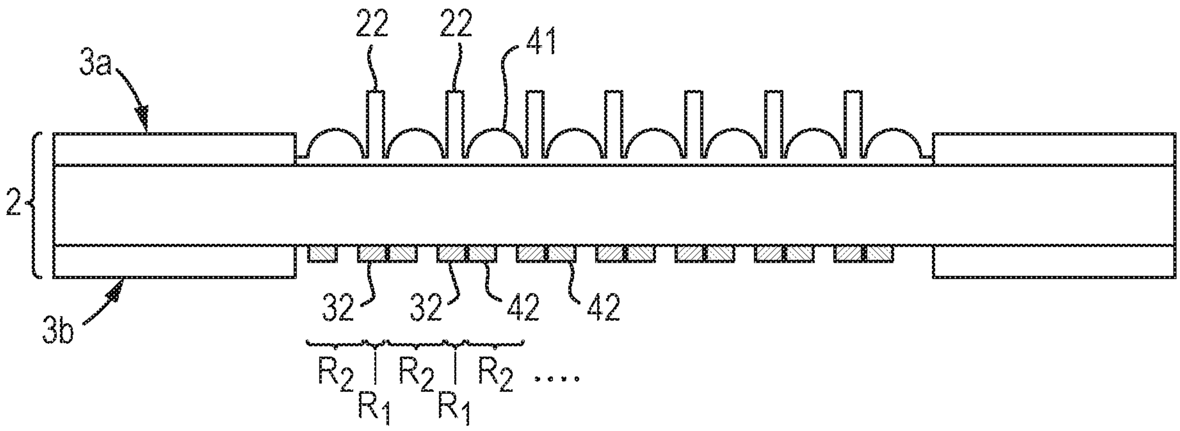
Figure 30C:
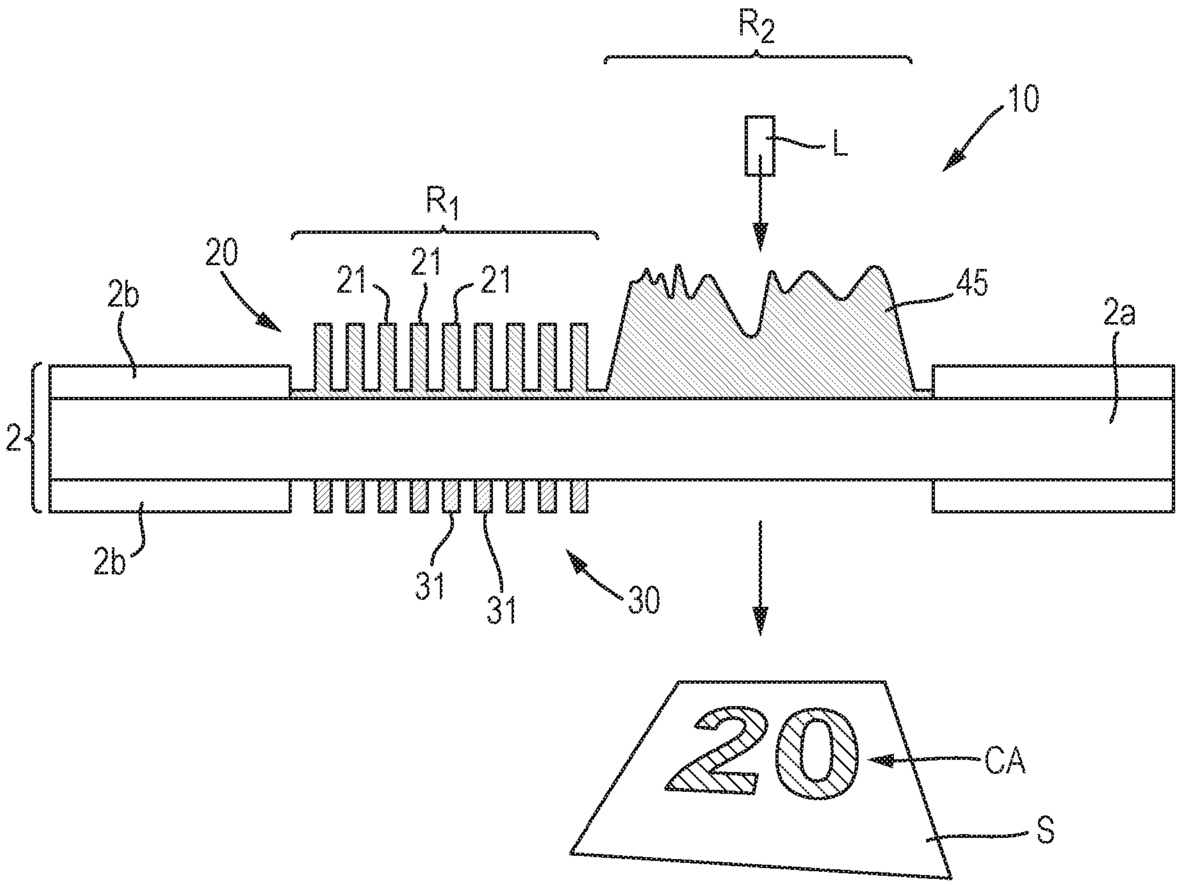

It is also possible to utilise the surface relief structure 20 and/or print layer 30 to provide one or more additional security features in the second region $R_2$. For example, the two constituents can be configured to form in combination an optically variable security device 40 in the second region, such as a moiré magnifier, a lenticular device, an integral imaging device or a caustic device. FIGS. 30(*a*), 30(*b*) and 30(*c*) show two examples of this. In FIG. 30(*a*), the first and second regions $R_1$ and $R_2$ are discrete and laterally offset from one another as before (in this case, abutting one another—although they could be spaced apart or even placed in separate windows on the security document). In the first region $R_1$ the surface relief structure 20 and the print layer 30 are configured to exhibit a tactile common image in accordance with any of the embodiments described above. In the second region $R_2$, the surface relief structure is configured to define an array of focusing elements 41, such as lenses. The focusing element array may have one-dimensional periodicity (e.g. cylindrical elements) or two-dimensional periodicity (e.g. spherical or aspherical elements). The print layer 30 is configured to provide an image array 42, and is located substantially in the focal plane of the focusing element array.

In a moiré magnifier, the image array 42 will typically comprise an array of microimages and the pitch and/or orientation of the image array 42 will be mismatched with those of the focusing element array 41 so as to give rise to synthetically magnified images of the microimages due to the moiré effect. In a lenticular device, the image array 42 will typically comprise a set of image elements, each being a section of an image to be displayed across the second region $R_2$. Sections of multiple images will be interleaved. In this case the pitch and orientation of the image array 42 will typically match that of the focusing element array 41. At any one viewing angle, the focusing element array directs light from image elements all derived from the same image to the viewer so that the complete image is displayed. Upon changing the viewing angle, a different one of the interleaved images is displayed. Thus, the security device 10 as a whole will display a static, tactile common image C.I. in a first region $R_1$ thereof (as before), alongside an optically variable device 40 in a second region $R_2$. In a variant of this embodiment, shown in FIG. 30(*b*), the first and second regions $R_1$ and $R_2$ may themselves be interleaved with one another across the security device. This will give rise to the visual impression of the static tactile common image being superimposed on an optically variable background. It should be noted that FIG. 30(*b*) is highly schematic and in reality the relative sizes of the lenses and surface relief structure elements will typically be such that there are many lenses in each interleaved portion of the optically variable device, between each portion of the common image.

FIG. 30(*c*) shows a further embodiment in which the second region $R_2$ contains a caustic device 45. Caustic devices are surface reliefs which project a caustic image CA when illuminated with light L. Various methods for designing a relief structure which will project a certain caustic image have been disclosed in WO-A-2019/063778, WO-A-2019/063779 and WO-A-2020/070304, in each of which the caustic image is a "real" image which is visualised by projection onto a suitable surface, such as a wall or screen. Similarly, WO-A-2020/070299 discloses techniques for forming a relief structure which generates a "virtual" caustic image, which does not require projection onto a surface but can be viewed directly by the naked eye. In the example shown, the first region $R_1$ and second region $R_2$ are non-overlapping, sitting adjacent to one another. The first region $R_1$ displays a common image formed by the surface relief 20 and print layer 30 as in other embodiments. The caustic device 45 in the second region $R_2$ is formed as an extension of the same surface relief structure 20, achieved through appropriate configuration of the casting tool.

Figure 31:
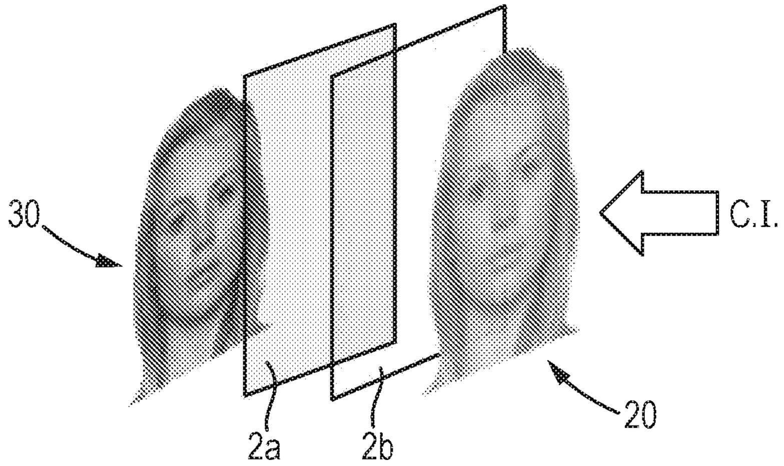
FIG. 31 schematically depicts another example of a security device in accordance with the invention, in an exploded view.
Figure 32A:
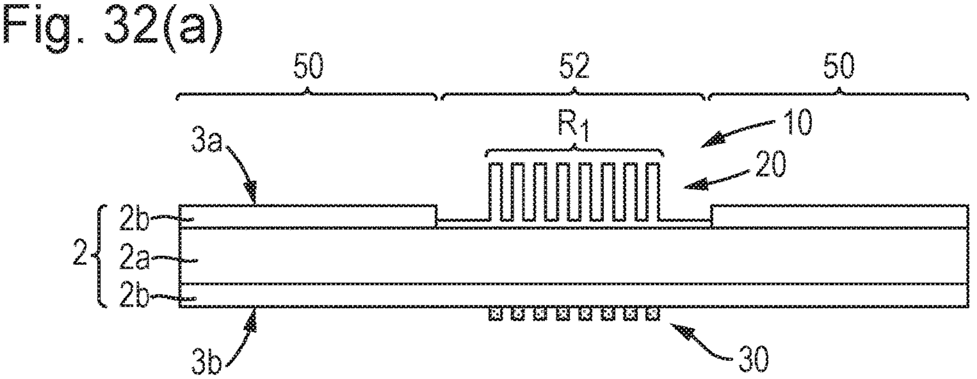
FIGS. 32(*a*) to (*g*) show further embodiments of security devices in accordance with the present invention.
Figure 32B:
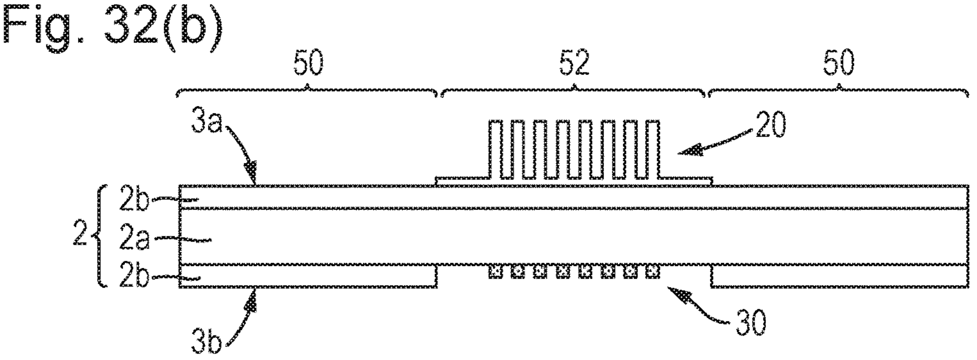
Figure 32C:
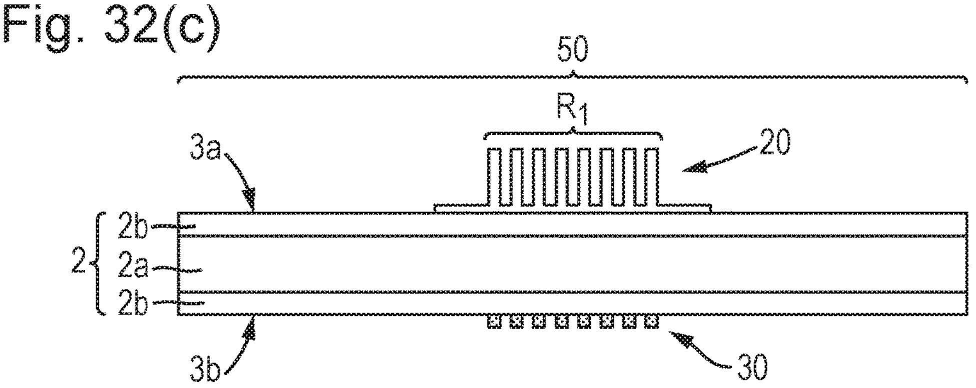
Figure 32D:
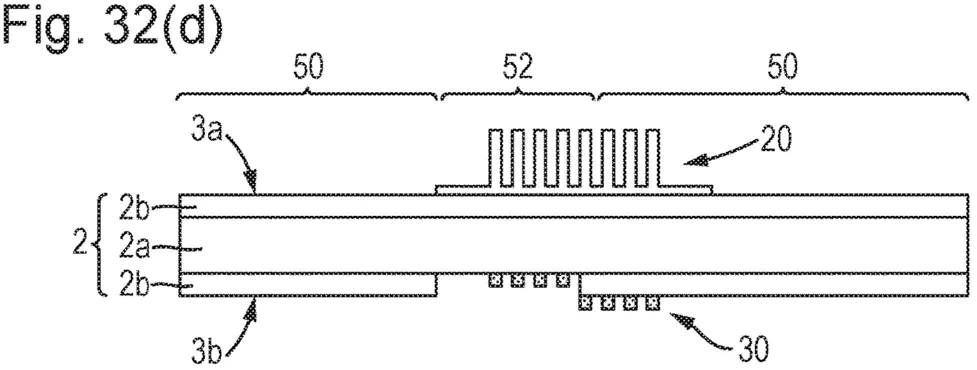
Figure 32E:
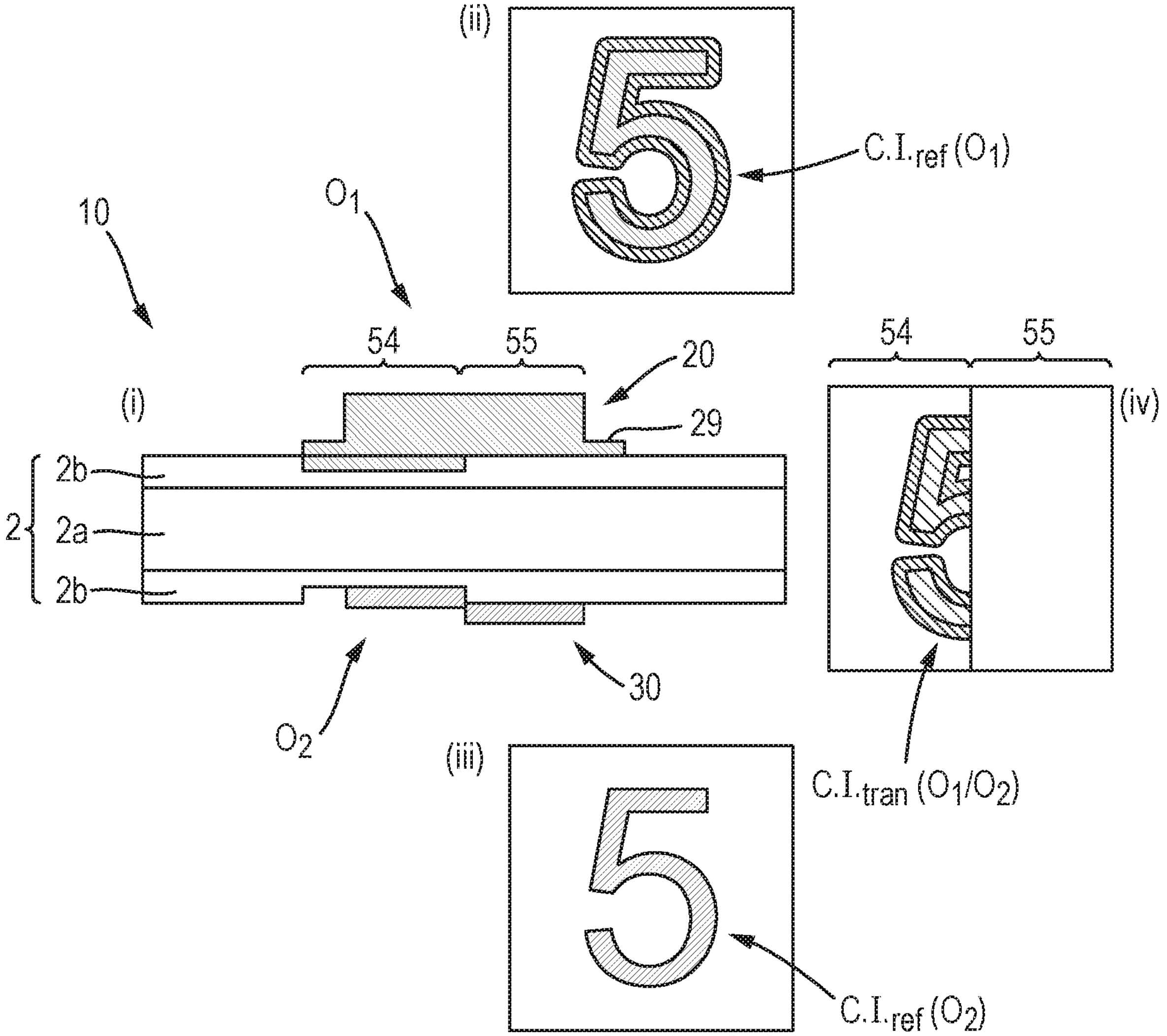
Figure 32F:
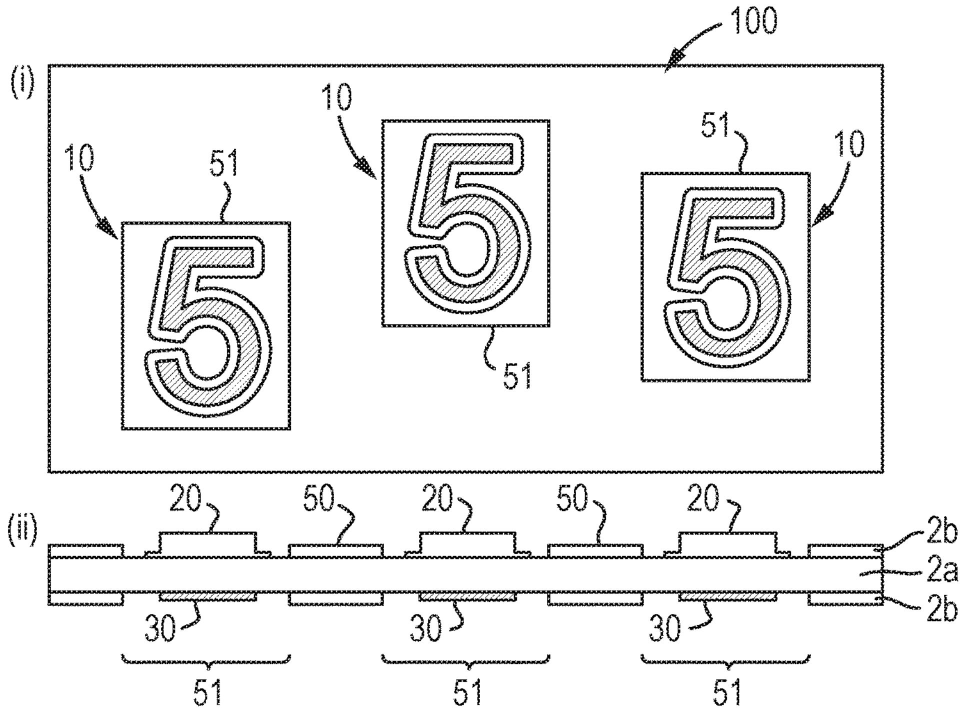
Figure 32G:
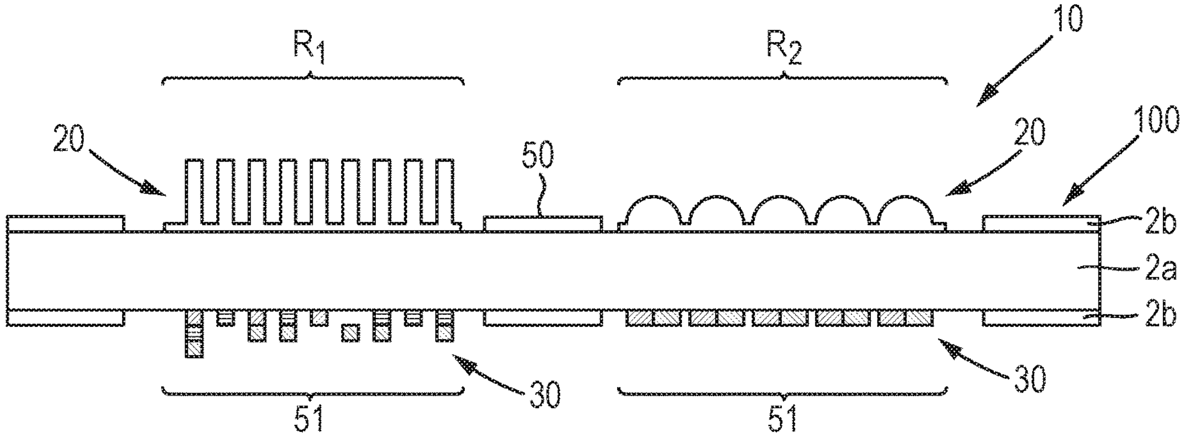

In most of the above examples, the first region $R_1$ where the common image is displayed has been located in a transparent window region 51 of the substrate 2. However, whilst arranging the feature in a window region as described above may be desirable in many cases, so that the image is overtly visible from both sides of the substrate, in other cases it may be preferable to form the security device on a substrate which is not transparent but only translucent. For instance, the feature could be formed on a paper substrate. Alternatively it could be located on a non-window area of a polymer banknote in which at least one opacifying layer 2*b* is present on the substrate. An example of this is shown in FIG. 31. Otherwise, the security device corresponds to that already described with reference to FIG. 8 above. In this case, the offset image will typically not be visible (or barely visible) in reflected light from the side of the casting. The tactility hints at an image and when held to the light, the offset image C.I. is revealed. Of course, the configuration of FIG. 25 could equally be applied to a non-window region in this way. It is also possible for a part of the image to be in a window region and another part to be in a non-window region.

FIGS. 32(*a*) to (*g*) provides some examples of possible configurations. In each case, the substrate 2 is depicted as a multilayer substrate comprising a transparent core substrate 2*a* of a polymer such as BOPP, with opacifying layers 2*b* arranged on each side. However other forms of substrate 2 could be used instead. Regions of the substrate 2 having its standard, base level of opacity are referred to as non-window regions 50. In the example shown, this corresponds to regions where both opacifying layers 2*b* on the two sides 3*a*, 3*b* of the substrate are uniformly present. Here the substrate 2 has its highest level of opacity. In the preceding examples of FIGS. 2 to 30, the security device 10 has been arranged in a window region 51, i.e. where both opacifying layers 2*b* are absent so the substrate 2 is locally transparent (unless a further layer is applied such as layer 70 in FIG. 7). In the FIG. 32(*a*) embodiment, the security device is positioned such that the first region $R_1$ (or at least a portion of it) is located in a half window region 52, i.e. where one of the opacifying layers 2*b* is absent and the other present. Thus, the half window region 52 is translucent rather than transparent, and has a lower opacity than the non-window region 50. In this example, the half window region 52 is formed by locally omitting the opacifying layer 2*b* on the first surface 3*a* of the substrate so that the surface relief structure is formed directly on the surface of transparent core substrate 2*a* (optionally via a primer layer or other surface treatment). The print layer 30 is disposed such that the retained opacifying layer 2*b* on the second surface 3*b* is located between the print layer 30 and the core substrate 2*a*. The reverse arrangement is also possible as shown in FIG. 32(*b*), where the half-window 52 is formed by retaining the opacifying layer on first surface 3*a* and omitting it on the second surface 3*b*. The appearance of the security devices shown in FIGS. 32(*a*) and 32(*b*) will be similar or identical.

In the embodiments of FIGS. 32(*a*) and 32(*b*), as well as those of FIGS. 2 to 30, the non-window region 50 of the substrate 2 could be opaque if desired. All that is required is that at least part of the first region $R_1$ (preferably all of it) is located on a transparent or translucent area of the substrate 2, such as the half-window 52 (or indeed the window regions 51 of previous embodiments). In other cases, where the security device 10 is located in a non-window region 50, as shown in FIG. 32(*c*), it is necessary that the standard base level opacity of the substrate 2 is sufficiently low that the common image can be viewed when the security device 10 is viewed in transmitted light. Standard polymer banknote substrates and conventional paper banknote substrates typically meet this requirement.

In still further examples, the security device 10 could be arranged partially in a window or half-window region and partially in a non-window region. An example of this is shown in FIG. 32(*d*). In this case the non-window region 50 could be opaque or translucent. The window or half window region could if desired be designed to co-operate with the common image, e.g. by interlocking with the common image, repeating elements of the common image or having an outline which matches a feature of the common image.

Similarly, the security device can be configured to interact with any watermark or pseudo-watermark features provided in the substrate 2. Whilst in the Figures, the opacifying layers 2*b* of a polymer-type document substrate 2 are shown for clarity as a single layer on each side of the core 2*a*, in practice they may each be made up of multiple layers. For instance, it is typical for multiple opacifying layers to be disposed on each side of the core 2*a*—for instance in many cases there will be three layers on each side namely a first white opacifying layer, a second conductive opacifying layer (which may be off-white) and then a third white opacifying layer. The individual layers can each be laid down with differing extents, e.g. in the form of parts of an image, resulting in a watermark-like effect which can be seen in transmitted light (and sometimes in reflection). Examples of such features can be found in WO-A-2017/055823. The presently disclosed security device can be designed to display a combined effect with the watermark or pseudo-watermark.

FIG. 32(*e*) shows a simple example. As shown in the cross-section of FIG. 32(*e*)(i), here the pseudo-watermark exhibits two tones—namely that of the bulk substrate 2 where all opacifying layers are present (region 55) and a more translucent tone where one or more (but not all) of the opacifying layers on each side of the core are absent (region 54). The surface relief structure 20 and the print layer 30 are each configured as in the embodiment of FIG. 21. That is, both define an image of the digit "5" with the surface relief structure 20 being formed of a cured material having a coloured tint (e.g. blue) and the print layer having one or more colours (e.g. red). When the device 10 is viewed under reflected light from the side of the surface relief structure 20 (Observer $O_1$), as shown in FIG. 32(*e*)(ii), the image appears as the digit "5" in the colour of the curable material (e.g. blue) with a lighter border region formed by the base layer 29. Any contribution from the print layer 30 is substantially hidden by the substrate 2. When viewed under reflected light from the opposite side (Observer $O_2$), now only the print layer 30 is visible so the device appears as the digit "5" in the colour(s) of the print layer, e.g. red, as shown in FIG. 32(*e*)(iii). When the device is viewed in transmitted light from either side, as seen in FIG. 32(*e*)(iv), the two components combine so that in the region 54 where the watermark feature provides translucency to the substrate, the image appears in a combined colour, e.g. purple. However, due to the placement of the device 10 over the watermark, only a left portion of the image is visible. The right part of the image is concealed by the relatively opaque region 55 of the substrate. It will be appreciate that whilst the embodiment has been illustrated using a pseudo-watermark formed by the presence/absence of opacifying layers in a polymer document substrate, the same effects could be achieved with a conventional watermark formed in a fibrous, e.g. paper, substrate (where the different opacity levels are provided by varying the fibre density or thickness of the substrate).

It will also be appreciated that different regions of the security device could be located in respective different window (or half-window) regions of a security document and/or each such window (or half-window) region could carry a respective security device. For instance, FIG. 32(*f*) shows an embodiment of a security document 100 having three security devices 10 (each in accordance with any of the present embodiments) disposed in separate corresponding window regions 51. The window regions 51 are spaced from one another by non-window regions 50 in which the opacifying layer 2*b* are present. The surface relief structures 20 in each window 51 are preferably formed simultaneously, in a common cast-cure process. That is, a single casting tool carries a surface relief defining each of the surface relief structures 20 and their locations relative to one another, which shapes are transferred into the curable material in one processing step. The curable material itself may or may not extend between the window regions. FIG. 32(*g*) shows another example, in which the document 100 has two window regions 51, again separated by non-window region(s). In this case, there is a single device 10 of which a first region $R_1$, displaying a common image, is located in one window region 51 and a second region $R_2$, e.g. in the form of an optically variable security device, is located in the other window region 51. Again, the curable material forming the surface relief 20 may or may not extend between the window regions, and likewise the print layer 30 may or may not continue between the window regions.

Figure 33:
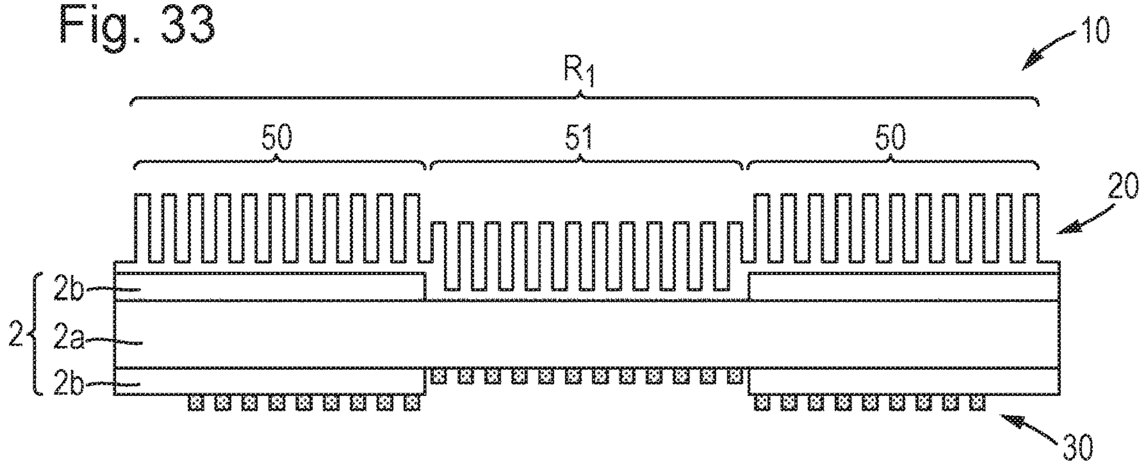
FIG. 33 shows another embodiment of a security device in accordance with the present invention, in cross-section.

As noted above, while at least part of the first region $R_1$ (across which the common image is displayed) needs to be located in a region where the substrate between the surface relief structure and print layer is transparent or translucent, it is not essential for all of the first region $R_1$ to be so located (although this may be preferred). The combination of the surface relief structure 20 and the print layer 30 may be needed to complete only part of the common image C.I. FIG. 33 shows an embodiment of such an arrangement, in which the first region $R_1$, across which the surface relief structure 20 and print layer 30 are configured to exhibit the common image, includes both a non-window region 50 of the substrate 2 and a window region 51. The non-window region 50 could be translucent or opaque.

In all of the embodiments described so far, as noted at the outset, it has been assumed that the security device is formed on a substrate 2 which also acts as the document substrate for the eventual security document 100. Suitable document substrates include polymer document substrates of the type already referred to above and shown again in FIG. 34(*a*), where the substrate 2 comprises a core substrate of a transparent polymeric material such as polypropylene (PP) (most preferably bi-axially oriented PP (BOPP)), polyethylene terephthalate (PET), polyethylene (PE), polycarbonate (PC), polyvinyl chloride (PVC), nylon, acrylic, Cyclic Olefin Polymer (COP) or Cyclic Olefin Copolymer (COC), or any combination thereof. The polymer substrate 2*a* may be monolithic, e.g. formed from a single one of the above materials, or multi-layered, e.g. having multiple layers of the same type of polymer (optionally with different orientations) or layers of different polymer types. As mentioned previously, by "transparent" it is meant that the polymer substrate 2*a* is substantially visually clear, although it may carry a coloured tint and/or another optically detectable substance such as a fluorescent material.

One or both surfaces of the polymer substrate 2*a* may be treated to improve adhesion/retention of subsequently applied materials. For example, a primer layer may be applied to all or part of either surface of the polymer substrate 2*a*, e.g. by printing or coating. The primer layer is preferably also transparent and again could be tinted or carry another optically detectable material. Suitable primer layers include compositions comprising polyethylene imine, hydroxyl terminated polymers, hydroxyl terminated polyester based co-polymers, cross-linked or uncross-lined hydroxylated acrylates, polyurethanes and UV curing anionic or cationic acrylates.

Alternatively or in addition to the application of a primer layer, the surface of the polymer substrate 2*a* may be prepared for onward processing by controlling its surface energy. Suitable techniques for this purpose include plasma or corona treatment.

The opacifying layer(s) 2*b* each comprise a non-transparent material, the primary purpose of which is usually to provide a suitable background for later printing of graphics thereon. Thus, preferably, the opacifying layers comprise polymeric, non-fibrous material containing at least a light scattering substance such as a pigment. The opacifying layers 2*b* are preferably light in colour, most preferably white or another light colour such as off-white or grey so that a later-applied graphics layer will contrast well against it. In preferred examples, the opacifying layers each have a brightness L* in CIE L*a*b* colour space of at least 70, preferably at least 80 and more preferably at least 90. For example, each opacifying layer may comprise a resin such as a polyurethane based resin, polyester based resin or an epoxy based resin and an opacifying pigment such as titanium dioxide ($TiO_2$), silica, zinc oxide, tin oxide, clays or calcium carbonate.

Two or more opacifying layers may be applied to each surface of the polymer substrate 2*a*, in order to achieve the necessary opacity. The optical density of each layer by itself may typically be around 0.2 to 0.5. Preferably, 3 or more layers are applied to each surface, overlapping one another.

In a preferred embodiment, at least one of the opacifying layers (preferably one on each surface of the polymer substrate 2*a*) is made electrically conductive, e.g. by the addition of a conductive pigment thereto. This reduces the effect of static charges which may otherwise build up on the security document during handling.

The opacifying layers 2*b* are preferably applied to the polymer substrate 2*a* before the manufacture of the presently disclosed security device 10, using a printing process such as gravure printing, although in other cases the opacifying layers could be coated onto the substrate, or applied by offset, flexographic, lithographic or any other convenient method. Depending on the design of the security document, the opacifying layers may be omitted across gaps on one or both surfaces of the polymer substrate to form window regions (which may be full windows or half windows, or a mixture of both) as described above. This can be achieved through appropriate patterning of the opacifying layers during the application process. In alternative constructions, the opacifying layers 2*b* could comprise self-supporting pre-formed layers (optionally including apertures to later form windows) which are then laminated to the polymer substrate 2*a*. In this case, the opacifying layers could be polymeric or could be of fibrous construction, such as paper, thus rendering the security document a “hybrid” paper/polymer construction.

Figure 34A:
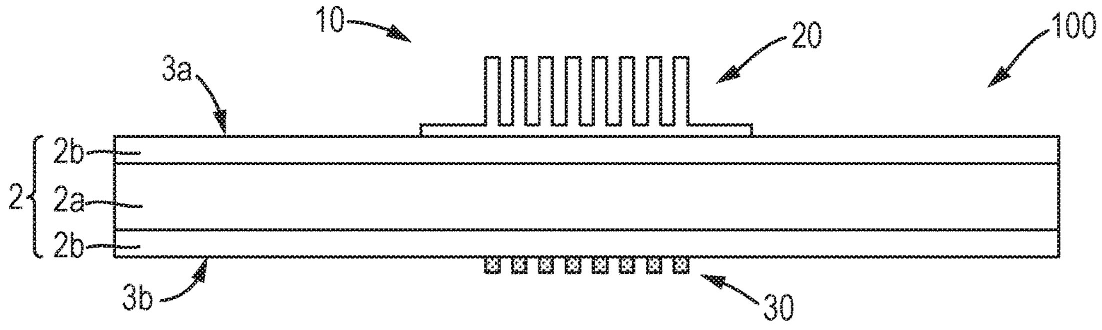
FIGS. 34(*a*), (*b*) and (*c*) show three embodiments of security documents having security devices in accordance with the present invention, in cross-section.
Figure 34B:
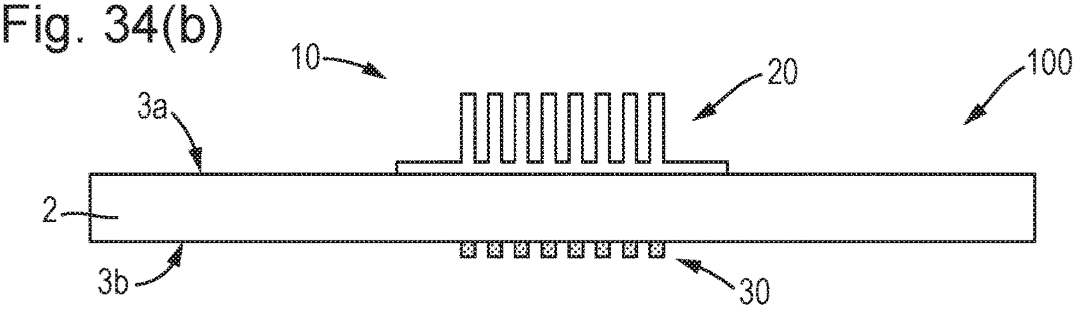
Figure 34C:
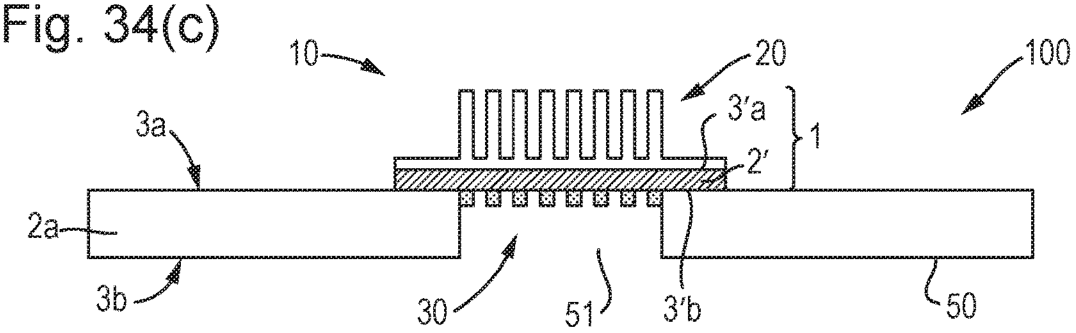

In other embodiments, such as is shown in FIG. 34(*b*), the security device 10 could be formed on a conventional document substrate 2. Such substrates are typically fibrous in nature, comprising for instance paper or regenerated cellulose (e.g. as disclosed in WO-A-2020156655). As before, the surface relief structure 20 is disposed on a first surface 3*a* of the substrate 2 and the print layer 30 is applied to the opposite surface 3*b*.

Figure 35A:
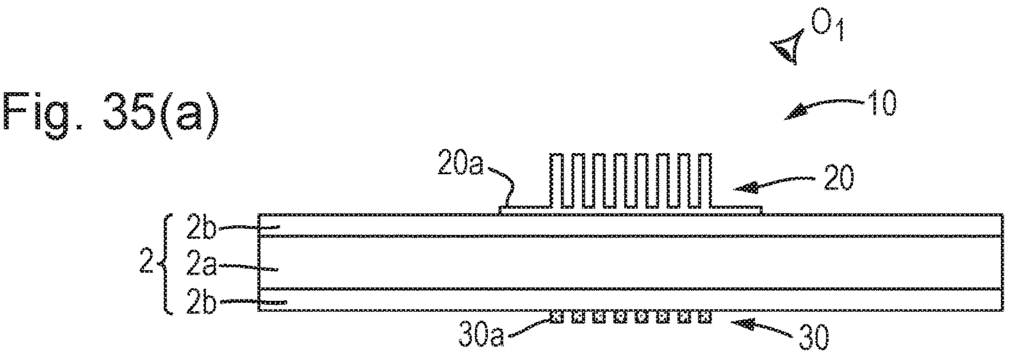
FIG. 35(*a*) shows an embodiment of a security device in accordance with the present invention, in cross-section, and FIG. 35(*b*) shows (i) the appearance of the security device viewed in reflected light from the position of observer $O_1$, and (ii) the appearance of the security device viewed in transmitted light.
Figure 35B:
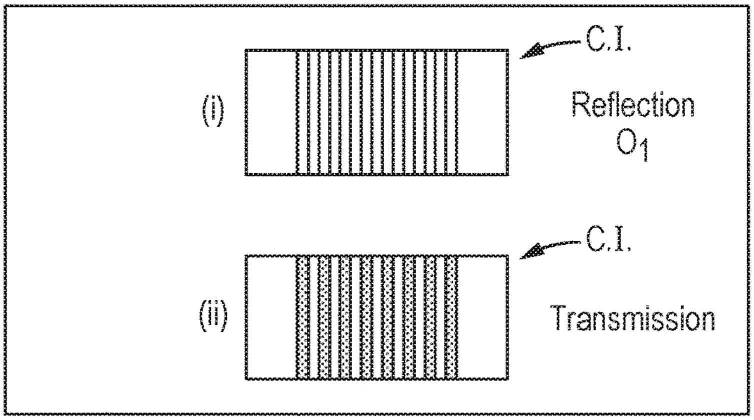

It is also possible to form the security device 10 on a substrate other than the document substrate 2. For instance, the security device 10 can be formed on its own substrate, resulting in a security article 1 such as a security thread, strip, foil or patch. Before or after this takes place, the security article substrate can be affixed to or incorporated into a security document 100. An example of this is shown in FIG. 34(*c*), where the security device 10 is formed on a security device substrate 2' such as a transparent polymer film (e.g. PET), either before or after the substrate 2' is joined to the security document 100. This security device substrate 2' will typically be thinner than a document substrate 2 (e.g. of the order of 30 to 50 microns thick rather than 100 microns or greater). The surface relief structure 20 is formed on a first surface 3'*a* of the substrate 2', and the print layer 30 is formed on a second surface 3'*b* of the substrate 2'. In this example, the security article 1 is shown to be affixed to a first surface 3*a* of the security document substrate 2 with the security device 10 (or at least a part thereof) over a window region 51 of the document formed by an aperture through the document substrate 2, as may typically be the case where the document substrate 2 is paper or similar. It is also possible to locate a security article 1 of this sort with the security device 10 in a non-window region 50 of the document substrate 2, since the combination of the surface relief structure 20 and print layer 30 can still be seen due to the transparent or translucent nature of device substrate 2'. Security articles 1 can alternatively be applied to polymer type document substrates, in window regions, half-window regions and/or non-window regions thereof.

Where the substrate 2 on which the security device 10 is formed is translucent rather than transparent, the appearance of the common image C.I. will typically be different when viewed in reflected light versus transmitted light, and may also be different when viewed in reflected light from different sides. FIG. 35 illustrates this by reference to a simple embodiment in which the common image comprises a set of straight parallel lines in a rectangular zone. As shown in FIG. 35(*a*), the surface relief structure 20 is formed of a colourless cured material 20*a* and is disposed on a first surface of translucent substrate 2 (e.g. in a non-window or half-window region of a paper or polymer substrate). The surface relief structure 20 comprises a set of raised line elements corresponding to the parallel lines of the image. On the opposite surface of the substrate 2 the print layer 30 is disposed and comprises a set of line elements again corresponding to the parallel lines of the image, aligned with the raised elements of the surface relief structure 20. The ink 30*a* from which the printed lines are formed may be yellow, for example. As shown in FIG. 35(*b*)(i), when the security device is viewed in reflected light from the side on which observer $O_1$ is located, only the surface relief structure will be visible while the contribution from the print layer 30 is substantially obscured by the substrate 2. Thus the common image C.I. appears as a colourless set of parallel lines made visible by the reflective nature of the cured material 20*a*. When the same device 10 is viewed in transmitted light (from either side), the print layer 30 is visible and thus the common image now appears as a set of parallel yellow lines against a colourless background (or rather, the background will have the same colour as that of the substrate 2). The common image will be tactile as a result of the surface relief structure.

Figure 36A:
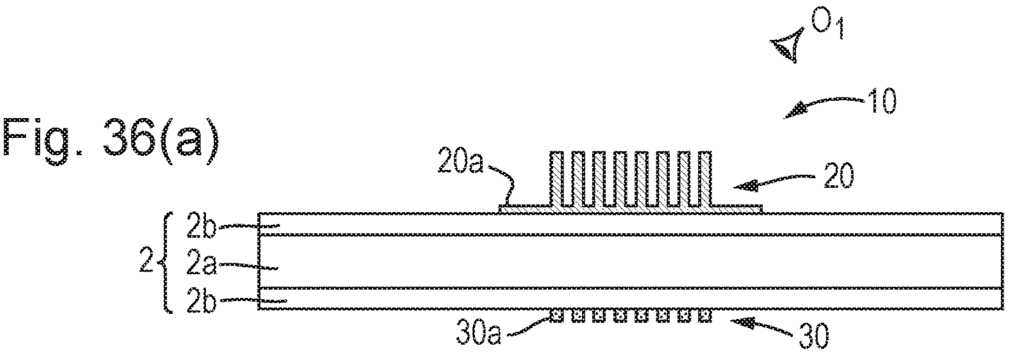
FIG. 36(*a*) shows an embodiment of a security device in accordance with the present invention, in cross-section, and FIG. 36(*b*) shows (i) the appearance of the security device viewed in reflected light from the position of observer $O_1$, and (ii) the appearance of the security device viewed in transmitted light.
Figure 36B:
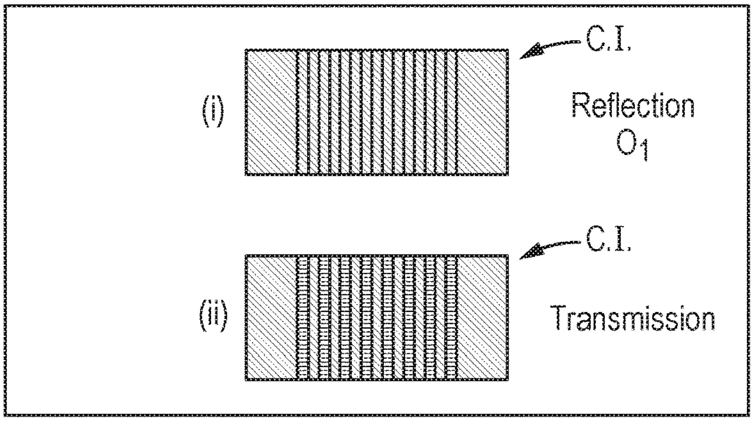

FIG. 36 shows a further embodiment which is the same as that of FIG. 35, except here the cured material 20*a* forming the surface relief structure carries a coloured tint, e.g. blue. Hence, when the security device 10 is viewed in reflected light from the side on which observer $O_1$ is located, only the surface relief structure will be visible while the contribution from the print layer 30 is substantially obscured by the substrate 2, as shown in FIG. 36(*b*)(i). Thus the common image C.I. may appear as a blue rectangle having a superimposed set of parallel lines made visible by the reflective nature of the cured material 20*a*, as shown. Alternatively, depending on the intensity of the blue tint in the cured material 20*a* and the relative heights of the raised elements and base layer, the background area could appear much lighter in colour (or even colourless) as compared with the raised elements so that the appearance is of a set of blue parallel lines. When the same device 10 is viewed in transmitted light (from either side), the print layer 30 is visible and thus the common image now appears as a set of parallel green lines against a blue rectangular background. Alternatively if the blue tint in the base layer of the surface relief structure is very light the background may appear substantially colourless. The colour of the lines results from a mixture of the colour of the cured material 20*a* and that of the ink 30*a*. The common image will be tactile as a result of the surface relief structure.

The opacity level of the substrate 2 can also be utilised to create different visual effects from one and the same security device configuration. This is illustrated by reference to the embodiment of FIG. 37, in which three copies of a security device with the same construction are provided on one security document 100. The security devices 10*a*, 10*b* and 10*c* each comprise a surface relief structure 20 formed of a cured material 20*a* having a coloured tint (e.g. blue) on a first surface of the substrate 2, and an aligned print layer 30 on the opposite surface formed of an ink 30*a* (e.g. red). The only difference between the three security devices 10*a*, 10*b* and 10*c* is their peripheral shape which here differs in order to quickly identify the three devices. Security device 10*a* is circular, 10*b* is square and 10*c* is triangular. As shown best in the cross-section of FIG. 37(*a*), circular security device 10*a* is located in a half window region 52 of the security document 100, in which one of the opacifying layers 2*b* is present but not the other, such that the area is translucent. Square security device 10*b* is located in a (full) window region 51, in which both opacifying layers 2*b* are absent making this area transparent. Triangular security device 10*c* is located in a non-window region 50 of the security document 100, which is translucent (but less so than half window region 52).

Figure 37A:
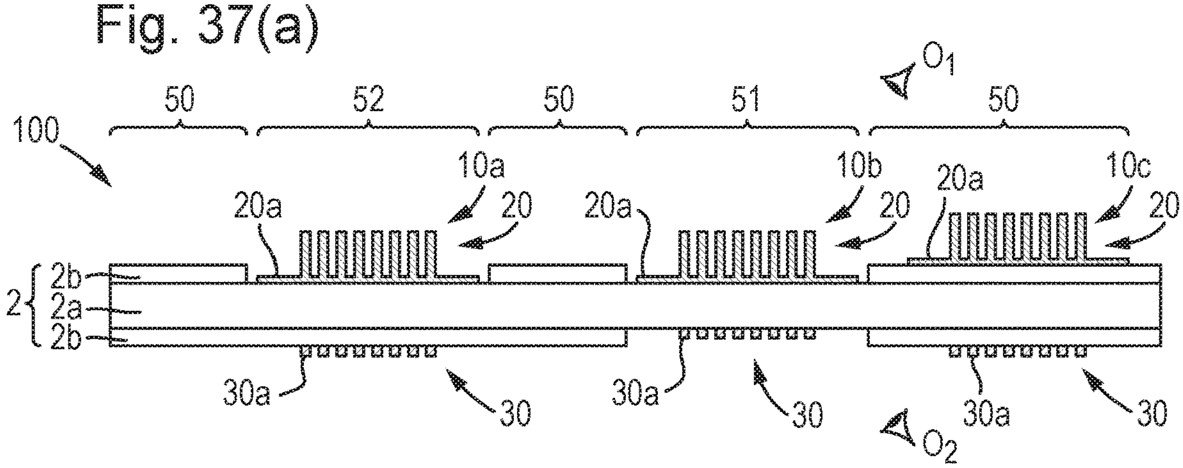
FIG. 37(*a*) shows an embodiment of a security document having three security devices each in accordance with the present invention, in cross-section, FIG. 37(*b*) shows (i) the appearance of the security device viewed in reflected light from the position of observer $O_1$, and (ii) the appearance of the security device viewed in transmitted light from the position of observer $O_1$, and FIG. 37(*c*) shows (i) the appearance of the security device viewed in reflected light from the position of observer $O_2$, and (ii) the appearance of the security device viewed in transmitted light from the position of observer $O_2$.
Figure 37B:
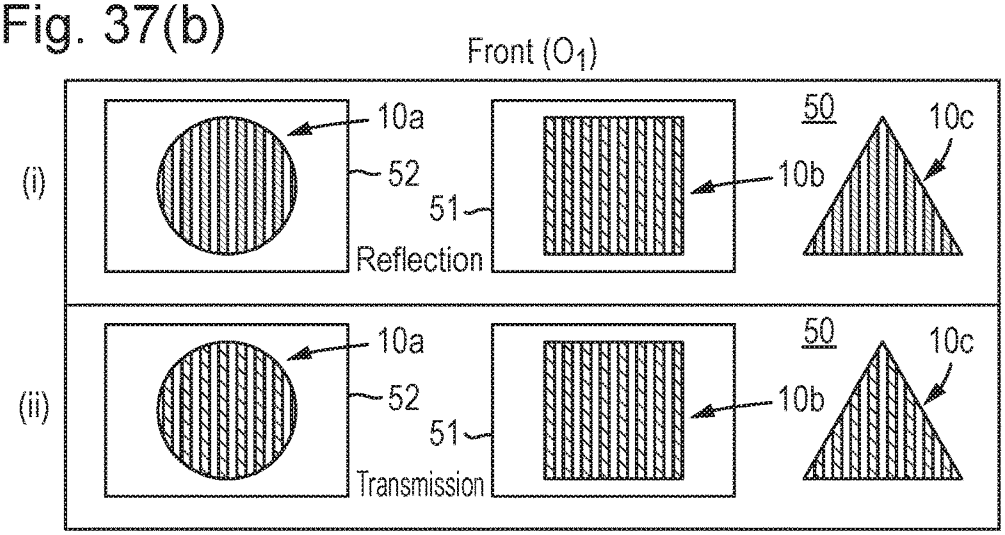
Figure 37C:
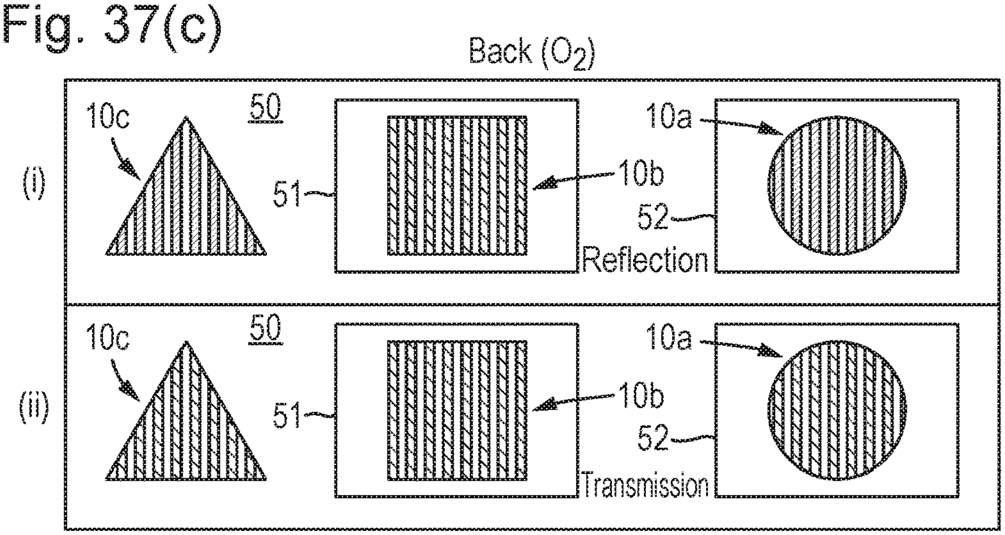
Figure 38A:
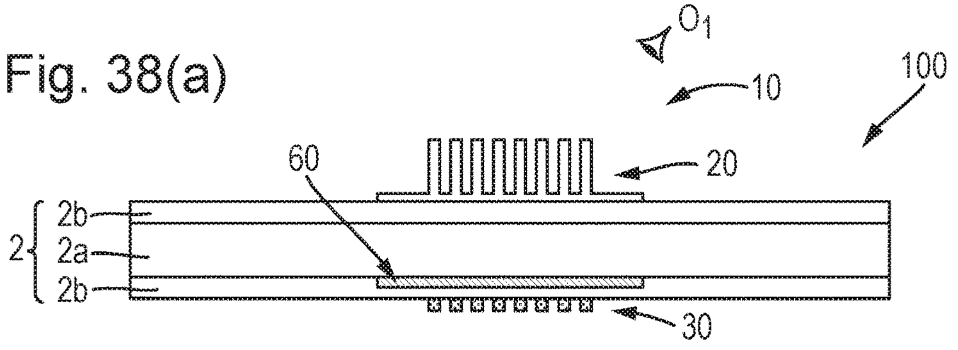
FIGS. 38(*a*), (*b*) and (*c*) show three variants of a further embodiment of a security device in accordance with the present invention, in cross-section, and FIG. 38(*d*) shows (i) the appearance of the security device in reflected light from the position of observer $O_1$, and (ii) the appearance of the security device in transmitted light.
Figure 38B:
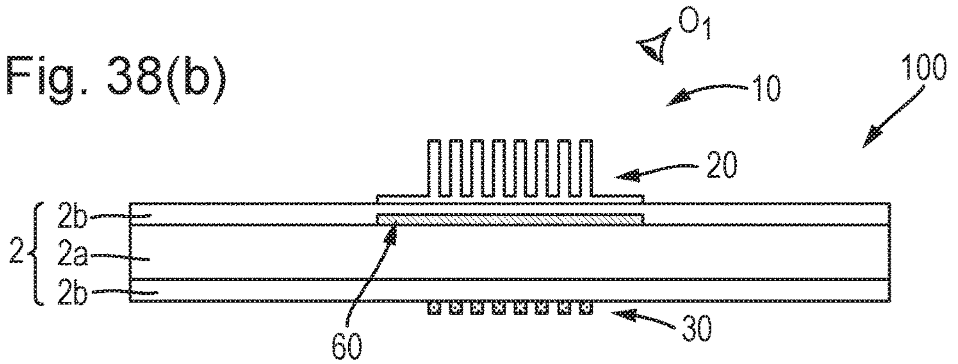
Figure 38C:
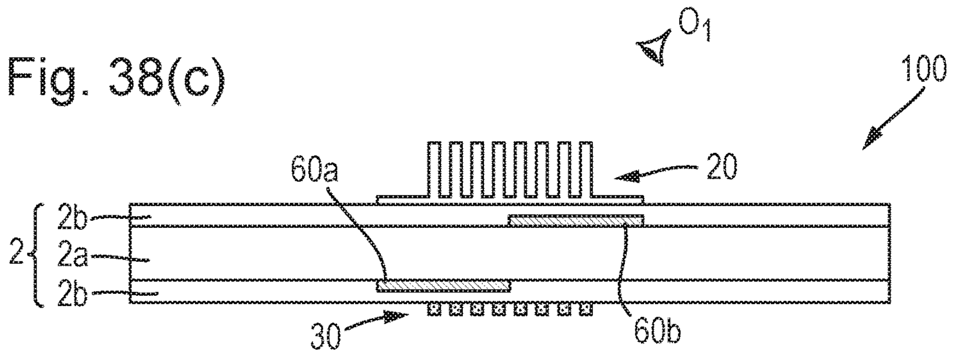
Figure 38D:
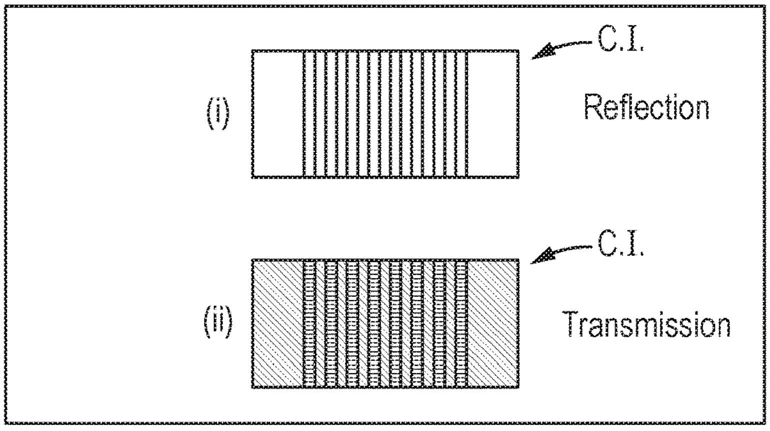

FIG. 37(*b*) shows the appearance of the security document from the point of view of observer $O_1$ in reflected light. The circular security device 10*a* in the half-window region 52 appears as a set of spaced parallel blue lines against a background having the same colour as the substrate 2 (here it is assumed that the tint level and relative heights of the raised elements versus the base layer is such that the base layer appears substantially colourless), since the contribution from the print layer 30 is obscured by the substrate 2. The square security device 10*b* exhibits a set of purple line elements in a transparent window, resulting from a mixture of the blue raised elements in the surface relief 20 and the red print elements 30. The triangular security device 10*c* exhibits a set of blue line elements against a background having the same appearance of substrate 2 and is thus similar in appearance to security device 10*a*. When the security document 100 is viewed in transmitted light from the position of observer $O_1$ (FIG. 37(*b*)(ii)), all three security devices 10*a*, 10*b*, 10*c* appear to exhibit a set of purple lines caused by the mixed colours. Thus the appearance of the group of security devices changes between reflective and transmissive viewing modes.

Similarly, when the security document is viewed from the opposite side (observer $O_2$), as shown in FIG. 37(*c*)(i), the triangular security device 10*c* and the circular security device 10*a* each exhibit a set of ref lines (corresponding to the colour of print layer 30) since the contributions from the surface relief structure are now hidden by the translucent nature of the substrate 2 in these regions. The square security device 10*b* still appears as a set of purple lines in a transparent window. In transmitted light, as shown in FIG. 37(*c*)(ii), the three security devices each exhibit a set of purple lines, as before. In this way, complex effects can be achieved in which at least three different colour appearances are exhibited by the security document, depending on the side from which the document is viewed and on the mode of viewing. It should be appreciated that whilst in this example three separate security devices 10 have been employed to illustrate the principle, the same can be applied to different laterally offset parts of a single security device 10. That is, each part of a security device could be located on any of: a window region, a half-window region and a non-window region, and preferably a mixture of such regions is provided.

In a development of the invention, further complexity can be achieved by additionally providing an integral print mark 60 in the substrate 2. Print marks are formed during manufacture of a document substrate, rather than being applied to the substrate during later processing thereof. Typically, a print mark may be integrated into a multilayer polymer document substrate during the same process as that which applies the opacifying layer 2*b* to the core substrate 2*a*, e.g. via gravure printing. Thus, the integral print mark 60 will be in precise register with the opacifying layers 2*b* and particularly any window regions or half-window regions they define. Such print marks can be incorporated into security devices of the sort herein disclosed (in addition to the print layer 30), by arranging the first region $R_1$ to partially or fully overlap the print mark 60 or otherwise interact with it (e.g. appearing to abut, surround or interlock with the print mark). It will be appreciated that the degree of register between the print mark 60 and the rest of the security device 10 may not be as accurate as the register between the surface relief structure 20 and the print layer 30, since it is formed in a separate, earlier process (not in-line with the application of the surface relief structure 20 and the print layer 30). Some examples of security devices 10 incorporating print marks 60 will now be described with reference to FIGS. 38 to 42.

FIGS. 38(*a*), (*b*) and (*c*) are cross-sections through a simple embodiment of a security device 10 formed on a substrate 2 having a print mark 60, showing three different possible arrangements of the print mark 60. In each example, the security device 10 comprises a surface relief structure 20 formed of a colourless cured material and a print layer 30 formed of a coloured ink, e.g. yellow. The common image is of a set of parallel lines in a rectangular zone. In the FIG. 38(*a*) embodiment, a print mark 60 in the form of a blue rectangle (formed of a semi-transparent blue tinted ink) is located on the surface of transparent core substrate 60 adjacent print layer 30, with an opacifying layer 2*b* located between them. Alternatively, as shown in FIG. 38(*b*), the same print mark 60 could be located on the opposite surface of transparent core substrate 2*a*. Alternatively still, the print mark 60 could be distributed between both surfaces of the core substrate 2*a*—for instance, as shown in FIG. 38(*c*), a first half 60*a* of the print mark may be located on one side of core substrate 2*a*, and a second half 60*b* on the other. If the opacifying layers 2*b* are of sufficiently optical density, the security devices 10 shown in FIGS. 38(*a*), (*b*) and (*c*) will all exhibit the same appearance as one another, as shown in FIG. 38(*d*). In reflected light from the point of view of observer $O_1$, the common image will appear as a colourless rectangle (having the same colour as opacifying layer 2*b*) with a set of lines thereon made visible by the reflective nature of the cured material (FIG. 38(*d*)(i)). In transmitted light from either side, the contributions made by the print layer 30 and the print mark 60 will now be visible as shown in FIG. 38(*d*)(ii), resulting in the common image showing a blue rectangle with green lines superimposed thereon. If the opacifying layers are more translucent, the device shown in FIG. 38(*a*) will appear as shown in FIG. 38(*d*) as before, but the devices of FIGS. 38(*b*) and (*c*) will exhibit a blue hue in reflection in the areas where the print mark is on the observer side of the substrate.

Figure 39A:
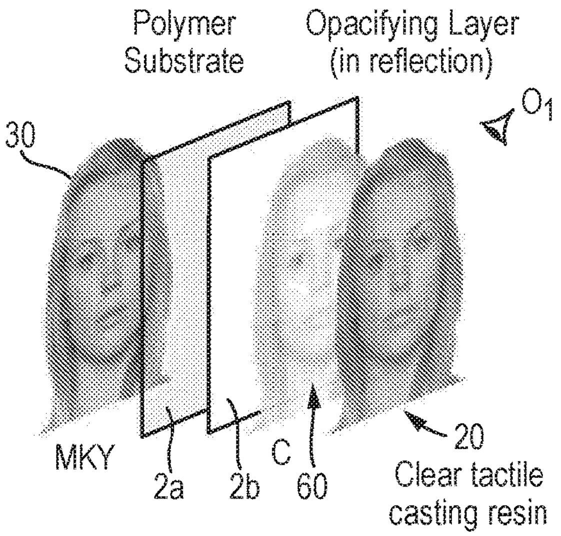
FIG. 39(*a*) schematically depicts another example of a security device in accordance with the invention, in an exploded view, and FIG. 39(*b*) shows (i) the appearance of the security device in reflected light from the position of observer $O_1$, and (ii) the appearance of the security device in transmitted light.
Figure 39B:
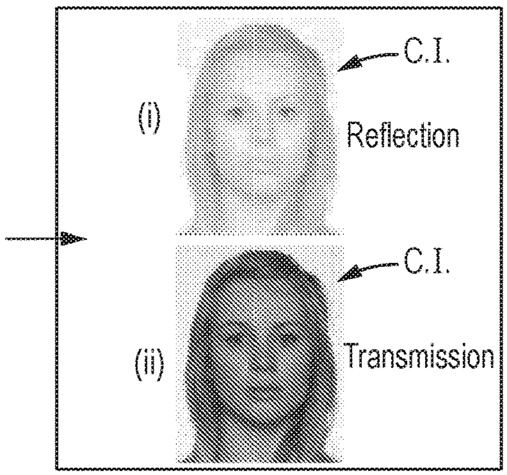

While in the above examples the integral print mark 60 has been located such that it is covered by at least one of the opacifying layer 2*b*, this is not essential and the print mark 60 could be located on an external surface of the substrate 2. The print mark is still considered integral with substrate 2 since it is formed during manufacture of the substrate 2 rather than during later processing of the substrate into security documents. As before the print mark 60 may be applied in line with the opacifying layers 2*b*, e.g. via gravure printing. FIG. 39 shows an embodiment which utilises this approach. Here, the security device is located in a half window region or non-window region of a polymer substrate where at least one opacifying layer 2*b* is present on the transparent core substrate 2*a*. The common image CI to be viewed in transmitted light is a full colour photographic portrait (FIG. 39(*b*)(i)). The image is formed in CMYK colour channels (although RGB could alternatively be used). An integral print mark 60 is incorporated on an external surface of the substrate 2 during manufacture thereof, and is configured to provide one of the colour components of the portrait, e.g. cyan. To form the security device, a surface relief structure defining the same portrait is applied to the same surface of the substrate 2, over the print mark 60 and in alignment therewith. The surface relief structure is formed of a colourless cured material and provides tactility to the common image as before. On the opposite surface of the substrate, a print layer 30 is applied which comprises the magenta, black and yellow components of the portrait. When the security device is viewed in reflected light from the position of observer $O_1$, the contribution of the print layer 30 is obscured by the opacifying layer 2*b* and so the common image appears as a monocolour, multitonal version of the portrait in cyan. When the security device is viewed in transmitted light from either side, the full colour version of the image can be seen.

Figure 40A:
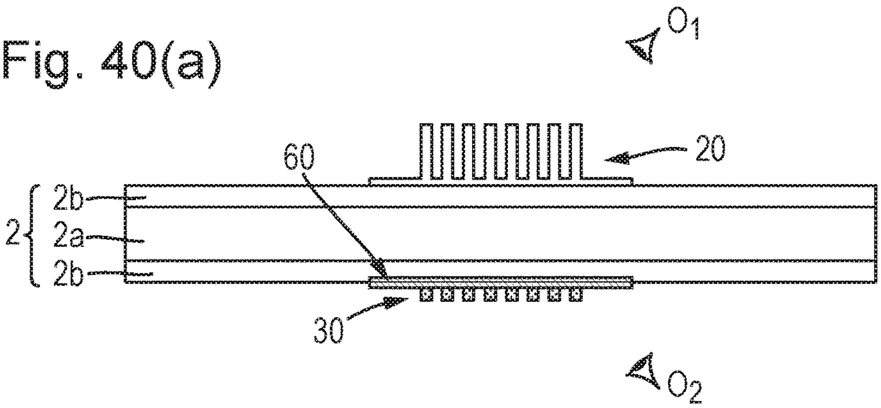
FIG. 40(*a*) shows an embodiment of a security device in accordance with the present invention, in cross-section, FIG. 40(*b*) showing (i) the appearance of the security device viewed in reflected light from the position of observer $O_1$, (ii) the appearance of the security device viewed in transmitted light from the position of observer $O_1$; and (iii) the appearance of the security device viewed in reflected light from the position of observer $O_2$.
Figure 40B:
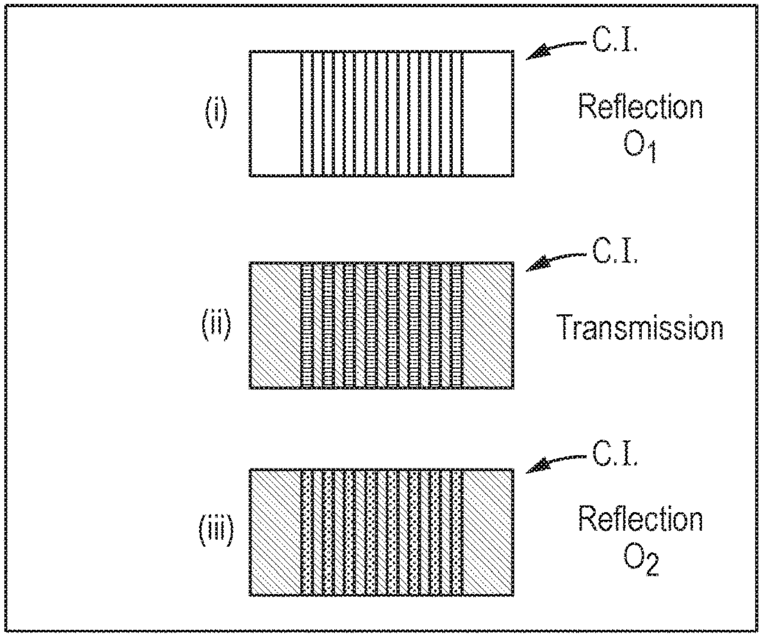

Another example is shown in FIG. 40. Here the security device 10 is of a simpler design with the common image comprising a set of parallel spaced lines in a rectangular zone. The security device is formed on a non-window region of the substrate 2 which includes a print mark 60 on the exterior of second surface 3*b* thereof. Here the print mark 60 is a blue rectangle. The print layer 30 is applied onto print mark 60, and comprises a set of line elements corresponding to those of the common image, printed in an ink such as yellow. A surface relief structure 20 formed in a colourless cured material is applied to the opposite surface of the substrate 2 and defines a set of parallel raised line elements. When the security device 10 is viewed in reflected light from the position of observer $O_1$, the common image appears as a colourless region (matching the appearance of the substrate 2) with a set of lines superimposed on it, made visible by the reflective nature of the cured material. This is shown in FIG. 40(*b*)(i). In transmitted light (FIG. 40(*b*)(ii)), contributions from the print layer 30 and print mark 60 cause the common image to appear as a set of green lines against a blue rectangular area, the green colour resulting from a mix of the print mark colour and that of the ink forming print layer 30. When the device is viewed in reflected light from the position of observer $O_2$, the image appears as a set of yellow lines on a blue background (FIG. 40(*b*)(iii)).

Figure 41A:
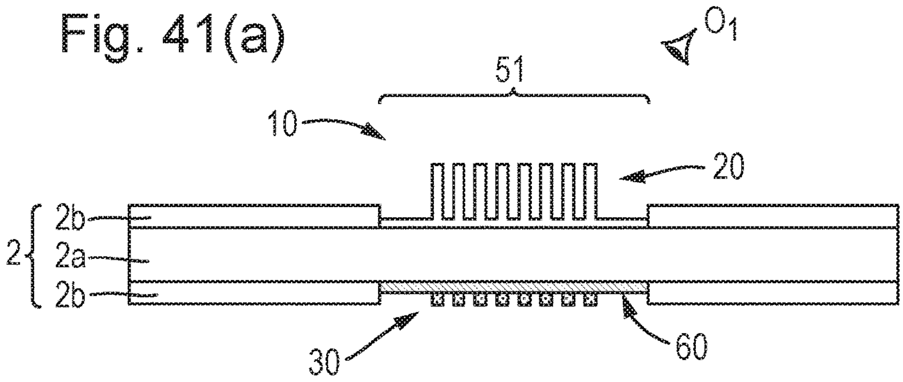
FIG. 41(*a*) schematically depicts another example of a security device in accordance with the invention, in cross-section, and FIG. 41(*b*) shows (i) the appearance of the security device in reflected light from the position of observer $O_1$, and (ii) the appearance of the security device in transmitted light.
Figure 41B:
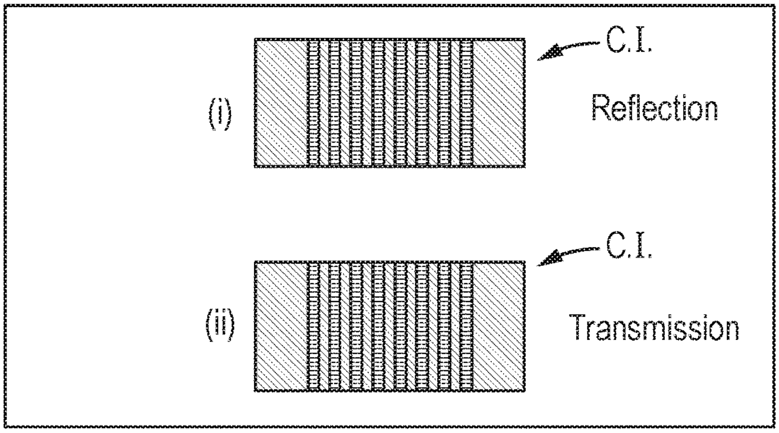

In a variant of this embodiment, shown in FIG. 41, the same security device is now located in a transparent window region 51 of the substrate 2. The print mark 60 is also located in the transparent window. Now the appearance of the security device 10 will be the same in reflected and transmitted light, and from either side of the device, comprising a set of green lines against a blue background.

Figure 42:
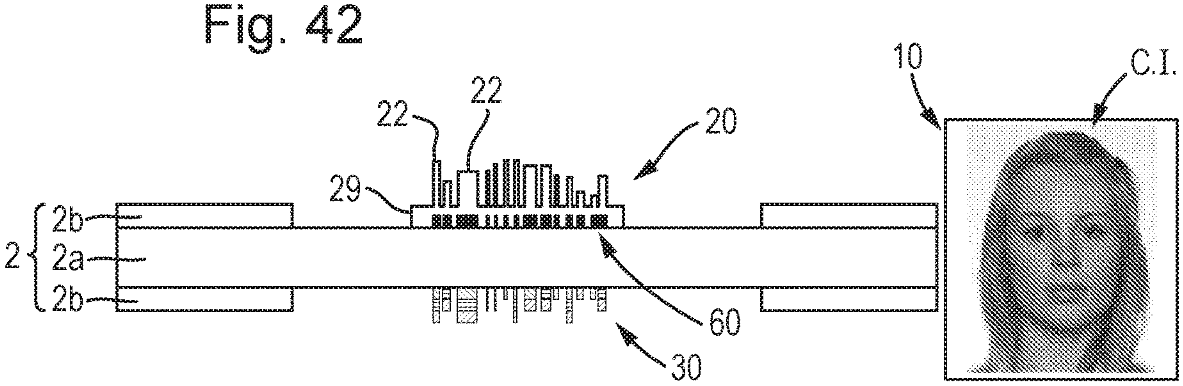
FIG. 42 shows a further embodiment of a security device in accordance with the present invention, each in cross-section and plan view.
Figure 43A:
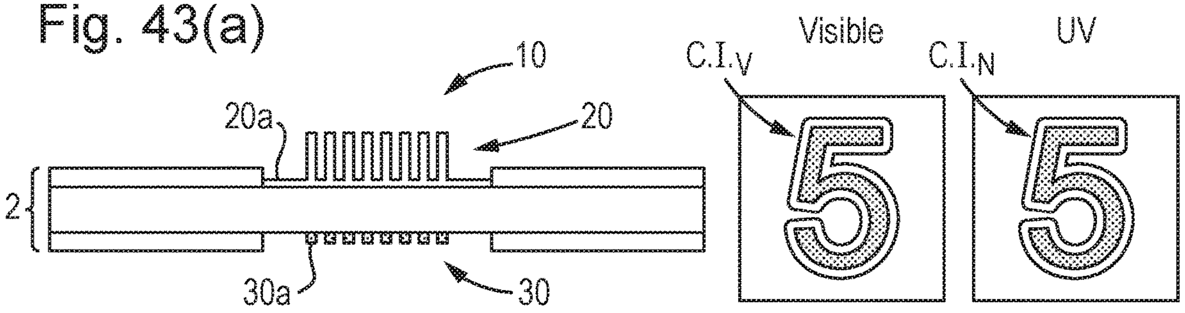
FIGS. 43(*a*), (*b*), (*c*) and (*d*) show four further embodiments of security devices in accordance with the present invention, each in cross-section and plan view.
Figure 43B:
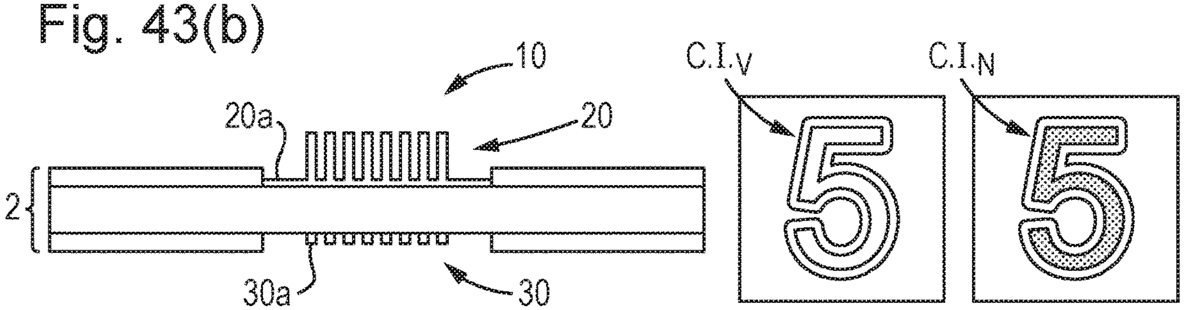
Figure 43C:
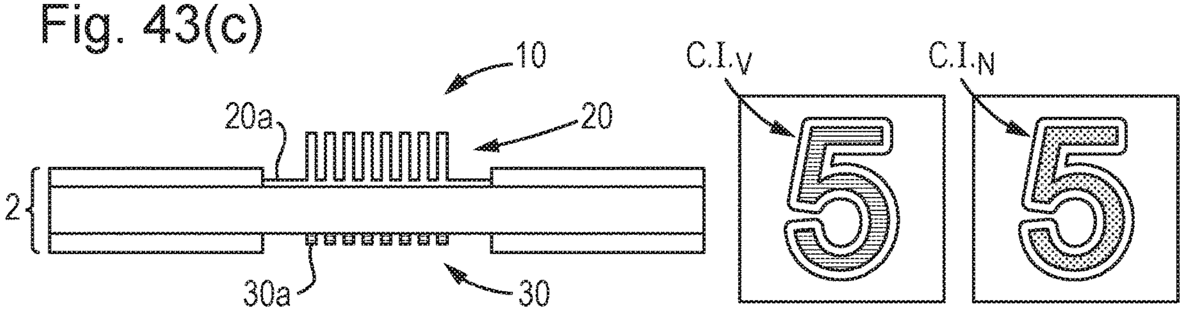
Figure 43D:
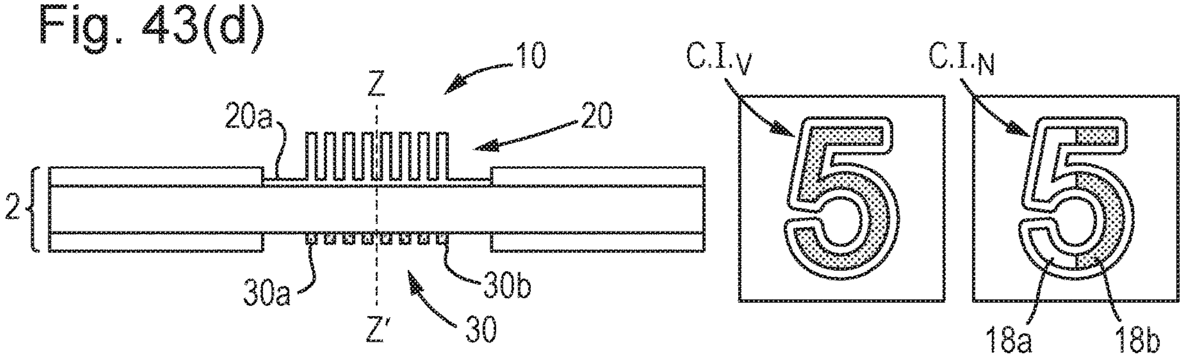

FIG. 42 shows a further embodiment which is similar to that of FIG. 39. In this case, it is the black component of the full colour portrait which is provided by the print mark 60 although any one or more of the components could be formed in this way. In this embodiment, the surface relief structure 20 is configured so as to encapsulate the print mark 60—i.e. completely covering the print mark 60 and sealing it from contact with the atmosphere or anything external. In this way the print mark 60 is protected from external influences and the lifetime of the security device is improved.

In another example, a registered 'border' effect using this method could be applied around a hidden gravure print mark (the registration to the original mark as standard). For instance, the cast tactile structure could define only an outline of the image while the print mark defines the full image.

Optionally, the substrate itself could carry a coloured tint, e.g. in one or more of the opacifying layers. This colour will contribute to the overall appearance of the image in transmitted light and can therefore act as a colour channel in a 'full colour' image.

In each of the above examples, the cast tactile structure could take various different forms depending on the nature of the tactility desired and/or on the manner in which the structure contributes to the visible image. In some examples, the cast structure could comprise an array of screen elements, making up a screened version of the image. In other cases the cast UV resin may cover the whole of the image (sharing its periphery or matching certain features thereof to reveal the register) and may carry a textured upper surface. In still further cases the cast structure could follow the contours of a 3D version of the image.

In all of the above embodiments, the print layer 30 has been formed of one or more visibly coloured materials (e.g. inks) such that the common image is visible to the naked eye under standard lighting conditions, e.g. white light. However, in all of the embodiments it is possible to form the print layer 30 using one or more substances which are responsive to stimuli such as non-visible illumination wavelengths and/or which exhibit different behaviours outside the visible spectrum (which may be detected by suitable camera apparatus). For instance, one or more of the materials (e.g. inks) forming the print layer 30 could be luminescent (e.g. fluorescent or phosphorescence) and/or could absorb certain non-visible wavelengths (such as IR). It is also possible to form the print layer 30 from materials with other secure effects such as optically variable inks, pearlescent inks, iridescent inks, metallic inks, electrically conductive inks, thermochromic inks, magnetic inks etc.

FIGS. 43(*a*) to (*d*) show some examples of security devices utilising one or more inks which luminesce in response to UV wavelengths. All of these embodiments are tactile due to the presence of the surface relief structure 20 as before, which here is formed of a colourless cured material 20*a*. In the FIG. 43(*a*) embodiment, the whole print layer 30 is formed of a material 30*a* which appears a first colour under standard visible illumination (e.g. white light) and luminesces in the same colour under appropriate UV illumination. The common image is of the digit "5". For example, under standard visible illumination, the common image C.I.$_v$ may exhibit a yellow image of the digit "5" and under non-visible (UV) illumination the common image C.I.$_n$ will again be of a digit "5" emitting yellow light. In the FIG. 43(*b*) embodiment, the print layer 30 is formed of a material 30*a* which is colourless (invisible) under standard illumination, so under these conditions the common image C.I.$_v$ is a colourless digit "5" rendered visible by the reflective nature of the cured material 20*a*. Under appropriate non-visible illumination (e.g. UV) the material 30*a* luminesces in a selected colour (e.g. yellow) such that the device now appears to exhibit a coloured digit "5".

In the FIG. 43(*c*) embodiment, the print layer 30 is formed of a material 30*a* which under standard illumination has one visible colour (e.g. green) and luminesces with a different colour (e.g. yellow) under non-visible (e.g. UV) illumination. Hence under visible light the common image C.I.$_v$ is of a green digit "5" while under UV light the appearance of the device changes and the common image C.I.$_n$ now appears as a yellow digit "5". In more complex examples, two or more materials could be used to form the print layer 30, some which are responsive to non-visible wavelengths and some which are not, or multiple responsive materials which exhibit different colour changes from one another. For instance, in the FIG. 43(*d*) embodiment, the print layer 30 is divided into two halves by the line Z-Z'. The left half of the print layer is formed of a first material 30*a* which is not responsive to UV and appears in a first colour (e.g. green) under visible light. The right half of the print layer 30 is formed of a second material 30*b* which appears in substantially the same first colour (e.g. green) under visible light, and emits light of a different, second colour (e.g. yellow) when illuminated under appropriate non-visible light (e.g. UV). Thus under standard visible lighting, the common image C.I.$_v$ appears as a complete representation of the digit "5" in the colour green (the two halves matching one another in colour). However under appropriate non-visible illumination (e.g. UV) only the right half of the digit is visible and exhibits a colour change, appearing yellow, thereby revealing the pattern concealed within the print layer 30. Equally the opposite arrangement could be provided, where in visible light the right hand and left hand of the '5' could appear different from one another (e.g. one is red and the other is blue) whereas under UV illumination both areas could emit the same colour (e.g. yellow). It is also possible to utilise two or more UV-responsive materials which match under visible illumination and each exhibit different luminescent colours under UV illumination. Examples of suitable inks are disclosed in WO-A-2004/050376 and WO-A-2018/206936.

Figure 44A:
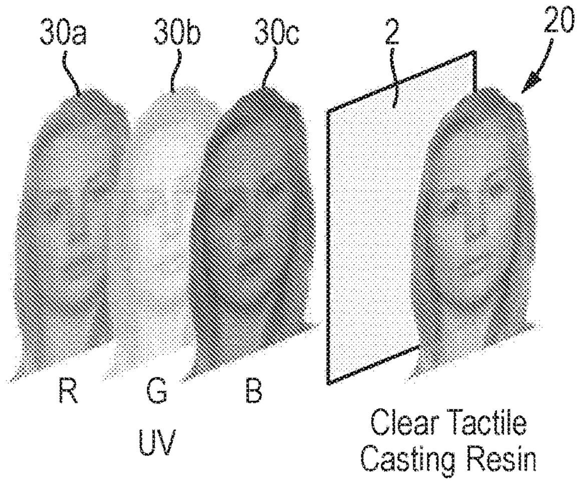
FIG. 44(*a*) schematically depicts another example of a security device in accordance with the invention, in an exploded view, and FIG. 44(*b*) shows (i) the appearance of the security device under a first illumination condition, and (ii) the appearance of the security device under a second illumination condition.
Figure 44B:
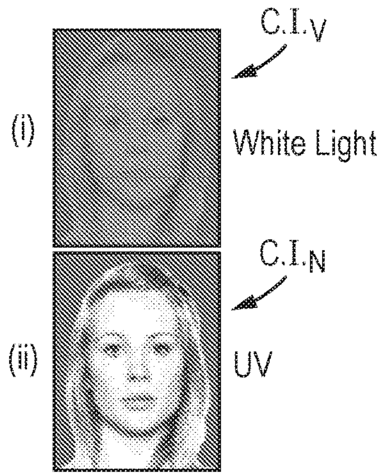

FIG. 44 shows a further embodiment in which the print layer 30 comprises substances 30*a*, 30*b*, 30*c* which emit red, green and blue light respectively. The embodiment is otherwise the same as that of FIG. 9 above. Under illumination by a corresponding excitation waveband (e.g. UV) the device exhibits a full colour version of the common image. Examples of suitable substances are disclosed in WO-A-2020/030893. The substances may be invisible under standard visible illumination. In this case, as shown in FIG. 44(*b*)(i), in visible light the common image C.I.$_v$ will appear colourless and be conveyed by the reflective nature of the surface relief structure 20. Under UV illumination, the print layer 30 will be excited and the full colour RGB image displayed. In a variant of this example, the print layer 30 could comprise three colour components which combine to exhibit a full colour image under standard visible light (as in FIG. 44) but only one of the materials emits light under UV illumination. For instance, the three components could appear red, green and blue in white light and only the green material may be fluorescent, e.g. emitting yellow light under UV. Hence when the device is viewed under white light and then the illumination conditions are changed to UV, the image appears to change from full-colour to single-colour.

Figure 45A:
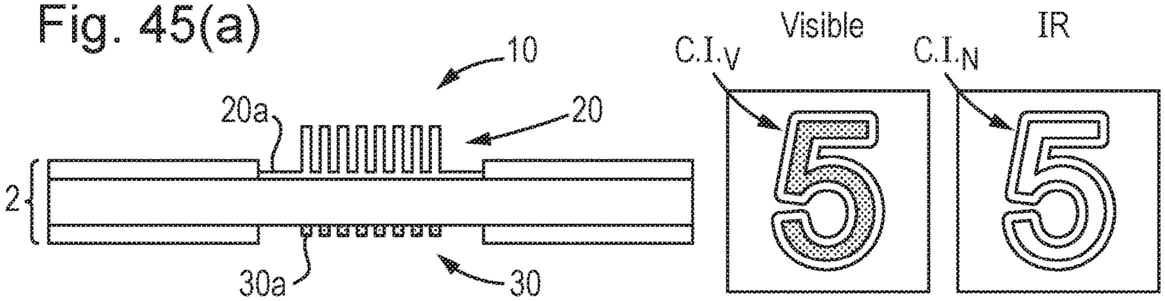
FIGS. 45(*a*), (*b*) and (*c*) show three further embodiments of security devices in accordance with the present invention, each in cross-section and plan view.
Figure 45B:
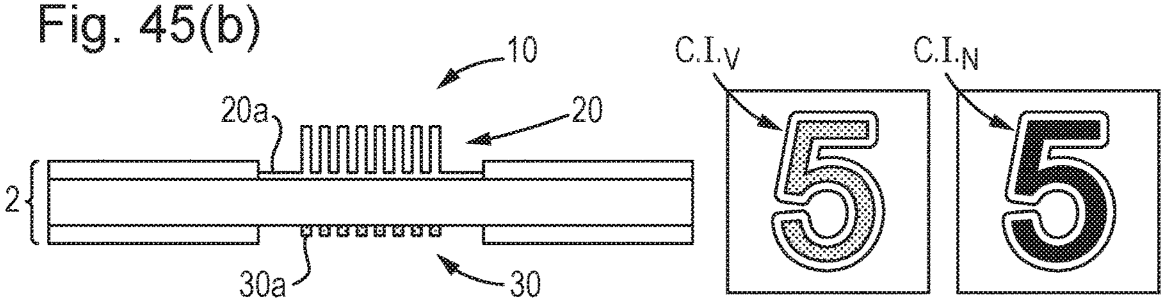
Figure 45C:
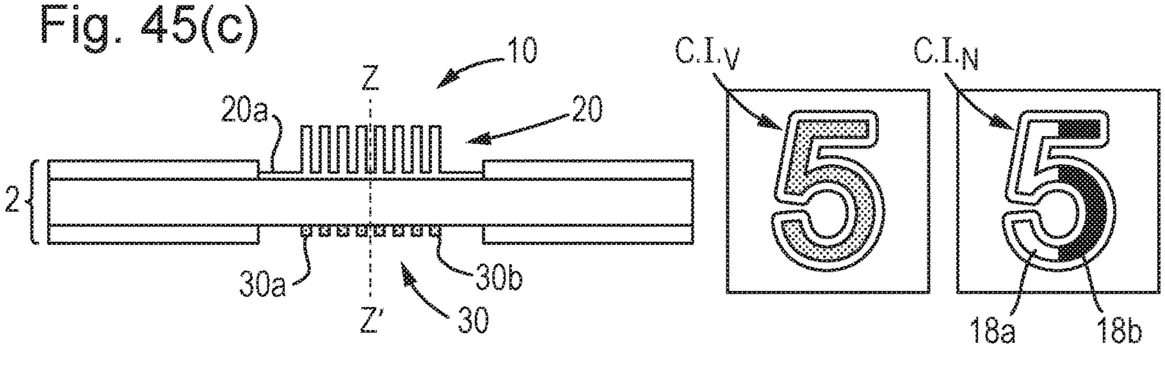

FIGS. 45(*b*) and (*c*) show two embodiments utilising infrared (IR) absorbing materials in the print layer 30. For comparison, FIG. 45(*a*) shows an embodiment in which the print layer 30 is a standard coloured ink 30*a* which does not absorb in the IR spectrum. When viewed by the naked eye under standard illumination, the common image C.I.$_v$ appears as the digit "5" in the colour of the material 30*a*, e.g. yellow. The image is not visible in the IR spectrum. In the FIG. 45(*b*) embodiment, the print layer 30 is formed of a material 30*a* which has a visible colour such as yellow and which is IR-absorbent. When viewed by the naked eye under standard illumination, the common image C.I.$_v$ again appears as the digit "5" in the colour of the material 30*a*. When viewed via an appropriate camera apparatus in the IR spectrum, the same digit "5" is now visible as an absorbing area. It is also possible to use a mixture of materials. Thus in the embodiment of FIG. 45(*c*), the left half of the print layer 30 is formed by a first material 30*a*, which is coloured and not IR absorbent, while the right half is formed by a second material 30*b* which has the same visible colour as first material 30*a* but is IR-absorbent. When viewed by the naked eye under standard illumination, the common image C.I.$_v$ once again appears as the digit "5" in the colour displayed by both materials 30*a* and 30*b* (e.g. yellow). When viewed via an appropriate camera apparatus in the IR spectrum, the left half 18*a* of the digit "5" is no longer visible, while the right half 18*b* appears as an absorbing area.

In all of the above examples, the arrangement of the print layer on one side of the substrate and the relief structure on the other means that it is possible to apply both simultaneously. This achieves extremely high registration between the print layer and the relief structure since there is no movement of the substrate between the application of the two components: they are both applied to opposite surfaces of the substrate at the same position along the substrate (in the direction along which the substrate moves through the manufacturing apparatus—the machine direction), at the same time. The substrate could be in the form of a sheet or a web.

Suitable apparatus, materials and methods for forming the relief structures disclosed herein are described in WO-A-2018/153840 and WO-A-2017/009616. In particular, the relief structures can be formed by the in-line casting devices detailed in WO-A-2018/153840 (e.g. that designated 80 in FIG. 4 thereof), using an embossing tool 85 carrying an appropriately designed micro-optical structure from which can be cast the desired relief structure shape. Similarly, the cast-curing apparatuses and methods disclosed in section 2.1 of WO-A-2017/009616 (e.g. in FIGS. 4 to 8 thereof) can also be used to form the presently disclosed relief structures, by replacing the relief 225 carried on casting tool 220 with an appropriate relief from which can be cast the desired shapes. In particular it will be noted that whilst WO-A-2017/009616 describes the use of the apparatus to form focusing elements, the same apparatus can be used to form any desired relief structure by appropriate reconfiguration the relief 225, including that envisaged herein.

Whichever casting apparatus is used, the curable material(s) from which the relief structure is cast may be applied either directly to the tool carrying the desired relief shape (e.g. to the embossing tool 85 of WO-A-2018/153840 or to the casting tool 220 of WO-A-2017/009616), or the curable material(s) may be applied directly to the substrate on which the relief structure is to be formed, and then brought into contact with the tool (e.g. by impressing the tool onto the deposited curable material). Both options are described in the aforementioned documents. Preferably, the latter option is employed and the curable material(s) are applied to the substrate by screen printing as detailed in WO-A-2018/153840, before being formed into the desired relief structure. If the former option is employed, it should be noted that there is preferably no wiping of the casting tool surface relief between applying the curable material to it, and bringing it into contact with the substrate, so that a base layer of curable material remains connecting the protrusions of the relief structure together on the substrate (the base layer will be of much lesser height than the protrusions).

Suitable curable materials are disclosed in WO-A-2017/009616, section 2.1. UV-curable materials are most preferred. Curing of the material(s) preferably takes place while the casting tool is in contact with the curable material, against the substrate.

In all of the above embodiments, the transparent curable material in which the surface relief structure 20 is formed can be of various different compositions. The curable material is preferably radiation-curable and may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

Due to the nature of the cast-cure process, the resulting relief structure will typically include a base layer of material on top of the substrate, connecting the protrusions of the relief at their base. In many cases this base layer is integral with the relief structure and formed of the same curable material(s), resulting from either the shape of the casting relief and/or the manner in which the curable material is pressed between the substrate and the casting tool during processing. An example of such a base layer and its formation is disclosed in WO-A-2017/009619, FIG. 8. It is also possible to provide (alternatively or in addition) a base layer in the form of a pedestal layer, applied in a preceding step. Apparatus and methods for providing such a pedestal layer are disclosed in WO-A-2017/09620, FIGS. 8 to 12.

Figure 46A:
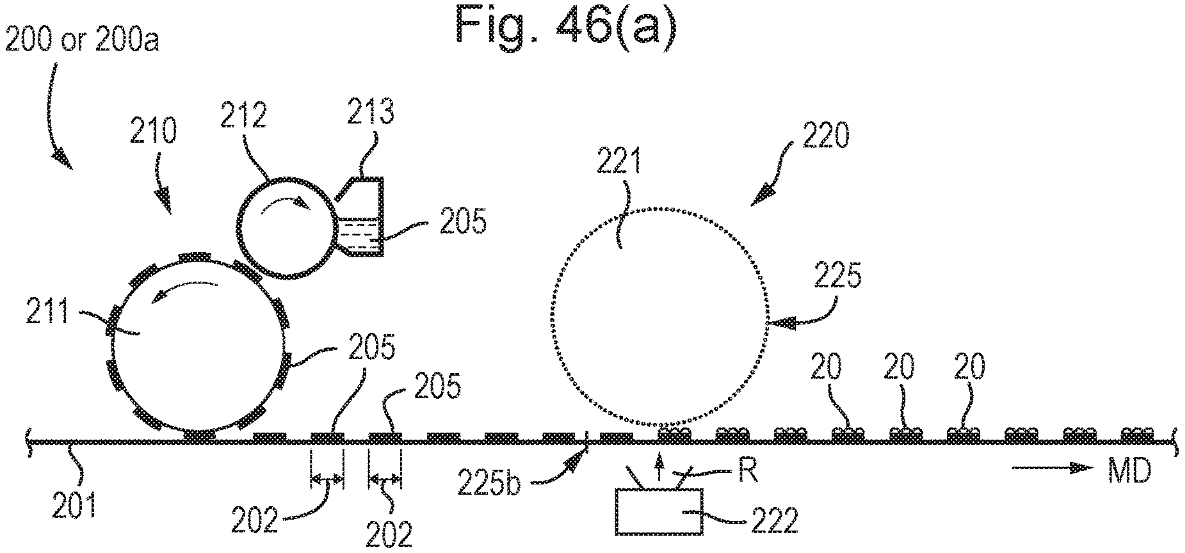
FIG. 46(*a*) schematically depicts exemplary apparatus suitable for cast-curing a surface relief structure in embodiments of the invention, FIG. 46(*b*) illustrating the formation of the surface relief structure in perspective view.
Figure 46B:
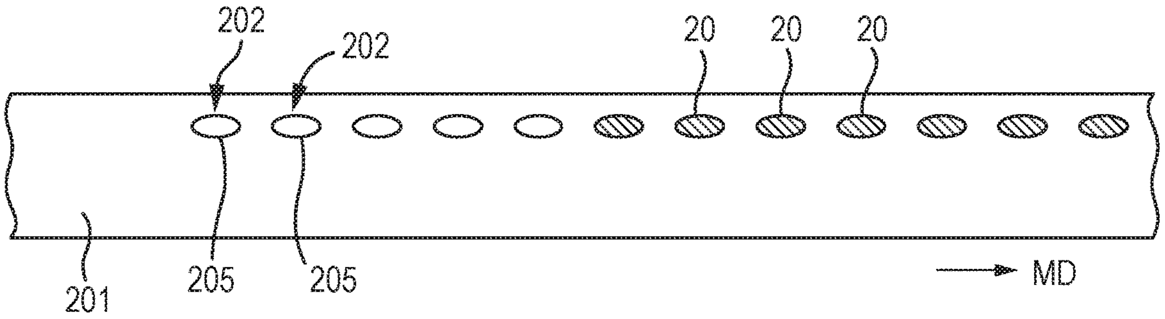

An example of a suitable cast-cure process for forming surface relief structures 20 suitable for use in the security devices disclosed herein will be described with reference to FIGS. 46(*a*) and (*b*) hereto, which show the structure 20 only schematically. The process is shown as applied to a support layer 201, comprising a transparent or translucent film, which may be the aforementioned document substrate 2 or could be another substrate 2' which is later applied to the document substrate 2. FIG. 46(*a*) depicts the apparatus from a side view, and FIG. 46(*b*) shows the support layer in a perspective view, the manufacturing apparatus itself being removed for clarity.

A transparent curable material 205 is first applied to the support layer 201 using an application module 210 which here comprises a patterned print cylinder 211 which is supplied with the curable material from a doctor chamber 213 via an intermediate roller 212. For example, the components shown could form part of a flexographic printing system. Other printing techniques such as lithographic, screen, or gravure printing could also be used. Print processes such as these are preferred since the curable material 205 can then be laid down on the support 201 only in selected regions 202 thereof, the size, shape and location of which can be selected by control of the print process, e.g. through appropriate configuration of the pattern on cylinder 211. However, in other cases, an all over coating method could be used, e.g. if the surface relief structure is to be formed all over the support 201. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the surface relief structure which is to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 may be configured such that the relief structure 225 is only provided at regions corresponding to shape and position of the first regions 202 of curable material 205.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 although the source 222 could alternatively be positioned above the support layer 201, e.g. inside cylinder 221 if the cylinder is formed from a suitable transparent material such as quartz. In an alternative embodiment, the curable material 205 could be applied directly onto casting tool 221 rather than on to the substrate 201. This could be done in an all-over or patternwise manner.

Typically, in embodiments in which the curable material is applied directly onto casting tool 221, the curable material is applied so as to substantially fill the trenches 121, as well as form a thin layer of curable material over substantially the whole of the surface of the casting tool 221 in the first region—i.e. over elevations of the relief on the casting tool, as well as the elevations. There is no wiping/doctoring step. Following the casting process, this thin layer of curable material forms the integral base layer of the surface relief structure. In alternative methods, the curable material 205 may be applied to the casting tool so as to be present only within the trenches 121, for example by using a doctor blade or other removal means to remove material from the tops of the elevations. In such examples, a tie-coat layer is then applied over substantially the whole surface of the die form 221, i.e. coating both the filled recessed areas of the trenches and the raised areas between them. The curable material of the tie coat may or may not be of the same composition as the curable material 205 in the trenches. In particularly preferred embodiments, the tie coat composition may be selected so as to improve the adhesion between the curable material 205 and the support layer. The tie coat is applied by a tie coat application module. It is desirable for the tie coat to be applied in a continuous, homogenous manner at the micron level hence it is preferably applied in a metered way via a slot die and transfer roller combination. The tie coat may be partially cured before the casting tool and the substrate are brought into contact.

In all embodiments of the invention, the print layer 30 can be applied to the substrate using any convenient printing technique, but preferably one which does not cause any embossing of the substrate is selected. Gravure, lithographic, flexographic, wet or dry offset, inkjet or micro-intaglio printing are particularly preferred techniques. If the print layer 30 is to comprise multiple print workings, preferably these are collected on a transfer roller or blanket before being applied to the substrate together. Preferably, where multiple inks are used, these are accurately registered to one another to such a degree that any mis-register between them is too small to be perceivable to the naked eye. For instance, the translational colour to colour registration (i.e. in the machine direction x or cross direction y) may be within +/−5-10 μm. The skew register (i.e. rotational alignment) may be to within 0.02 degrees. The pitch register (i.e. the degree to which the coverage of one colour is stretched relative to the other) may be to within 0.01%. Such registration levels are not achievable with Intaglio printing, so colour reproduction is significantly better with the present invention.

WO-A-2018/153840 and WO-A-2017/009616 also disclose print stations, which may be disposed downstream of the above-described casting apparatus (but alternatively could be located upstream, or at the same point along the machine direction as explained below). Print stations such as these are suitable for applying any the print layer 30, to the opposite side of the substrate from that carrying the cast relief structure. The apparatus disclosed in WO-A-2018/153840 can achieve particularly high registration between such cast relief structures and the printed elements.

For example, in preferred methods, the relief structure and print layer are preferably registered to one another sufficiently accurately that any mis-register is too small to be perceived by the naked eye. Preferably, the translational register (i.e. in the machine direction x or cross direction y) is to within 150 μm (+/−75 μm). Desirably, the skew register (i.e. rotational alignment) is to within 1 degrees (preferably less than 0.1, more preferably less than 0.05, most preferably less than 0.02 degrees). Advantageously, the pitch register (i.e. the degree to which one component is stretched relative to the other) is to within 0.01%. The precise registration achieved will depend on the consumables that are used in the machine (substrate, inks, resin, print plates) as well as the actual machine configuration.

Figure 7:
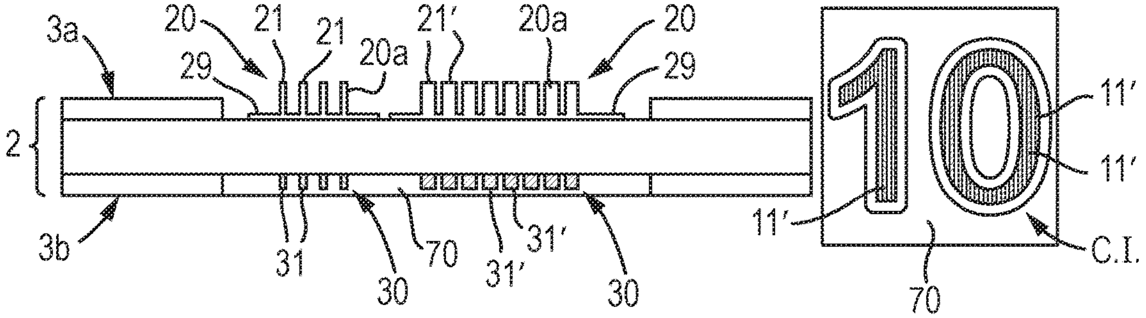
FIG. 7 shows a further embodiment of a security device in accordance with the invention, in cross-section and plan view.

It is highly desirable for the surface relief structure 20 and the print layer 30 to be applied to the opposite surfaces of the substrate 2 simultaneously. That is, at the same position along the transport path in the machine direction. This makes it possible to achieve the highest registration between the two components. FIG. 7 of WO-A-2018/153840 shows suitable apparatus for achieving this.

Figure 47:
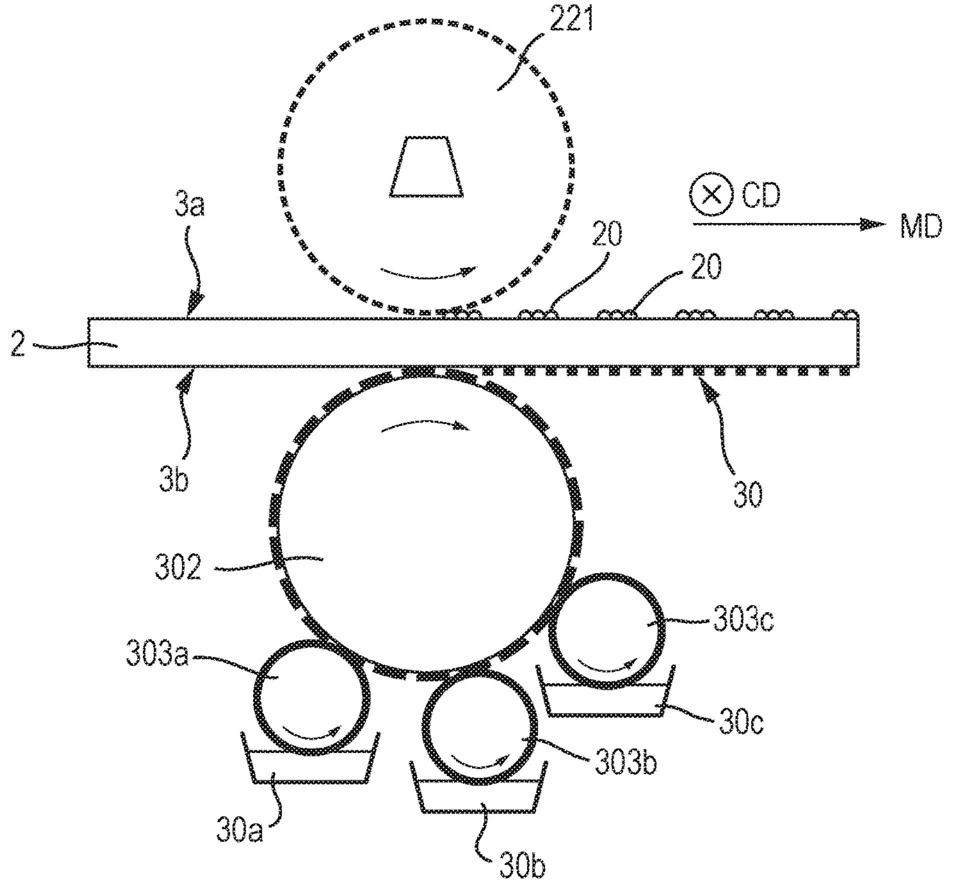
FIGS. 47 and 48 schematically depict two exemplary apparatus for use in embodiments of the invention for forming the surface relief structure and print layer simultaneously.

FIG. 47 shows an schematic example of this in the case where the surface relief structure 20 and the print layer 30 are applied to the first and second surfaces, respectively, of a document substrate 2 (which may be a web or a sheet). However the same principles can be applied to the construction of an article such as a security thread, in which case the substrate 2 will be replaced by some other, typically thinner, transparent or translucent film. The surface relief structure 20 and the print layer 30 can be formed using any of the processes described above. For clarity, FIG. 47 depicts only selected components of the apparatus used to form the surface relief structure 20 and the print layer 30, namely a casting tool 221 (e.g. as shown in FIG. 46) and common print roller 302, which is supplied with three inks 30*a*, 30*b* and 30*c* via corresponding inking rollers 303*a*, 303*b*, 303*c*. Other components of the process line are not shown. The curable material(s) may be applied on to the substrate 2 upstream of the casting tool 221 or directly onto the casting tool 221. The casting tool 221 and print roller 302 are arranged on opposite sides of the transport path along which the substrate 2 is conveyed, so as to form a (low pressure) nip through which the substrate 2 passes. At each location along the polymer substrate 2, its first surface 3*a* therefore comes into contact with the casting tool 221 at the same time as its second surface 3*b* comes into contact with the print roller 302. As a result, the surface relief structure 20 and the print layer 30 are formed on each point of the substrate simultaneously.

This has the significant advantage that any deformation experienced by the substrate 2, as a result of changes in processing temperature or the like, will be exactly the same when the surface relief structure 20 is applied to the polymer substrate 2 as it is when the print layer 30 is applied. The substrate has no time to expand or contract between the instant at which the surface relief structure 20 is applied and when the print layer 30 is applied, since they occur at the same time. As such, a very high degree of register between the two components is automatically achieved.

The arrangement shown in FIG. 47 has the disadvantage that since the nip between the casting tool 221 and the print roller 302 constitutes the first point of contact between the substrate and the casting tool 221, the transparent curable material 205 from which the surface relief structure 20 is formed will be substantially uncured when it enters the nip. As such, the pressure applied between the casting tool 221 and the print roller 302 should be low so as to avoid damage to the cast surface relief structure 20.

Figure 48:
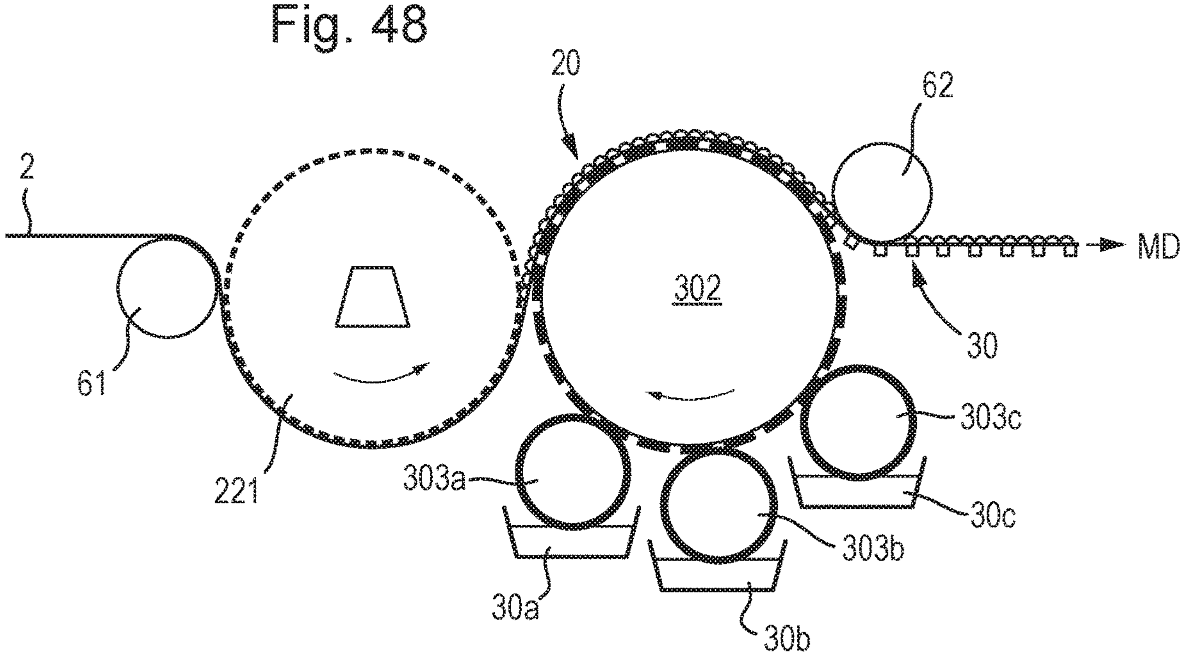

FIG. 48 shows an improved arrangement in which formation of the surface relief structure 20 and application of the print layer 30 can still be considered simultaneous because the curable material 205 is still in contact with the surface relief on casting tool 221 at the nip location between the casting tool 221 and the print roller 302. The curable material(s) may be applied on to the substrate 2 upstream of the casting tool 221 or directly onto the casting tool 221. The substrate is wrapped around a portion of the casting tool 221 from a first point on roller 61, at which casting of the surface relief structure 20 begins, until the nip with print roller 302 at which point the surface relief structure 20 will be relatively well cured, preferably fully cured. As such, the pressure between the two components 221, 302 can be increased relative to that in the FIG. 47 embodiment since the material 205 is relatively hard and less prone to damage. This improves the quality achieved in the print layer 30 formation process. A further benefit of the arrangement shown is the increased wrap length of the substrate 2 around print roller 302, allowing for prolonged curing here also. The substrate 2 stays in contact with print roller 302 from the nip location until take-off roller 62.

Figure 49:
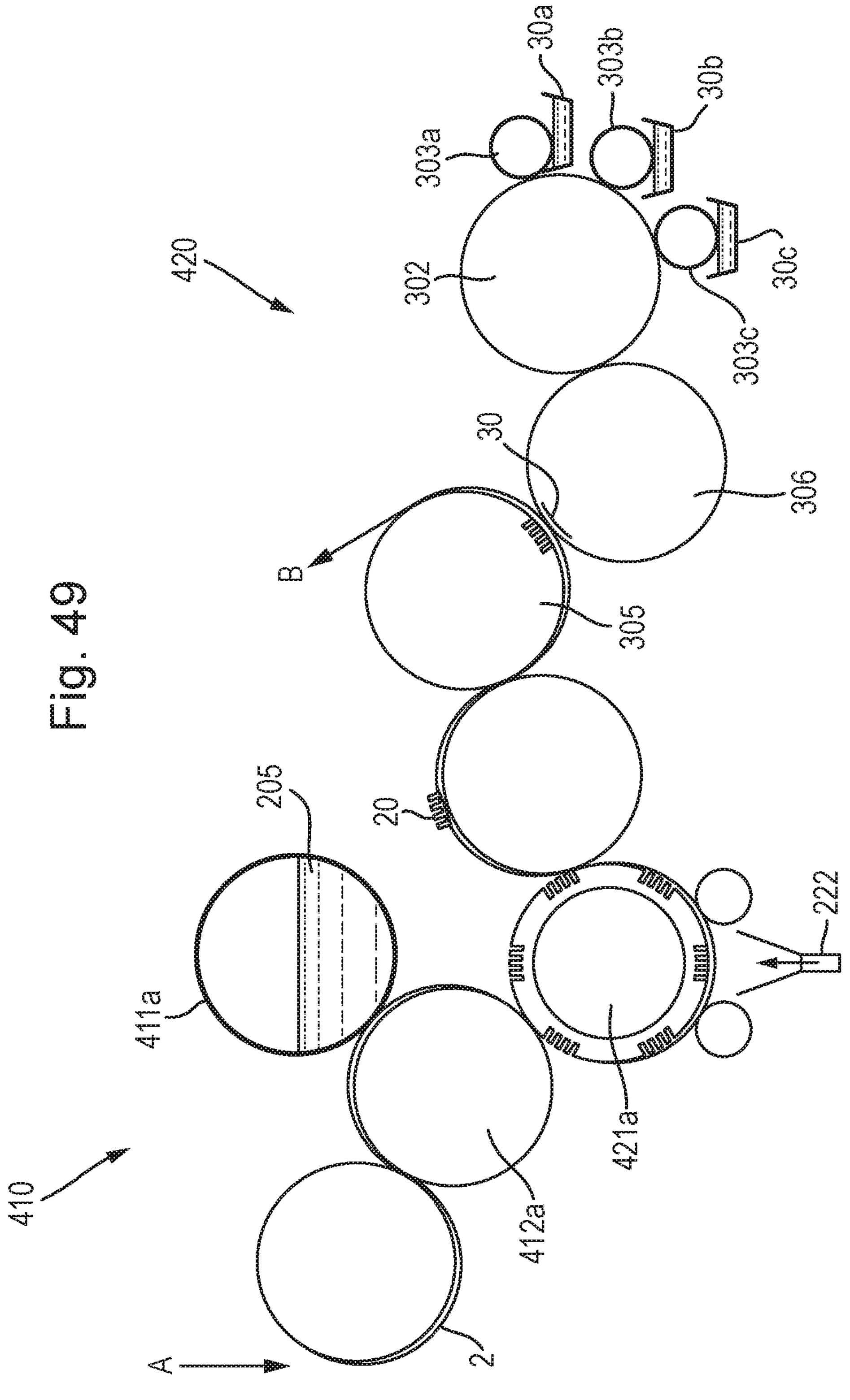
FIG. 49 schematically depicts a further example of apparatus for use in embodiments of the invention.

Simultaneous application of the surface relief structure and print layer is preferred but not essential. FIG. 49 illustrates an exemplary arrangement for sequentially (rather than simultaneously) applying the two components 20, 30 on opposing sides of a substrate 2 (which here is in the form of a sheet). This may be described as forming the two components in-line in the same pass. The arrangement generally comprises a print and cast module 410 for forming the surface relief and a print station 420. The substrate enters the apparatus at arrow A and exits at arrow B. A curable material 205 is first applied to a first side of the sheet substrate 2 as it passes through a nip formed by screen print cylinder 411*a* and intermediate roller 412*a*. However, as previously discussed, other printing techniques such as lithographic, flexographic, offset or inkjet printing could also be used. The sheet 2 is then conveyed to casting tool 421*a* in the form of a cylinder defining the shape of a surface relief structure which is to be cast into the curable material 205. Having been formed (shaped) into the desired surface relief structure, the curable material 205 is cured by exposing it to appropriate curing energy such as UV radiation from source 222. This preferably takes place while the curable material is in contact with the surface relief 225 although if the material is already sufficiently viscous this could be performed after separation.

The sheet substrate 2, now carrying the cured surface relief structure 20, is the conveyed to the print station 420. In this example, the print station 420 is a lithographic print apparatus, comprising a patterned print cylinder 302 which is selectively supplied with one or more inks 30*a*, 30*b*, 30*c* via inking rollers 303*a*, 303*b*, 303*c*. The image is transferred from print cylinder 302 to a blanket roller 306 and then onto the substrate 2 at a nip between blanket roller 306 and an impression roller 305. The substrate 2, now carrying both the surface reliefs 20 and the print layer 30 on opposite sides is then conveyed away from the print module 420 via at arrow B.

Suitable substrates on which the disclosed devices can be formed are disclosed in WO-A-2017/009616, section 1, and apparatus/methods for applying opacifying layers thereto in section 4, including the formation of window regions. Preferably, the opacifying layers are applied before formation of the presently disclosed security devices on the substrate. For instance, the sheet material supplied to the apparatus of WO-A-2018/153840 may comprise a polymer substrate of the sort disclosed in WO-A-2017/009616, already provided with one or more opacifying layers. The security devices disclosed herein may be disposed in a window region defined by the opacifying layers, or in a non-window region.

Some preferred aspects of the invention are set out in the following clauses:

Clause 1. A security device, comprising:

a substrate having opposing first and second surfaces;

on the first surface of the substrate, a surface relief structure formed of a cured, at least semi-transparent material; and on the second surface of the substrate, a print layer;

wherein, in at least a first region of the security device, the surface relief structure and the print layer are each defined in accordance with the same image and are in alignment with one another, whereby the surface relief structure provides tactility to the image.

Clause 2. A security device according to Clause 1, wherein the curable material is colourless and the print layer defines a multi-colour image, preferably full-colour image, most preferably a RGB or CMYK image.

Clause 3. A security device according to Clause 1, wherein the curable material carries a tint of a first colour and the print layer defines an image in at least a second colour such that, when viewed in combination a multi-coloured version of the image is visible.

Clause 4. A security device according to Clause 3, wherein the first colour is one of red, green and blue, and the print layer defines the image in the other two of red, green and blue, such that when viewed in combination a full colour RGB version of the image is viewed.

Clause 5. A security device according to any of the preceding Clauses, wherein the height of the surface relief structure varies in accordance with the image.

Clause 6. A security device according to any of the preceding Clauses, wherein the security device further comprises a second region in which one or both of the surface relief structure and the print layer are present.

Clause 7. A security device according to any of the preceding Clauses, wherein the substrate is transparent in at least part, preferably all, of the first region of the security device.

Clause 8. A method of manufacturing a security device, comprising forming a surface relief structure on a first surface of a transparent substrate by cast-curing an at least semi-transparent curable material thereon, and printing a print layer on the second surface of the transparent substrate, wherein the surface relief structure and the print layer are each defined in accordance with the same image and are in alignment with one another, whereby the surface relief structure provides tactility to the image.

Clause 9. A method according to Clause 8, wherein the formation of the surface relief structure and the printing of the print layer are simultaneous, taking place at the same position along the machine direction, at the same time.

Clause 10. A method according to Clause 8 or 9, configured to provide the security device with any of the features of Clauses 1 to 7.

The invention claimed is:

1. A security device, comprising:

a substrate having opposing first and second surfaces;

on the first surface of the substrate, a surface relief structure formed of one or more cured, at least semi-transparent material(s); and on the second surface of the substrate, a print layer;

wherein, in at least a first region of the security device in at least part of which the substrate is transparent or translucent, the surface relief structure and the print layer are in alignment with one another, the surface relief structure exhibiting a first set of feature(s) of a common image and the print layer exhibiting a second set of feature(s) of the common image, whereby the common image is exhibited by the surface relief structure and the print layer in combination with one another and the surface relief structure provides tactility to the common image, the common image being a static macro-image, and wherein the surface relief structure includes a plurality of spaced protrusions, joined to one another by a base layer of lesser height.

2. A security device according to claim 1, wherein the first and second sets of feature(s) are identical to one another, the surface relief structure and the print layer each exhibiting all the features of the common image.

3. A security device according to claim 1, wherein the first and second sets of feature(s) are different from one another, the first set of feature(s) and/or the second set of feature(s) being a subset of the features of the common image.

4. A security device according to claim 1, wherein the first set of feature(s) corresponds to a first colour component of the common image, and the second set of feature(s) corresponds to at least a second colour component of the common image.

5. A security device according to claim 1, wherein either:

the first set of feature(s) of the common image, exhibited by the surface relief structure, is laterally located wholly within a boundary of the second set of feature(s) of the common image, exhibited by the print layer; and/or the second set of feature(s) of the common image, exhibited by the print layer, is laterally located wholly within a boundary of the second set of feature(s) of the common image exhibited by the surface relief structure.

6. A security device according to claim 1, wherein the common image is defined at least in part by an array of image elements spaced from one another, and either:

the surface relief structure comprises a plurality of raised elements spaced from one another which form the image elements defining the first set of feature(s) of the common image; and/or the print layer comprises a plurality of print elements spaced from one another which form the image elements defining the second set of feature(s) of the common image.

7. A security device according to claim 6, wherein the common image is a screened image, the image elements varying across the array in terms of their size, shape, colour, optical density and/or spacing in order to convey the common image.

8. A security device according to claim 1, wherein the common image is a multi-tonal and/or multi-coloured image.

9. A security device according to claim 1, wherein the at least one curable material is colourless and the print layer exhibits one or multiple visible colour(s).

10. A security device according to claim 1, wherein the at least one curable material carries a tint of a first colour and the print layer exhibits at least the first colour and/or a second colour.

11. A security device according to claim 1, wherein the at least one curable material carries a tint of at least one colour and the print layer has a visual opacity such that a colour appearance of the common image is different when the security device is viewed from a surface relief structure side of the security device as compared with when viewed from a print layer side of the security device.

12. A security device according to claim 1, wherein the substrate is transparent or translucent across the first region of the security device.

13. A plurality of substantially identical security devices, each in accordance with claim 1, in each of which the respective surface relief structures and print layers have a same position relative to one another.

14. A security document comprising a document substrate and a security device thereon, the security device being in accordance with claim 1, wherein the document substrate may or may not act as the substrate of the security device.

15. A method of manufacturing a security device, comprising, in any order or simultaneously:

forming a surface relief structure on a first surface of a substrate from one or more at least semi-transparent curable material(s); and printing a print layer onto a second surface of the substrate, wherein, in at least a first region of the security device in at least part of which the substrate is transparent or translucent, the surface relief structure and the print layer are in alignment with one another, the surface relief structure exhibiting a first set of feature(s) of a common image and the print layer exhibiting a second set of feature(s) of the common image, whereby the common image is exhibited by the surface relief structure and the print layer in combination with one another and the surface relief structure provides tactility to the common image, wherein the common image is a static macro-image, and wherein the surface relief structure includes a plurality of spaced protrusions, joined to one another by a base layer of lesser height.

16. A method according to claim 15, wherein the formation of the surface relief structure and the printing of the print layer are performed in register with one another.

17. A method according to claim 16, wherein the formation of the surface relief structure and the printing of the print layer are simultaneous, taking place at a same position along the machine direction, at a same time.

18. A method according to claim 15, wherein forming the surface relief structure comprises cast-curing one or more at least semi-transparent curable material(s) on the first surface of the substrate by:

providing a casting tool having a mould relief defined therein corresponding to the surface relief structure;

applying the one or more at least semi-transparent curable material(s) to the casting tool or to the substrate;

bringing the casting tool and the substrate into contact with the one or more at least semi-transparent curable material(s) therebetween, to thereby form the one or more at least semi-transparent curable material(s) into the surface relief structure; and during and/or after the contact, curing the one or more at least semi-transparent curable material(s) so as to retain the surface relief structure.

* * * * *